(12) United States Patent
Yamaoka et al.

(10) Patent No.: US 8,296,803 B2
(45) Date of Patent: Oct. 23, 2012

(54) PROGRAM RECOMMENDATION SYSTEM, PROGRAM VIEW TERMINAL, PROGRAM VIEW PROGRAM, PROGRAM VIEW METHOD, PROGRAM RECOMMENDATION SERVER, PROGRAM RECOMMENDATION PROGRAM, AND PROGRAM RECOMMENDATION METHOD

(75) Inventors: Masaru Yamaoka, Osaka (JP); Tsutomu Mukai, Osaka (JP); Yoichi Ikeda, Osaka (JP); Takahiro Sato, Osaka (JP); Mitsuaki Oshima, Kyoto (JP); Takuma Iwasa, Saitama (JP); Hiroshi Kutsumi, Osaka (JP)

(73) Assignee: Panasonic Corporation, Osaka (JP)

( * ) Notice: Subject to any disclaimer, the term of this patent is extended or adjusted under 35 U.S.C. 154(b) by 927 days.

(21) Appl. No.: 12/377,089

(22) PCT Filed: Aug. 9, 2007

(86) PCT No.: PCT/JP2007/065632
§ 371 (c)(1),
(2), (4) Date: Feb. 10, 2009

(87) PCT Pub. No.: WO2008/018550
PCT Pub. Date: Feb. 14, 2008

(65) Prior Publication Data
US 2010/0169927 A1    Jul. 1, 2010

(30) Foreign Application Priority Data
Aug. 10, 2006   (JP) .................................. 2006-219017

(51) Int. Cl.
*G06F 3/00* (2006.01)
*G06F 13/00* (2006.01)
*H04N 5/445* (2011.01)

(52) U.S. Cl. ......................................... 725/46; 725/143
(58) Field of Classification Search ........................ None
See application file for complete search history.

(56) References Cited

U.S. PATENT DOCUMENTS
6,005,597 A    12/1999   Barrett et al.
(Continued)

FOREIGN PATENT DOCUMENTS
JP   2001-298677   10/2001
(Continued)

OTHER PUBLICATIONS

International Search Report issued Sep. 11, 2007 in the International (PCT) Application No. PCT/JP2007/065632.

(Continued)

*Primary Examiner* — Dominic D Saltarelli
*Assistant Examiner* — Jason J Chung
(74) *Attorney, Agent, or Firm* — Wenderoth, Lind & Ponack, L.L.P.

(57) ABSTRACT

An object of the invention is to eliminate a program having a high general preference, and recommend a program customized to a preference of a specific user. A reserved information receiver (230) in a program recommendation server (3) receives reserved information transmitted by a program viewing terminal. A reserved information DB (235) stores the reserved information with respect to each of the users. A community reserved information statistics section (236) defines the users as a first group, based on the received reserved information, and the reserved information stored with respect to each of the users. A total user reserved information statistics section (237) defines the users as a second group including the first group. A recommended program creator (239) generates recommended information customized to the first group, based on an aggregate calculation result of the reserved information of the users belonging to the first group, and an aggregate calculation result of the reserved information of the users belonging to the second group. A recommendation transmitter (240) transmits the recommended information to the program viewing terminal. The program viewing terminal reproduces a program based on the recommended information.

15 Claims, 33 Drawing Sheets

U.S. PATENT DOCUMENTS

| | | | |
|---|---|---|---|
| 2002/0174428 A1* | 11/2002 | Agnihotri et al. | 725/46 |
| 2006/0020973 A1* | 1/2006 | Hannum et al. | 725/46 |
| 2006/0085818 A1 | 4/2006 | Bodlaender et al. | |
| 2006/0174277 A1* | 8/2006 | Sezan et al. | 725/46 |
| 2007/0204287 A1* | 8/2007 | Conradt et al. | 725/28 |
| 2009/0178081 A1* | 7/2009 | Goldenberg et al. | 725/46 |

FOREIGN PATENT DOCUMENTS

| | | |
|---|---|---|
| JP | 2003-199084 | 7/2003 |
| JP | 2005-33600 | 2/2005 |
| JP | 2005-39749 | 2/2005 |
| JP | 2005-57713 | 3/2005 |
| JP | 2005-260647 | 9/2005 |
| WO | 01/65747 | 9/2001 |
| WO | 03/036970 | 5/2003 |
| WO | 2004/047448 | 6/2004 |

OTHER PUBLICATIONS

Japanese Office Action issued Jun. 15, 2010 in Application No. 2007-205800.

Supplementary European Search Report issued Mar. 16, 2011 in Application No. EP 07 79 2282.

Barry Smyth et al., "Surfing the Digital Wave", Generating Personalized TV Listings Using Collaborative, Case-Based Recommendation, Case-Based Reasoning Research and Development, International Conference, Jul. 27, 1999, pp. 562-571.

Michael Sollenborn et al., "Category-Based Filtering and User Stereotype Cases to Reduce the Latency Problem in Recommender Systems", FQAS 2009, LNAI 5822 (Eds. T. Anderson et al.), Springer, DE, Sep. 4, 2002, pp. 395-405.

* cited by examiner

FIG. 8A

| USER ID | | RESERVED PROGRAM LIST | | |
|---|---|---|---|---|
| USER A | PROGRAM A | PROGRAM B | PROGRAM C | PROGRAM D |
| USER B | PROGRAM A | PROGRAM C | PROGRAM D | PROGRAM E |
| USER C | PROGRAM X | PROGRAM Y | PROGRAM Z | PROGRAM S |
| USER D | PROGRAM A | PROGRAM B | PROGRAM C | PROGRAM E |

FIG. 8B

| USER ID | | RESERVED PROGRAM LIST | | |
|---|---|---|---|---|
| USER A | PROGRAM A | PROGRAM B | PROGRAM C | PROGRAM D |
| USER B | PROGRAM A | PROGRAM C | PROGRAM D | PROGRAM E |
| USER D | PROGRAM A | PROGRAM B | PROGRAM C | PROGRAM E |

FIG. 8C

FIG. 16

| User ID | Program ID | Marking |
|---|---|---|
| A | 1 | 0 ~ 7min |

FIG. 17

| User ID | Program ID | Marking | |
|---|---|---|---|
| A | 1 | 0 ~ 7min | ~1001 |
| B | 1 | 2 ~ 8min | ~1002 |
| C | 1 | 5 ~ 12min | ~1003 |
| D | 1 | 1 ~ 8min , 16 ~ 25min | ~1004 |

FIG. 19

| User ID | Program ID | Marking | |
|---|---|---|---|
| A | 2 | 0 ~ 40 min | ~1201 |
| | 4 | 30 ~ 70 min, 90 ~ 110 min | ~1202 |
| B | 2 | 10 ~ 50 min | ~1203 |
| | 3 | 10 ~ 50 min | ~1204 |
| | 4 | 30 ~ 70 min | ~1205 |
| Z | 3 | 10 ~ 50 min | ~1206 |
| | 4 | 20 ~ 60 min | ~1207 |
| D | 2 | 20 ~ 40 min | ~1208 |
| | 3 | 20 ~ 30 min | ~1209 |
| | 4 | 40 ~ 50 min, 100 ~ 120 min | ~1210 |

FIG. 21

| User ID | Program ID | Marking | Flag |
|---|---|---|---|
| A | 2 | 0~ 5, 15~ 35, 50~ 80(min)<br>5~ 15, 35~ 50, 80~ 95(min) | F<br>P |
| B | 2 | 30~ 35, 45~ 65, 70~ 95(min)<br>35~ 45(min)<br>65~ 70(min) | P<br>M<br>F |
| C | 2 | 0~ 10, 20~ 35, 40~ 85, 90~125(min)<br>10~ 20, 35~ 40, 85~ 90(min) | P<br>M |
| D | 2 | 0~ 25, 30~ 65, 70~ 85, 95~125(min)<br>25~ 30, 65~ 70(min)<br>85~ 95(min) | P<br>D<br>M |

|  |  | α | β | γ | δ | ε | ζ |
|---|---|---|---|---|---|---|---|
| c1 | A | ○ |  |  | ○ |  |  |
|  | B |  | ○ | ○ |  |  |  |
|  | C | ○ | ○ |  | ○ |  | ○ |
|  | D |  | ○ |  | ○ | ○ |  |
|  | tf | 2/11 | 3/11 | 1/11 | 3/11 | 1/11 | 1/11 |
| c2 | A | ○ |  |  | ○ |  |  |
|  | E |  | ○ | ○ | ○ | ○ |  |
|  | F | ○ |  |  | ○ | ○ |  |
|  | G | ○ |  | ○ | ○ | ○ |  |
|  | H | ○ | ○ |  | ○ | ○ |  |
|  | tf | 4/17 | 2/17 | 2/17 | 5/17 | 4/17 | 0/17 |
| c3 | I |  | ○ | ○ |  |  |  |
|  | J | ○ | ○ | ○ |  | ○ | ○ |
|  | K | ○ |  | ○ |  |  |  |
|  | L | ○ |  | ○ |  |  | ○ |
| c4 | M | ○ | ○ |  | ○ |  | ○ |
|  | N | ○ |  |  |  | ○ | ○ |
|  | P | ○ |  |  | ○ |  | ○ |
| idf |  | log(15/11)+1 | log(15/8)+1 | log(15/7)+1 | log(15/9)+1 | log(15/7)+1 | log(15/6)+1 |
| tf·idf (AVERAGE 0.26) | c1 | 0.20 | 0.35 | 0.12 | 0.35 | 0.12 | 0.13 |
|  | c2 | 0.27 | 0.15 | 0.16 | 0.37 | 0.31 | 0 |

RESERVED (α), RECOMMENDED (1ST RANK) (β), RESERVED (δ), RECOMMENDED (2ND RANK) (ε)

FIG. 34

| | | β (RECOMMENDED PROGRAM) |
|---|---|---|
| c1 | A | |
| | B | ○ |
| | C | ○ |
| | D | ○ |
| c2 | A | |
| | E | ○ |
| | F | |
| | G | |
| | H | ○ |
| c3 | I | ○ |
| | J | ○ |
| | K | |
| | L | |
| | COMMUNITY RESERVATION RATE | 2/4= 0.5 |
| c4 | M | ○ |
| | N | |
| | P | |
| | COMMUNITY RESERVATION RATE | 1/3= 0.3 |

PROGRAM RECOMMENDATION SYSTEM, PROGRAM VIEW TERMINAL, PROGRAM VIEW PROGRAM, PROGRAM VIEW METHOD, PROGRAM RECOMMENDATION SERVER, PROGRAM RECOMMENDATION PROGRAM, AND PROGRAM RECOMMENDATION METHOD

TECHNICAL FIELD

The present invention relates to a program recommendation system, a program recommendation server, a program recommendation program, and a program recommendation method for storing user manipulation information on e.g. program viewing, program recording, recorded program reproduction, recorded program deleting, and program recording reservation to recommend a program to a user based on collaborative filtering. The present invention also relates to a program viewing terminal, a program viewing program, and a program viewing method for allowing a user to record or reproduce a received program.

BACKGROUND ART

In recent years, the number of channels selectable by a user is spectacularly increased, as versatile TV viewing conditions such as cable TV broadcasting, satellite TV broadcasting, and digital TV broadcasting and IP (Internet Protocol) broadcasting thereof are available as well as conventional TV broadcasting. Under the above circumstances, the user may find it difficult to choose a program most suitable for him or her by zapping.

In order to solve the above drawback, there is known a method comprising: collecting information on programs selected by a user; and ranking the programs to automatically determine a program of a high general preference and to recommend the program to the user.

The above method enables to extract a program of a high general preference. However, not all the users have a general preference. Accordingly, it is impossible to recommend programs most suitable to the users individually, and a cumbersome operation is required for the users to retrieve programs of their preferences by themselves.

In view of the above, there is disclosed a method comprising: storing program selecting statuses of users in the past; administering the program selecting statuses in a server; comparing the program selecting statuses with respect to each of the users; defining the users having similar program selecting statuses as a group; and introducing a recommended program to the users based on the program selecting statuses in the group (see e.g. patent document 1).

There is also disclosed a method comprising: acquiring and calculating user information including program viewing log information, device manipulation log information relating to contents recording/reproducing, and user attribute information from multiple users; sorting the users into user groups according to grouping methods; and creating statistics information on a specific user group to introduce a recommended program to the users (see e.g. patent document 2).

In both of the methods, it is possible to extract a recommended program for users in a group by: collecting enormous viewing log information on the users; and grouping the users having identical preferences by a so-called collaborative filtering. The methods enables to provide a system advantageous to the users, without requesting the users a cumbersome operation to select programs of their preferences.

However, in the case where the above methods are used in the following condition, recommended program information provided by the above methods may be completely useless.

As one case, there is a program viewed by most of the users such as a sports program to be broadcast once in several years, or a music program to be broadcast once a year, irrespective of preferences of individual users. In this case, even if the users are grouped according to preference patterns, substantially an identical recommended program is extracted in any of the groups. In this condition, the grouping according to preference patterns of users is useless. A program which is expected to be viewed by most of the users can be easily selected by the users themselves, without using a system for extracting a recommended program. In this sense, the system is useless.

As another case, it is impossible to recommend a specific news or a specific scene in a program such as a news program. Even if a specific program is recommended, it is impossible for the users to determine which scene in the program is recommended. Consequently, the users are required to view the entirety of the program to determine the scene of their preference, which is time consuming.

Patent document 1: JP 2001-298677A
Patent document 2: JP2005-33600A

DISCLOSURE OF THE INVENTION

In view of the above, it is an object of the invention to provide a program recommendation system, a program viewing terminal, a program viewing program, a program viewing method, a program recommendation server, a program recommendation program, and a program recommendation method that enable to eliminate a program of a high general preference, and recommend a program customized to a specific user's preference.

A program recommendation system according to an aspect of the invention includes: a program viewing terminal for allowing a user to view a received program; and a program recommendation server communicatively connected to the program viewing terminal via a network, and adapted for acquiring manipulation information representing manipulation of the user with respect to the program from the program viewing terminal to create recommended information relating to a program matching with a preference of the user depending on the manipulation information. The program viewing terminal includes: a manipulation accepting section for accepting input of the manipulation information; and a manipulation information transmitting section for transmitting the manipulation information accepted by the manipulation accepting section to the program recommendation server. The program recommendation server includes: a manipulation information receiving section for receiving the manipulation information transmitted by the manipulation information transmitting section; a manipulation information storing section for storing the manipulation information received by the manipulation information receiving section with respect to each of the users; a first grouping section for defining the user as a first group, based on the manipulation information received by the manipulation information receiving section, and the manipulation information stored in the manipulation information storing section with respect to each of the users; a second grouping section for defining the user as a second group, the second group including the first group defined by the first grouping section; a recommended information generating section for generating the recommended information customized to the first group, based on an aggregate calculation result of the manipulation information of the users belonging to the first group defined by the first grouping section, and an aggregate calculation result of the manipulation information of the users belonging to the second group defined by the second grouping section; and a recommended information transmitting section for transmitting the recommended information generated by the recommended information generating section to the program viewing terminal. The program viewing terminal further includes: a recommended information receiving section for receiving the recommended information transmitted by the recommended information transmitting section; and a program controlling section for performing at least one of a selecting operation, a recording operation, a reproducing operation, and a deleting operation of a program, based on the recommended information received by the recommended information receiving section.

A program viewing terminal according to another aspect of the invention includes: a program receiving section for receiving a program included in a broadcast wave or communication data; a manipulation accepting section for accepting input of manipulation information representing manipulation of each of users with respect to the program received by the program receiving section; a manipulation information transmitting section for transmitting the manipulation information accepted by the manipulation accepting section to a program recommendation server communicatively connected to the program viewing terminal via a network, and adapted for creating recommended information relating to a program matching with a preference of the user depending on the manipulation information; a recommended information receiving section for receiving the recommended information transmitted by the program recommendation server; and a program controlling section for performing at least one of a selecting operation, a recording operation, a reproducing operation, and a deleting operation of a program, based on the recommended information received by the recommended information receiving section.

A program viewing program according to yet another aspect of the invention causes a computer to function as: a program receiving section for receiving a program included in a broadcast wave or communication data; a manipulation accepting section for accepting input of manipulation information representing manipulation of a user with respect to the program received by the program receiving section; a manipulation information transmitting section for transmitting the manipulation information accepted by the manipulation accepting section to a program recommendation server communicatively connected via a network, and adapted for creating recommended information relating to a program matching with a preference of the user depending on the manipulation information; a recommended information receiving section for receiving the recommended information transmitted by the program recommendation server; and a program controlling section for performing at least one of a selecting operation, a recording operation, a reproducing operation, and a deleting operation of a program, based on the recommended information received by the recommended information receiving section.

A program viewing method according to a further aspect of the invention includes: a program receiving step of receiving a program included in a broadcast wave or communication data; a manipulation accepting step of accepting input of manipulation information representing manipulation of a user with respect to the program received in the program receiving step; a manipulation information transmitting step of transmitting the manipulation information accepted in the manipulation accepting step to a program recommendation server communicatively connected via a network, and adapted for creating recommended information relating to a program matching with a preference of the user depending on the manipulation information; a recommended information receiving step of receiving the recommended information transmitted by the program recommendation server; and a program controlling step of performing at least one of a selecting operation, a recording operation, a reproducing operation, and a deleting operation of a program, based on the recommended information received in the recommended information receiving step.

A program recommendation server according to a further aspect of the invention includes: a manipulation information receiving section for receiving manipulation information representing manipulation of a user with respect to a program transmitted by a program viewing terminal communicatively connected via a network, and adapted to allow the user to view the received program; a manipulation information storing section for storing the manipulation information received by the manipulation information receiving section with respect to each of the users; a first grouping section for defining the user as a first group, based on the manipulation information received by the manipulation information receiving section, and the manipulation information stored in the manipulation information storing section with respect to each of the users; a second grouping section for defining the user as a second group, the second group including the first group defined by the first grouping section; a recommended information generating section for generating the recommended information customized to the first group, based on an aggregate calculation result of the manipulation information of the users belonging to the first group defined by the first grouping section, and an aggregate calculation result of the manipulation information of the users belonging to the second group defined by the second grouping section; and a recommended information transmitting section for transmitting the recommended information generated by the recommended information generating section to the program viewing terminal.

A program recommendation program according to a further aspect of the invention causes a computer to function as: a manipulation information receiving section for receiving manipulation information representing manipulation of a user with respect to a program transmitted by a program viewing terminal communicatively connected via a network, and adapted to allow the user to view the received program; a manipulation information storing section for storing the manipulation information received by the manipulation information receiving section with respect to each of the users; a first grouping section for defining the user as a first group, based on the manipulation information received by the manipulation information receiving section, and the manipulation information stored in the manipulation information storing section with respect to each of the users; a second grouping section for defining the user as a second group, the second group including the first group defined by the first grouping section; a recommended information generating section for generating the recommended information customized to the first group, based on an aggregate calculation result of the manipulation information of the users belonging to the first group defined by the first grouping section, and an aggregate calculation result of the manipulation information of the users belonging to the second group defined by the second grouping section; and a recommended information transmitting section for transmitting the recommended information generated by the recommended information generating section to the program viewing terminal.

A program recommendation method according to a still further aspect of the invention includes: a manipulation information receiving step of receiving manipulation information representing manipulation of a user with respect to a program transmitted by a program viewing terminal communicatively connected via a network, and adapted for allowing the user to view the received program; a manipulation information storing step of storing the manipulation information received in the manipulation information receiving step into a manipulation information storing section with respect to each of the users; a first grouping step of defining the user as a first group, based on the manipulation information received in the manipulation information receiving step, and the manipulation information stored in the manipulation information storing section with respect to each of the users; a second grouping step of defining the user as a second group, the second group including the first group defined in the first grouping step; a recommended information generating step of generating the recommended information customized to the first group, based on an aggregate calculation result of the manipulation information of the users belonging to the first group defined in the first grouping step, and an aggregate calculation result of the manipulation information of the users belonging to the second group defined in the second grouping step; and a recommended information transmitting step of transmitting the recommended information generated by a recommended information generating section to the program viewing terminal.

These and other objects, features and advantages of the present invention will become more apparent upon reading of the following detailed description along with the accompanying drawings.

BRIEF DESCRIPTION OF THE DRAWINGS

FIG. 8A is a diagram showing an example of a data structure on information to be stored in a reserved information DB in the program reservation server.

FIG. 8B is a diagram showing a result of grouping users having reserved information on the program A.

FIG. 8C is a diagram showing reservation rates of programs other than the program A in a group obtained by grouping all the users who reserved the program A.

FIG. 16 is a diagram showing an example of a data structure on marking information in the second embodiment.

FIG. 17 is a diagram showing an example of a data structure on a marking DB in the second embodiment.

FIG. 19 is a diagram showing an example of a data structure on the marking DB in a first applied example of the second embodiment.

FIG. 21 is a diagram showing an example of a data structure on the marking DB in a second applied example of the second embodiment.

FIG. 33 is a diagram for describing a method for extracting a recommended program using a tf·idf value.

FIG. 34 is a diagram showing reservation statuses of users A through P belonging to community groups c1 through c4 with respect to a program $\beta$.

BEST MODE FOR CARRYING OUT THE INVENTION

In the following, embodiments of the invention are described referring to the accompanying drawings. The embodiments are merely examples embodying the invention, and do not limit the technical scope of the invention.

First Embodiment

Figure 1:
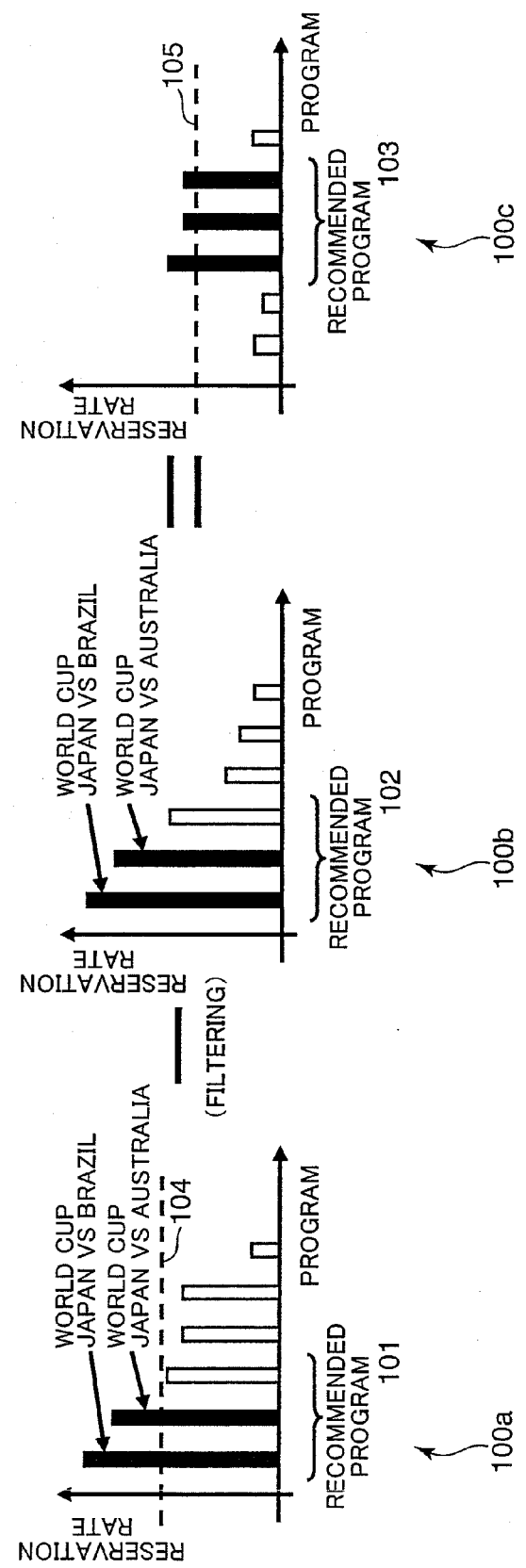
FIG. 1 is a conceptual diagram showing a method for extracting a recommended program in a first embodiment of the invention.

FIG. 1 is a conceptual diagram showing a method for extracting a recommended program in the first embodiment of the invention. To simplify the description, the embodiment is described by a program recording reservation operation, as an example of user manipulation with respect to a program.

A graph 100a in FIG. 1 indicates a reservation rate ranking of the programs other than the program "drama A" by all the users belonging to the group A, after the users who reserved the program "drama A" were grouped. Specifically, the graph 100a indicates a ranking of the reserved programs other than the program "drama A" by the users who reserved the program "drama A". In a normal condition, a program recommendation system enables to provide a user in the group A with upper-ranked programs in the reservation rate ranking of the programs other than the program "drama A", as a recommended program, due to a preference matching that the program "drama A" has been reserved in common, and by collaborative filtering based on the preference of the other users in the group A.

However, in the embodiment, a case is considered that an event such as the World Cup Soccer tournament involving Japan as a participant team is held. In this occasion, multitudes of users may temporarily reserve a specific program having no relation to users' tastes or preferences. In this case, many users including the users who reserved the program "drama A", and the users who prefer other programs such as a news program or a music program, may temporarily reserve the specific program. As a result, specific identical programs may be recommended to the users who view the program "drama A", despite that the users are grouped based on the reserved program. In the graph 100a, solely two World Cup Soccer games, whose reservation rate for generating a recommended program exceeds a threshold value 104, are generated as recommended programs 101.

In view of the above, in the embodiment, not only the group A of the users who reserved the program "drama A", but also the group B including the users of the group A are extracted, and a reservation rate ranking of the group B is generated (see a graph 100b in FIG. 1). The group B may be any group, as far as all the users belonging to the group A are included. In this embodiment, all the users utilizing the program recommendation system are defined as the group B to reduce the processing load.

In the above arrangement, the program recommendation system is operable to generate both the reservation rate ranking (see the graph 100a in FIG. 1) of the group A who reserved the program "drama A", and the reservation rate ranking (see the graph 100b in FIG. 1) of the group B constituted of all the users. Then, a reservation rate ranking (see a graph 100c in FIG. 1) customized to the group A is generated by subtracting the reservation rate ranking of the group B from the reservation rate ranking of the group A. In this embodiment, a reservation rate is defined as each of the reservation rate rankings, in place of the number of reservations of programs, because the number of users belonging to the group A is different from the number of users belonging to the group B, and performing a computation based on the reservation rate is equivalent to performing an operation of normalizing the number of reservations with the number of users belonging to each of the groups. Also, as shown in the graph 100c, after the subtracting operation, threshold judgment is made with respect to the reservation rate ranking customized to the group A with use of a threshold value 105, and programs whose reservation rate exceeds the threshold value 105 are recommended as recommended programs 103. The above arrangement enables to provide the recommended programs 103 as recommended programs customized to the group A.

Use of the subtracting operation is advantageous in lowering the reservation rate of each of the programs by the group A, based on the reservation rate of programs generally reserved by the total users, and extracting a program particularly preferred by the users belonging to the group A, in place of a program viewed in general.

The group A corresponds to the first group in the claimed invention, and the group B corresponds to the second group in the claimed invention.

Figure 2:
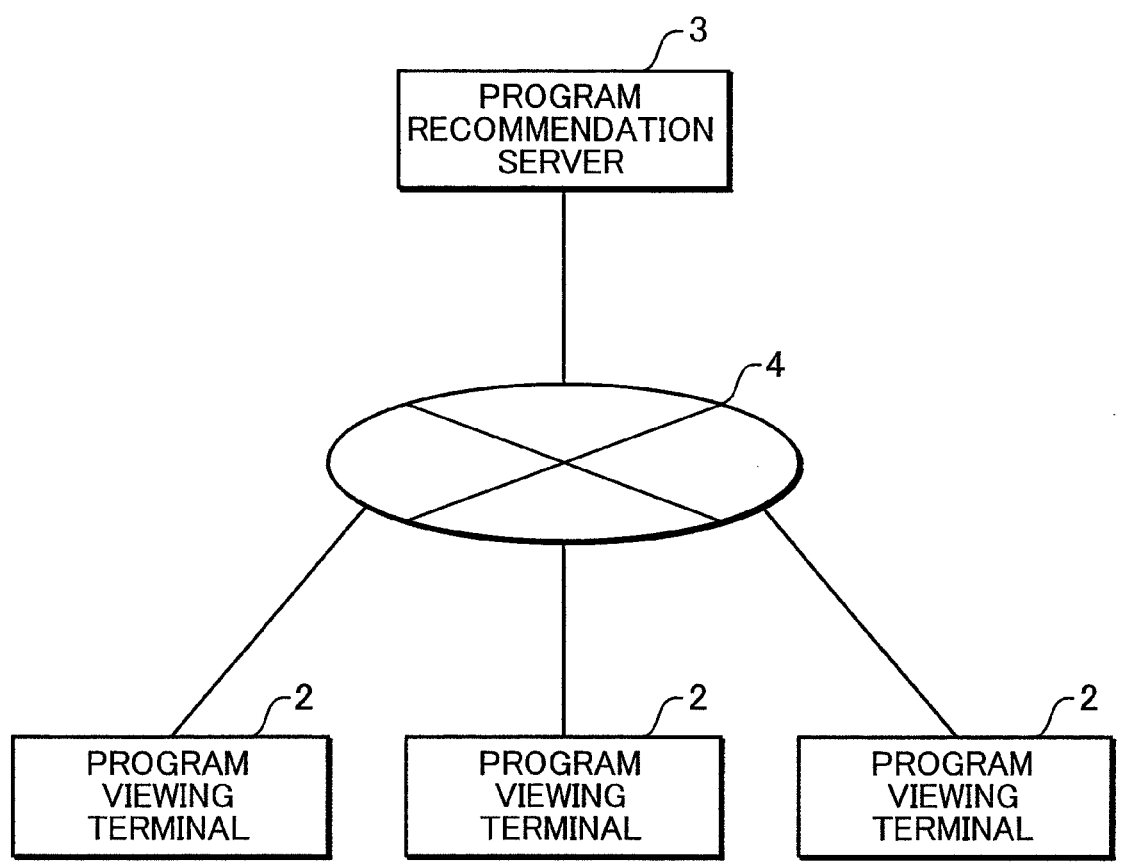
FIG. 2 is a block diagram showing an entire arrangement of a program recommendation system in the first embodiment.

FIG. 2 is a block diagram showing an entire arrangement of a program recommendation system in accordance with the first embodiment. The program recommendation system includes program viewing terminals 2 such as program recording apparatuses, and a program recommendation server 3. The program viewing terminals 2 and the program recommendation server 3 are communicatively connected to each other via a general-purpose network 4 such as the Internet. As shown in FIG. 2, in ordinary use, the program reservation server 3 is connected to the program viewing terminals 2. However, in the embodiment, to simplify the description, an arrangement that the program recommendation server 3 is connected to a single program viewing terminal 2 is described.

The program viewing terminal 2 allows a user to view a program, record a program, reproduce a recorded program, delete a recorded program, or reserve recording a program by receiving the program from a broadcast wave or an IP network. The program recommendation server 3 is communicatively connected to the program viewing terminal 2 via the network 4, and is operable to acquire manipulation information representing user manipulation with respect to a program, from the program viewing terminal 2, and create recommended information relating to a program matching with the user's preference based on the manipulation information.

Figure 3:
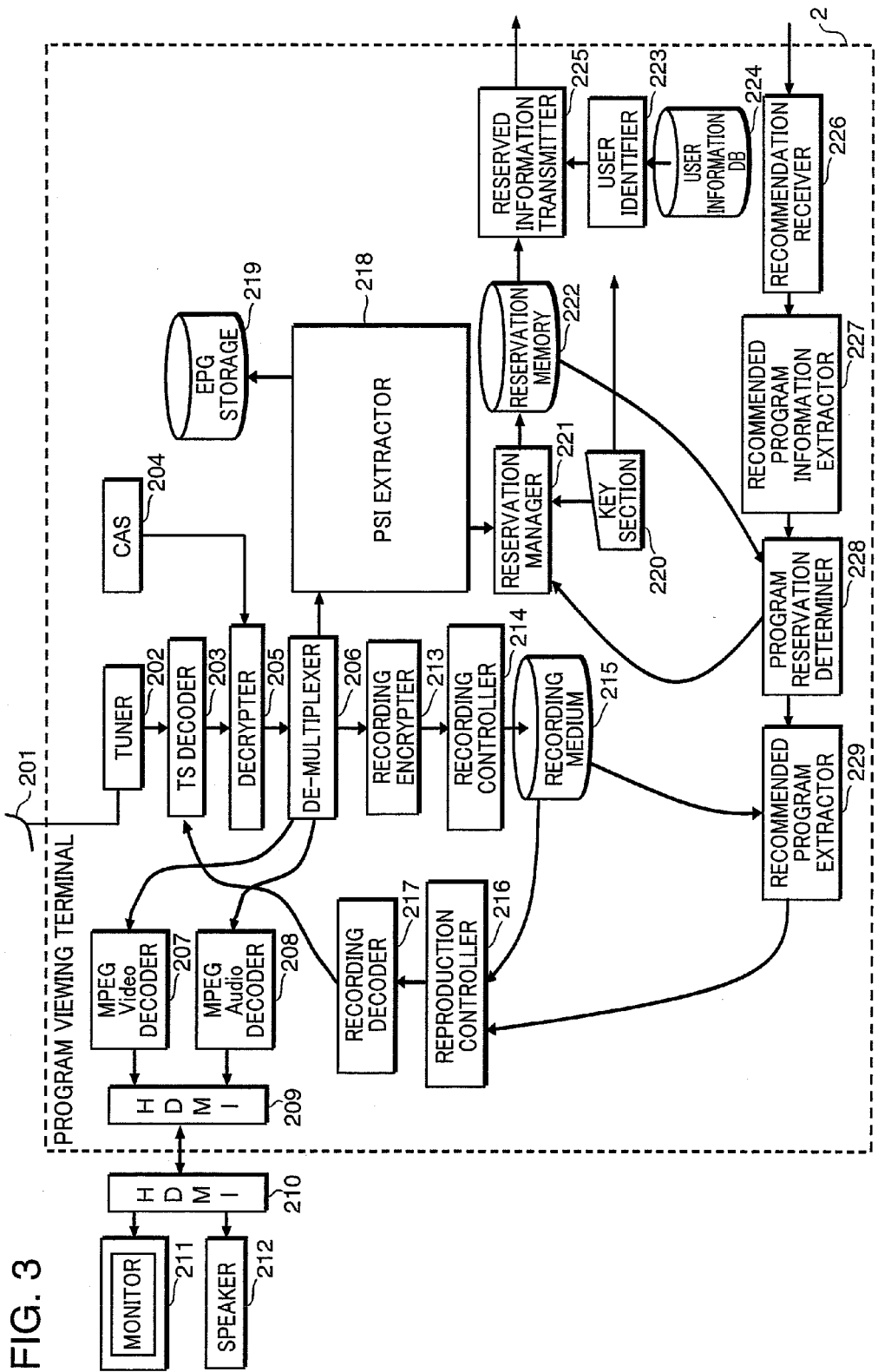
FIG. 3 is a block diagram showing an arrangement of a program viewing terminal in the first embodiment.

First, an arrangement of the program viewing terminal 2 in the program recommendation system in this embodiment is described. FIG. 3 is a block diagram showing an arrangement of the program viewing terminal in the first embodiment.

The program viewing terminal 2 includes an antenna 201, a tuner 202, a TS (transport stream) decoder 203, a CAS (Conditional Access System) 204, a decrypter 205, a demultiplexer 206, an MPEG Video decoder 207, an MPEG Audio decoder 208, an HDMI (High-Definition Multimedia Interface) terminal 209, a recording encrypter 213, a recording controller 214, a recording medium 215, a reproduction controller 216, a recording decoder 217, a PSI (Program Specific Information) extractor 218, an EPG (Electronic Program Guide) storage 219, a key section 220, a reservation manager 221, a reservation memory 222, a user identifier 223, a user information DB (database) 224, a reserved information transmitter 225, a recommendation receiver 226, a recommended program information extractor 227, a program reservation determiner 228, and a recommended program extractor 229.

The tuner 202 is operable to receive a broadcast wave of a predetermined channel from a broadcast wave such as a terrestrial digital broadcast or a BS digital broadcast, and output the received broadcast wave to the TS decoder 203. The TS decoder 203 is operable to demodulate the received broadcast wave in a general transport stream format, and output the demodulated broadcast wave to the decrypter 205.

The CAS 204 is a general Conditional Access System, and is operable to read out encryption key information from an IC card recorded with user registration information and an encryption key on a program, and output the encryption key information to the decrypter 205.

The decrypter 205 is operable to decode an encrypted broadcast signal which has been subjected to demodulation by the TS decoder 203, with use of the encryption key from the CAS 204, decrypt the encrypted program information, and output the decryption result to the de-multiplexer 206.

The de-multiplexer 206 is operable to de-multiplex the multiplexed program information. The program information includes at least video information, audio information, and program administration information in a multiplexed manner. After the de-multiplexing, the video information is outputted to the MPEG Video decoder 207, the audio information is outputted to the MPEG Audio decoder 208, and the program administration information is outputted to the PSI extractor 218.

The MPEG Video decoder 207 is operable to demodulate the video information inputted from the de-multiplexer 206, convert the demodulated video information into video data, and output the video data to the HDMI terminal 209. The MPEG Audio decoder 208 is operable to demodulate the audio information inputted from the de-multiplexer 206, convert the demodulated audio information into audio data, and output the audio data to the HDMI terminal 209. The HDMI terminal 209 is connected to an external HDMI terminal 210 via an HDMI cable. The HDMI terminal 210 is connected to a monitor 211 and a speaker 212.

The HDMI terminal 209, 210 is a general interface for use in transmitting/receiving video information and audio information, and is operable to authenticate the program viewing terminal 2, the monitor 211, and the speaker 212 with each other, share an encryption key, encrypt video data or audio data by the shared encryption key, and output the encrypted data to the monitor 211 or the speaker 212.

The monitor 211 is a general device for displaying video information of a program, and is operable to decode the encrypted video data received by the HDMI terminal 210, and output the decoded video data of a program. The speaker 212 is a general device for outputting audio information of program, and is operable to decode the encrypted audio data received by the HDMI terminal 210, and output the encrypted audio data of a program.

The recording encrypter 213 performs an encryption operation to record received program information into a recording medium. The recording encrypter 213 is operable to encrypt the program information inputted from the de-multiplexer 206, and output the encryption result to the recording controller 214. Specifically, the recording encrypter 213 performs an encryption operation peculiar to a recording medium for recording program information. For instance, in the case where the recording medium is DVD-RAM, CPRM (Content Protection for Rewritable Media) is used, and in the case where the recording medium is Blu-ray disc or HD-DVD, AACS (Advanced Access Content System) is used.

The recording controller 214 controls recording program information encrypted by the recording encrypter 213 into a recording medium. The recording controller 214 is operable to record program information into a recording medium by performing a modulating operation or an error correction coding operation peculiar to the recording medium.

The recording medium 215 is a computer-readable recording medium for recording program information. Examples of the recording medium 215 are a magnetic recording disk such as a hard disk, an optical disc such as a DVD or a Blu-ray disc, a semiconductor memory such as an SD card, and a magnetooptical recording medium such as an MO/MD. A program viewing program is recorded in the recording medium 215, and is executed by being read out from the recording medium 215 by a CPU (central processing unit) or a like device.

The reproduction controller 216 is operable to read out the program information recorded in the recording medium 215. Generally, the recording controller 214, the recording medium 215, and the reproduction controller 216 constitute a drive system.

The recording decoder 217 performs a decoding operation corresponding to an encryption operation to be performed by the recording encrypter 213. The recording decoder 217 is operable to decode the encrypted program information recorded in the recording medium 215, and output the decoded program information to the TS decoder 203. An operation of reproducing the program information outputted to the TS decoder 203 is substantially the same as the operation of reproducing a program received by the antenna 201.

The PSI extractor 218 is operable to extract a PSI (Program Specific Information) from the program administration information extracted by the de-multiplexer 206. The PSI primarily includes a PMT (Program Map Table), an EIT (Event Information Table), and a TOT (Time Offset Table).

The PMT stores therein each of packet identification information such as images or sounds included in a program. In this arrangement, as long as packet identification information such as images or sounds are obtainable from the PMT, a program can be reproduced by extracting packets attached with the packet identification information.

The EIT includes information relating to a program such as the name of a program, a broadcast date of a program, and broadcast contents of a program. The EPG (Electronic Program Guide) is created primarily with use of the information in the EIT.

The EPG storage 219 is operable to create EPG information by using the EIT in the PSI extracted by the PSI extractor 218, and store the EPG information. The key section 220 is operable to accept input from a user, and is constituted of a remote controller and a front panel.

The reservation manager 221 is operable to accept a program whose recording is reserved in accordance with a command to be inputted by using the key section 220, and create reserved program information. The reserved program information includes program identification information for identifying a program. The reserved program information is created by using the EPG information stored in the EPG storage 219. The reservation memory 222 is constituted of a memory for accumulating the reserved program information created by the reservation manager 221. The reserved program information may include a broadcast date, channel information, and broadcast station identification information concerning a program, in place of the program identification information. In other words, a program can be identified based on a broadcast date, channel information, and broadcast station identification information concerning a program.

The user identifier 223 is operable to identify a user using the program viewing terminal 2. The user identifier 223 is operable to identify a user using the program viewing terminal 2, based on user information to be inputted by using the key section 220.

The user information DB 224 is a database in which user information of all the users using the program viewing terminal 2 is registered. The user identifier 223 is operable to identify a user based on user information to be inputted by using the key section 220, and user information pre-stored in the user information DB 224. The user identifier 223 is operable to output user information of a user currently using the program viewing terminal 2 to the reserved information transmitter 225, in the case where user authentication is successful.

The reserved information transmitter 225 is a general network interface, and is operable to transmit reserved information including reserved program information stored in the reservation memory 222, and user information inputted from the user identifier 223 to the program recommendation server 3, after a network with the program reservation server to be connected via the general-purpose network 4 is established.

The reservation memory 222 is operable to store information on a user who reserved a program in association with the user identifier 223, and administer reserved program information which has been transmitted to the program recommendation server 3 by the reserved information transmitter 225, and non-transmitted reserved program information in a discriminative manner.

The recommendation receiver 226 is operable to receive recommended information relating to a program to be recommended by the program recommendation server 3 via the general-purpose network 4. The recommended program information extractor 227 is operable to extract recommended program information from the recommended information received by the recommendation receiver 226. The recommended program information is information capable of uniquely identifying a recommended program. For instance, the recommended program information may include program identification information for identifying a program; or a broadcast date, channel information, and broadcast station identification information for identifying a broadcast station, concerning a recommended program. The extracted recommended program information is outputted to the program reservation determiner 228.

The recommended information includes recommended program information and popular program information. The recommended program information is information representing a program customized to a preference of a user using the program viewing terminal 2. The popular program information is information representing a program popular to all the users.

The program reservation determiner 228 judges whether a recommended program represented by the recommended program information is a program broadcast in the past. Specifically, in the case where the broadcast date of the recommended program is earlier than the current date, the program reservation determiner 228 determines that the recommended program is a program broadcast in the past. In the case where it is judged that the recommended program is not a program which has been broadcast in the past, the program reservation determiner 228 judges whether the recommended program has already been reserved, based on the reserved program information stored in the reservation memory 22, and the recommended program information inputted from the recommended program information extractor 227.

In the case where it is judged that the recommended program has not been reserved, the program reservation determiner 228 outputs the recommended program information to the reservation manager 221 so that the reservation manger 221 performs a reservation operation corresponding to the recommended program information. In the case where it is judged that the recommended program has already been reserved, the program reservation determiner 228 notifies the user that the recommended program has already been reserved, and terminates the operation. In the case where it is judged that the recommended program represented by the recommended program information is a program broadcast in the past, the program reservation determiner 228 outputs the recommended program information to the recommended program extractor 229.

The recommended program extractor 229 judges whether the program designated by the recommended program information is recorded in the recording medium 215. If it is judged that the program designated by the recommended program information is not recorded in the recording medium 215, the recommended program extractor 229 notifies the user that the recommended program is not recorded, and terminates the operation. If it is judged that the program designated by the recommended program information is recorded in the recording medium 215, the recommended program extractor 229 notifies the user that the recommended program is recorded in the recording medium 215, and prompts the user to reproduce the recorded program. In the case where the user has selected reproducing the recorded program by using the key section 220, the reproduction controller 216 calls up the program information represented by the recommended program information from the recording medium 215, and reproduces the program.

The recommended program extractor 229 judges whether the program designated by the recommended program information is recorded in the recording medium 215, based on the program identification information for identifying a recommended program; or based on a broadcast date, channel information, and broadcast station identification information concerning a recommended program, which is included in the recommended program information provided from the program recommendation server 3.

Figure 4:
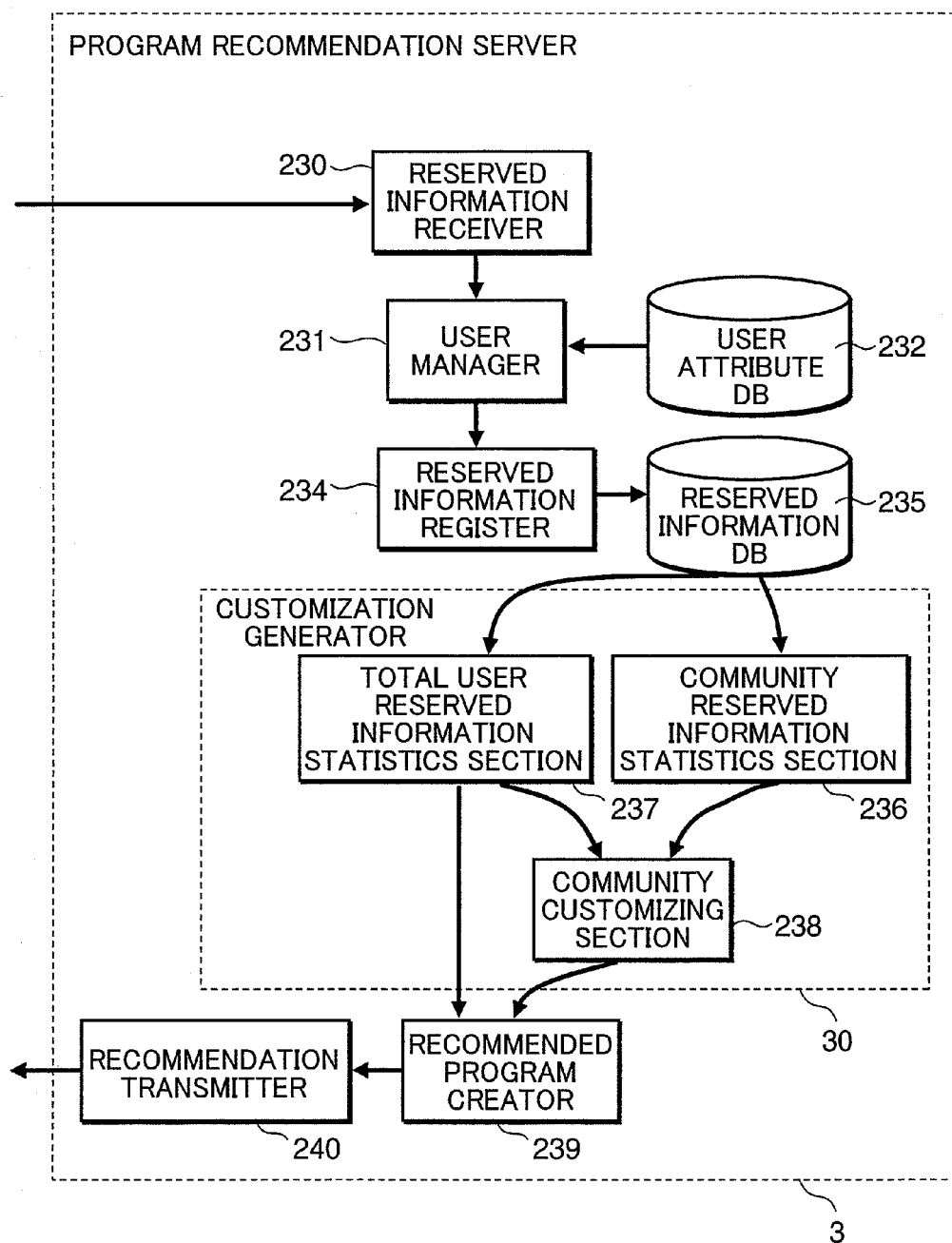
FIG. 4 is a diagram showing an arrangement of a program recommendation server in the first embodiment.

Next, an arrangement of the program recommendation server 3 in the program recommendation system in this embodiment is described. FIG. 4 is a diagram showing the arrangement of the program recommendation server in the first embodiment.

The program recommendation server 3 includes a reserved information receiver 230, a user manager 231, a user attribute DB (database) 232, a reserved information register 234, a reserved information DB (database) 235, a customization generator 30, a recommended program creator 239, and a recommendation transmitter 240. The customization generator 30 in the program recommendation server 3 is constituted of a community reserved information statistics section 236, a total user reserved information statistics section 237, and a community customizing section 238.

The reserved information receiver 230 is operable to receive reserved information including reserved program information on a program reserved by each of the users, and user information for identifying the users who reserved the program, from the reserved information transmitters 225 in the program viewing terminals 2 connected to the general-purpose network 4. The reserved program information includes program identification information capable of uniquely identifying a reserved program; or a broadcast date, channel information, and broadcast station identification information concerning a reserved program. The received reserved information is outputted to the user manager 231.

The user attribute DB 232 is operable to administer user information of a registered user, and, as required, user attribute information such as the name, the sex, and the address/telephone number of a user; the name of the manufacturer/model of a program viewing terminal; the resolution of a monitor to be connected; and the network ID of a program viewing terminal, as a user registration list. A user performs a user registration in advance with respect to the program reservation server 3 for program recommendation. The user registration comprises: notifying user registration information such as setting the user name, and notification of the address/telephone number of a user to the program recommendation server 3; and generating user information, notifying the user information to the user, and storing/administering user attribute information notified from the user, in correlation to the user information generated in the user attribute DB 232 by the program recommendation server 3.

The user manager 231 is operable to judge whether the user specified by the received user information coincides with a user registered in the program recommendation server 3. The user manager 231 is operable to retrieve user information coincident with the received user information from the user registration list stored in the user attribute DB 232. In the case where it is judged that the received user information has been registered in the user attribute DB 232, the user manager 231 judges that the user specified by the received user information is a user registered in the program recommendation server 3, and continues the operation.

If, on the other hand, it is judged that the received user information is not registered in the user attribute DB 232, the user manager 231 judges that the user specified by the received user information is not a user registered in the program recommendation server 3, transmits an error message indicating that the user specified by the received user information is not a registered user to the program viewing terminal 2 used by the user, and suspends the operation thereafter. Upon receiving the error message, the program viewing terminal 2 causes the monitor 211 to display the error message.

In the case where the user manager 231 judges that the user specified by the received user information coincides with a user registered in the program recommendation server 3, the reserved information register 234 stores the reserved program information of each of the users received by the reserved information receiver 230 into the reserved information DB 235 in correlation to the received user information. The reserved information DB 235 is a database for storing reserved program information transmitted from the program viewing terminal 2 in correlation to the user information.

The community reserved information statistics section 236 is operable to define all the users having reserved program information identical to the reserved program information received by the reserved information receiver 230 as a community group, based on the reserved program information received by the reserved information receiver 230. The community reserved information statistics section 236 is also operable to generate a ranking by calculating reserved program information, other than the reserved program information of all the users belonging to the community group with respect to each of the programs; and calculate a reservation rate ranking of the programs within the community group by normalizing the ranking by the number of all the users belonging to the community group. The community reserved information statistics section 236 is operable to output the normalized ranking (reservation rate ranking) to the community customizing section 238.

Unlike the community reserved information statistics section 236 for defining all the users having the reserved program information received by the reserved information receiver 230, as a community group, the total user reserved information statistics section 237 is operable to define all the users registered in the user attribute DB 232 i.e. all the users registered in the program recommendation server 3, as a total user group including the community group. After all the users registered in the program recommendation server 3 are defined as a total user group, the total user reserved information statistics section 237 is operable to create a reservation rate ranking of the programs by performing a statistical operation with respect to reserved program information of all the users. Specifically, the total user reserved information statistics section 237 is operable to generate a ranking by calculating reserved program information of all the registered users with respect to each of the programs, and calculate a reservation rate ranking of the programs within the group constituted of all the registered users by normalizing the ranking by the number of all the registered users. The created reservation rate ranking is outputted to the community customizing section 238 and the recommended program creator 239.

The community customizing section 238 is operable to create a reservation rate ranking customized to the community group defined by the community reserved information statistics section 236, by subtracting the reservation rate ranking calculated by the total user reserved information statistics section 237 from the reservation rate ranking calculated by the community reserved information statistics section 236; and outputs the reservation rate ranking to the recommended program creator 239. The ranking subtracting operation is performed by subtracting the reservation rate of each of the programs with respect to identical programs.

The recommended program creator 239 is operable to extract a program whose reservation rate is higher than a predetermined threshold value, as a recommended program, based on the reservation rate ranking created by the community customizing section 238; and create recommended program information including program identification information for identifying the recommended program; or a broadcast date of the recommended program, channel information of the recommended program to be broadcast, and broadcast station identification information for identifying a broadcast station for broadcasting the recommended program. Thus, the recommended program creator 239 is operable to create the recommended program information customized to the community group.

In this embodiment, a program whose reservation rate is higher than the predetermined threshold value is extracted as a recommended program. The invention is not limited to the above. Alternatively, a predetermined number of upper-ranked programs in the reservation rate ranking generated by the community customizing section 238 may be extracted as recommendation programs.

The recommended program creator 239 is operable to extract a program whose reservation rate is higher than the predetermined threshold value, as a popular program, based on the reservation rate ranking generated by the total user reserved information statistics section 237; and create popular program information including program identification information for identifying the popular program; or a broadcast date of the popular program, channel information of the popular program to be broadcast, and broadcast station identification information for identifying a broadcast station for broadcasting the popular program.

In this embodiment, a program whose reservation rate is higher than the predetermined threshold value is extracted as a popular program. The invention is not limited to the above. Alternatively, a predetermined number of upper-ranked programs in the reservation rate ranking generated by the total user reserved information statistics section 237 may be extracted as popular programs.

The recommendation transmitter 240 is operable to transmit the recommended information including the recommended program information and the popular program information created by the recommended program creator 239 to the program viewing terminal 2.

The program recommendation server 3 has a reproduction controller (not shown) for reading out a program and data from a computer-readable recording medium. Examples of the recording medium are a magnetic recording disk such as a hard disk, an optical disc such as a DVD and a Blu-ray disc, a semiconductor memory such as an SD card, and a magnetooptical recording medium such as an MO/MD. A program viewing program is recorded in the recording medium, and is executed by being read out from the recording medium by a CPU (central processing unit) or a like device.

In the following, an operation to be performed by the program recommendation system in the embodiment is described. For instance, a user A reserves a program A by the program viewing terminal 2 owned by the user A. The program viewing terminal 2 is operable to transmit user information for identifying the user A, and reserved program information for specifying the program A to the program recommendation server 3. The reserved information receiver 230 in the program recommendation server 3 is operable to receive, from the program viewing terminal 2 owned by the user A, the user information for identifying the user A, and the reserved program information for specifying the program A. The user manager 231 is operable to judge whether the received user information is stored in the user attribute DB 232. If it is judged that the received user information is stored in the user attribute DB 232, the user manager 231 continues the operation, assuming that the user A is a user registered in the program recommendation server 3.

The reserved information register 234 is operable to register the reserved program information for specifying the program A in the reserved information DB 235 in correlation to the user information for identifying the user A. The community reserved information statistics section 236 is operable to extract all the users correlated to the reserved program information for specifying the program A from the reserved information DB 235, and define the extracted users as a community group. Then, the community reserved information statistics section 236 is operable to perform a statistical operation with respect to the programs other than the program A in the community group. Then, the community reserved information statistics section 236 is operable to calculate reservation rates of the programs other than the program A in the community group, generate a reservation rate ranking of the programs in the order of higher reservation rate, and output the reservation rate ranking to the community customizing section 238.

The total user reserved information statistics section 237 is operable to extract all the users registered in the user attribute DB 232 in the program reservation server 3 from the reserved information DB 235, and define a total user group including the community group defined by the community reserved information statistics section 236. Then, the total user reserved information statistics section 237 is operable to extract reserved program information correlated to the user information in the total user group from the reserved information DB 235, and perform a statistical operation with respect to the programs other than the program A. Then, the total user reserved information statistics section 237 is operable to calculate reservation rates of the programs other than the program A in the total user group, generate a reservation rate ranking of the programs in the order of higher reservation rate, and output the reservation rate ranking to the community customizing section 238 and the recommended program creator 239.

The community customizing section 238 is operable to subtract the reservation rate ranking of the programs created by the total user reserved information statistics section 237 from the reservation rate ranking of the programs created by the community reserved information statistics section 236. Then, the community customizing section 238 is operable to create a reservation rate ranking of the programs customized to the community group of the user who reserved the program A, and output the reservation rate ranking to the recommended program creator 239.

The recommended program creator 239 is operable to create recommended program information by extracting reserved program information representing a program having a reservation rate higher than a threshold value, or reserved program information representing upper-ranked programs, based on the reservation rate ranking customized to the community group, which has been created by the community customizing section 238. The recommended program creator 239 is also operable to create popular program information by extracting reserved program information representing a program having a reservation rate higher than a threshold value, or reserved program information representing upper-ranked programs, based on the reservation rate ranking generalized to all the registered users, which has been created by the total user reserved information statistics section 237. The recommendation transmitter 240 is operable to output the recommended program information and the popular program information created by the recommended program creator 239 to the program viewing terminal 2 of the user A.

Figure 5:
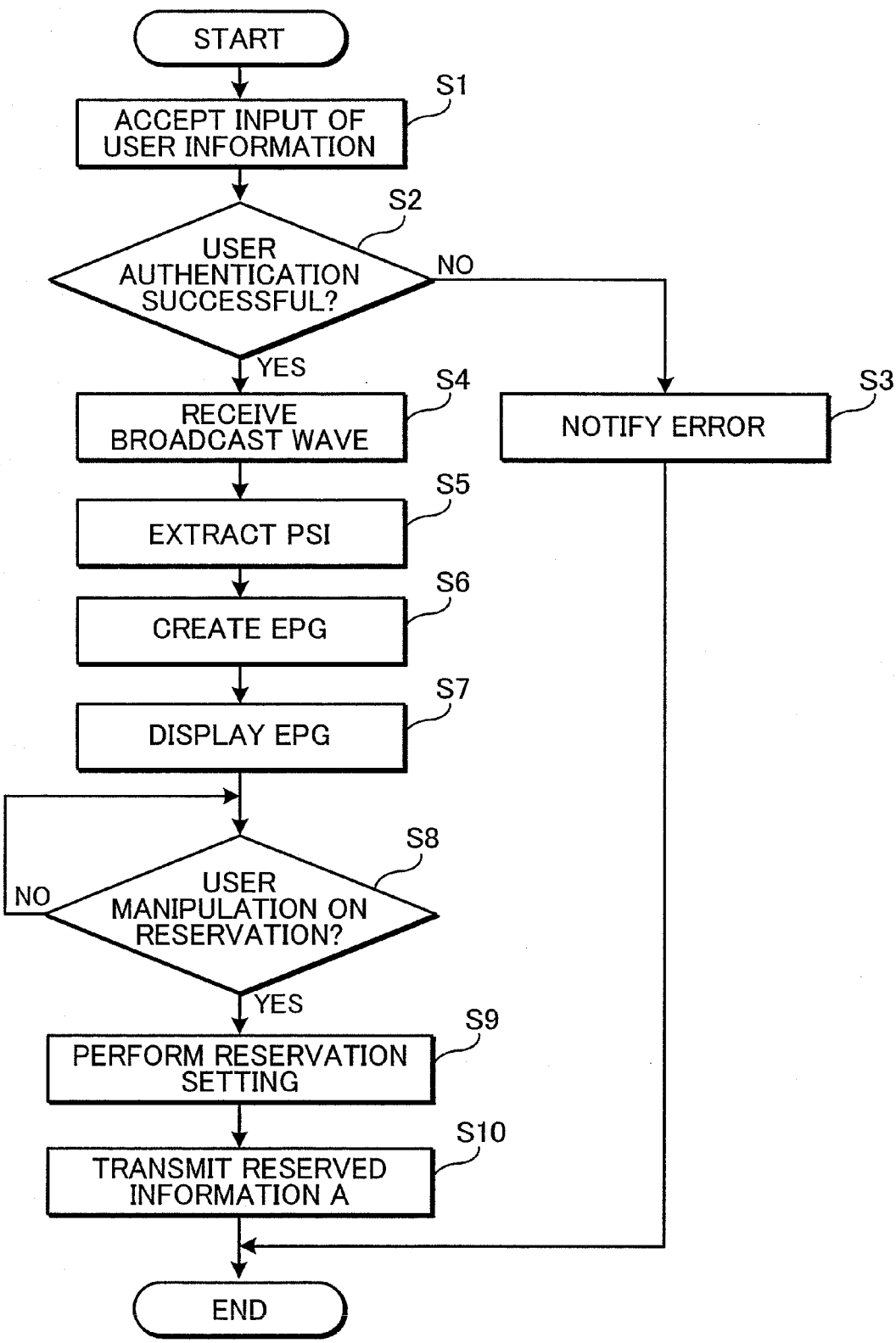
FIG. 5 is a flowchart showing a flow of operation until reserved information is transmitted to the program viewing terminal in the first embodiment.
Figure 6:
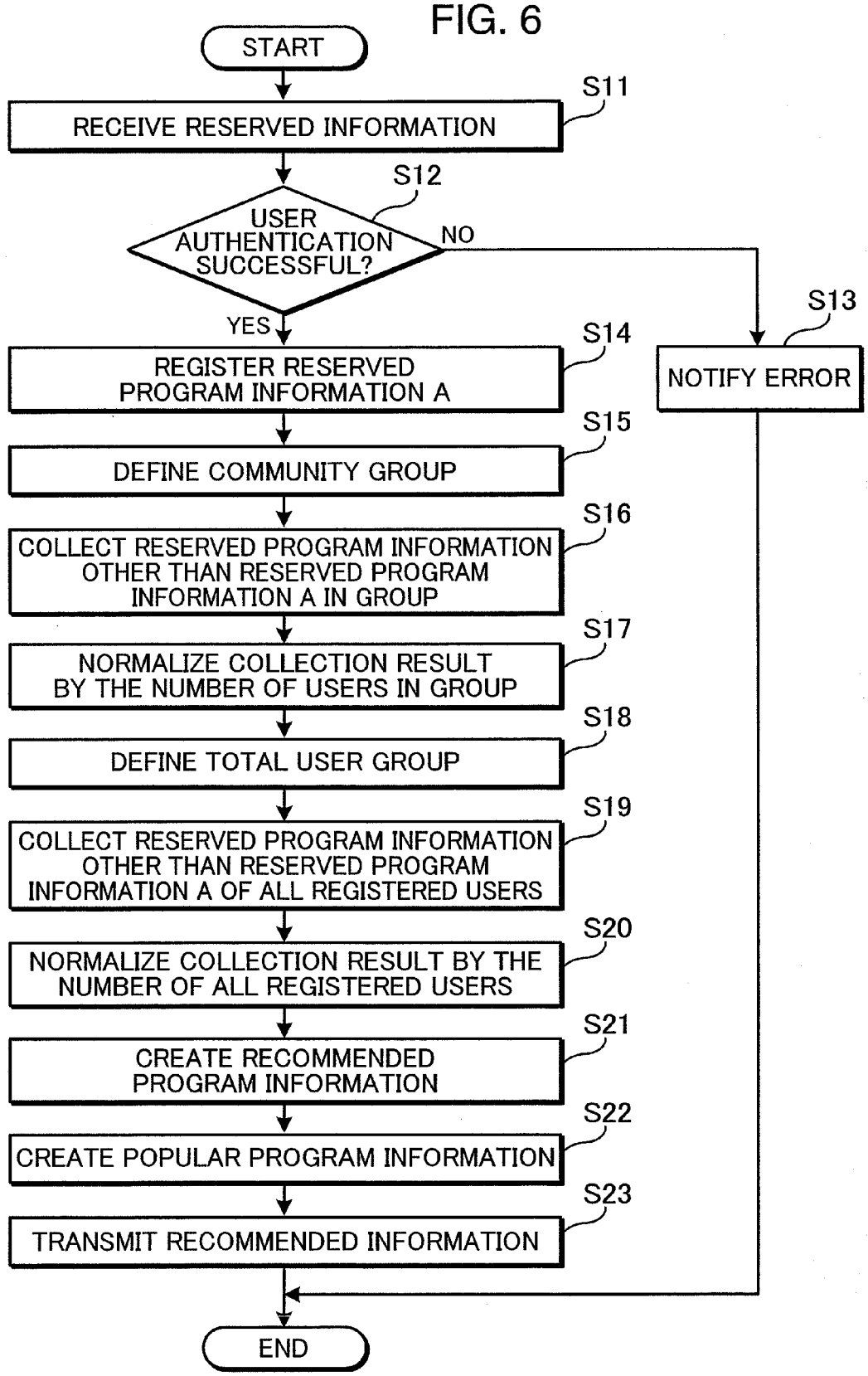
FIG. 6 is a flowchart showing a flow of operation in the program recommendation server in the first embodiment.
Figure 7:
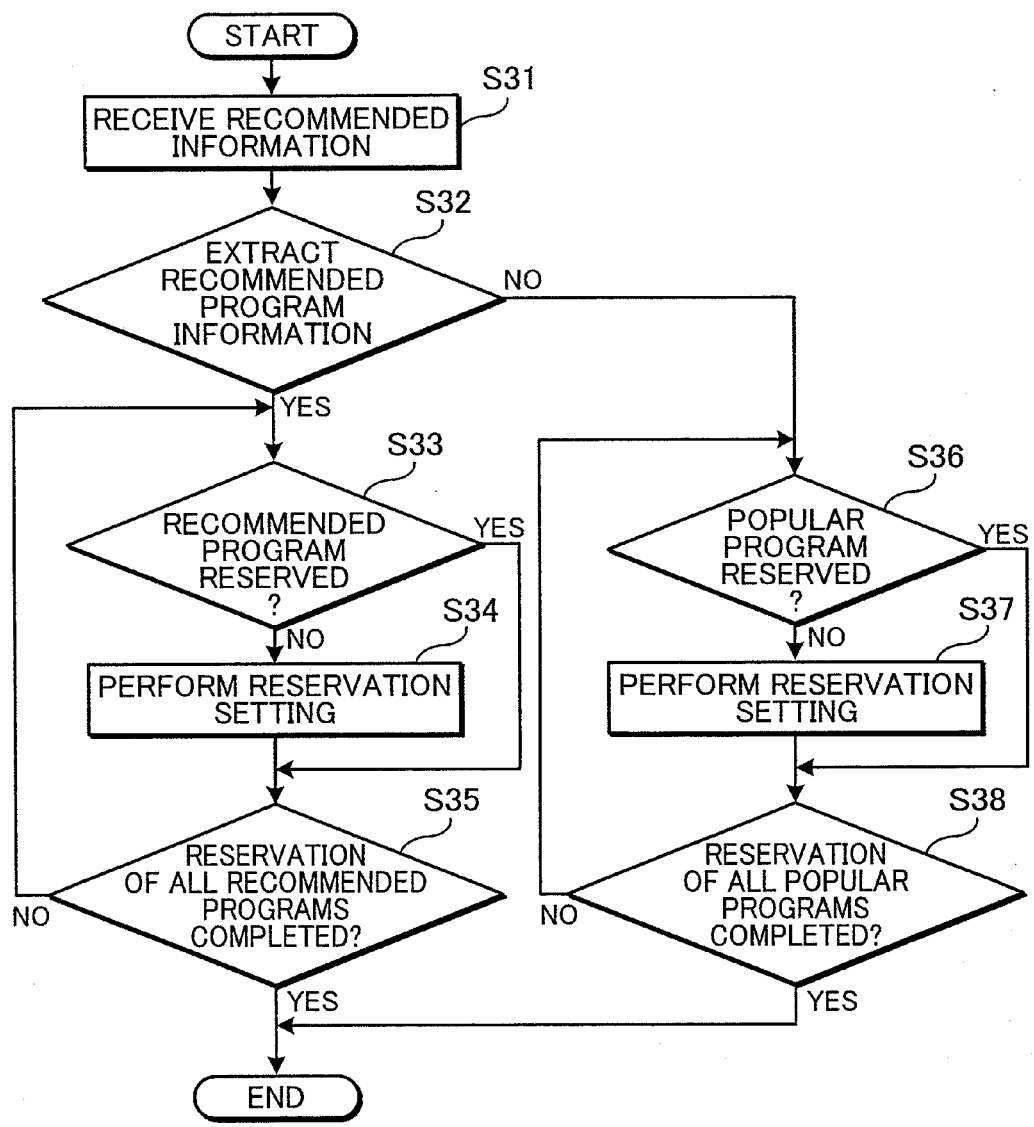
FIG. 7 is a flowchart showing a flow of operation after recommended information is received by the program viewing terminal in the first embodiment.

Next, a flow of operation to be performed by the program recommendation system is described in detail. FIGS. 5 through 7 are flowcharts showing a flow of operation to be performed by the program recommendation system in accordance with the first embodiment. FIG. 5 is a flowchart showing a flow of operation until reserved information is transmitted from the program viewing terminal in accordance with the first embodiment. FIG. 6 is a flowchart showing a flow of operation to be performed by the program recommendation server in accordance with the first embodiment. FIG. 7 is a flowchart showing a flow of operation after recommended information is received by the program viewing terminal in accordance with the first embodiment.

Referring to FIG. 5, first, the key section 220 accepts input of user information by a user and user's log-in to the program viewing terminal 2 (Step S1). Then, the user identifier 223 judges whether user authentication is successful, in other words, the inputted user information coincides with the user information pre-registered in the user information DB 224 (Step S2). If it is judged that the inputted user information is incorrect, and the user manipulating the program viewing terminal 2 is not a registered user (NO in Step S2), the user identifier 223 outputs an error notification to the monitor 211, and suspends the operation thereafter (Step S3).

If, on the other hand, it is judged that the inputted user information is correct, and the user manipulating the program viewing terminal 2 is a registered user (YES in Step S2), the tuner 202 receives a broadcast wave from the antenna 201 (Step S4).

Then, the TS decoder 203 demodulates the broadcast wave received by the tuner 202. Then, the decrypter 205 decrypts the encrypted program information included in the broadcast wave by utilizing a decryption key from the CAS 204. Then, the de-multiplexer 206 de-multiplexes the multiplexed program information into a video signal, an audio signal, and a program control signal. Then, the PSI extractor 218 extracts an PSI included in the program control signal (Step S5).

Then, the PSI extractor 218 creates an EPG of all the channels receivable by the program viewing terminal, based on the extracted PSI, and stores the EPG into the EPG storage 219 (Step S6). Then, the PSI extractor 218 displays the EPG on the monitor 211 in a manner that the user is allowed to select the programs individually (Step S7).

Then, the reservation manager 221 judges whether user manipulation on reservation has been performed (Step S8). The reservation manager 221 accepts the user manipulation on reservation through the EPG displaying the programs in a selectable manner. If it is judged that user manipulation on reservation has not been performed (NO in Step S8), the reservation manager 221 waits until user manipulation on reservation is performed.

If, on the other hand, it is judged that user manipulation on reservation has been performed (YES in Step S8), the reservation manager 221 extracts program identification information for identifying a program to be reserved; or a broadcast date, channel information, and broadcast station identification information concerning a program to be reserved, from the EPG; and stores the extraction result into the reservation memory 222 as reserved program information. Thus, the reservation manager 221 performs reservation setting on a program (Step S9). Hereinafter, in the embodiment, the program on which the reservation setting has been performed in Step S9 is called as the program A.

Upon completion of reservation setting on the program A in Step S9, the reserved information transmitter 225 transmits reserved program information A corresponding to the program A, and user information for identifying the user who reserved the program A to the program recommendation server 3, as reserved information (Step S10).

Subsequently, referring to FIG. 6, the reserved information receiver 230 in the program recommendation server receives the reserved information transmitted from the program viewing terminal 2 (Step S11). Then, the user manager 231 judges whether user authentication is successful, in other words, user information included in the received reserved information coincides with the user information pre-registered in the user attribute DB 232 in the program recommendation server 3 (Step S12). If it is judged that user authentication has failed, and the user manipulating the program viewing terminal 2 is not a registered user (NO in Step S12), the user manager 231 creates an error message indicating that the user manipulating the program viewing terminal 2 is not a registered user, transmits the error message to the program viewing terminal 2, and suspends the operation thereafter (Step S13). Upon receiving the error message, the program viewing terminal 2 outputs, to the monitor 211, an error notification indicating that user authentication has failed.

If, on the other hand, it is judged that user authentication is successful, and the user manipulating the program viewing terminal 2 is a registered user (YES in Step S12), the reserved information register 234 registers the reserved program information A into the reserved information DB 235 by correlating the reserved program information A to the user information received by the reserved information receiver 230 (Step S14).

Then, the reserved information register 234 extracts all the users having the reserved program information A concerning the program A, based on the reserved program information of all the registered users stored in the reserved information DB 235, and defines the extracted users as a community group (Step S15).

Then, the community reserved information statistics section 236 calculates the reserved program information on the programs, other than the program A, which is correlated to the user information of the users in the community group, and generates a ranking of the number of reservations with respect to each of the programs (Step S16).

Then, the community reserved information statistics section 236 generates reservation rates with respect to each of the programs by normalizing the number of reservations with respect to each of the programs by the number of users in the community group, and generates a reservation rate ranking of the programs in the order of higher reservation rate (Step S17).

Then, the total user reserved information statistics section 237 extracts the users registered in the user attribute DB 232 i.e. all the users registered in the program recommendation server 3, and defines all the registered users as a total user group (Step S18). Since the total user group defined in Step S18 is constituted of all the registered users, the total user group includes the community group of the users having the reserved program information on the program A, which is defined in Step S15.

Then, the total user reserved information statistics section 237 calculates reserved program information on the programs, other than the program A, of all the users in the total user group, and creates a ranking of the number of reservations with respect to each of the programs (Step S19).

Then, the total user reserved information statistics section 237 generates a reservation rate with respect to each the programs by normalizing the number of reservations with respect to each of the programs by the number of users in the total user group i.e. the number of all the users registered in the program recommendation server 3, and generates a reservation rate ranking of the programs in the order of higher reservation rate (Step S20).

Then, the community customizing section 238 generates a reservation rate ranking customized to the users who reserved the program A, by subtracting the reservation rate ranking of the programs, other than the program A, of all the users, which has been generated by the total user reserved information statistics section 237, from the reservation rate ranking of the programs, other than the program A, of the users who reserved the program A, which has been generated by the community reserved information statistics section 236, with respect to each of the programs. Then, the recommended program creator 239 generates recommended program information by extracting a program whose reservation rate is higher than a predetermined threshold value, from the reservation rate ranking generated by the community customizing section 238 (Step S21). The recommended program creator 239 may create recommended program information by extracting a certain number of programs from the upper-ranked programs in the reservation rate ranking generated by the community customizing section 238.

Then, the recommended program creator 239 creates popular program information by extracting a program whose reservation rate is higher than a predetermined threshold value, from the reservation rate ranking of all the users, which has been generated by the total user reserved information statistics section 237 (Step S22). The recommended program creator 239 may create popular program information by extracting a certain number of programs from the upper-ranked programs in the reservation rate ranking generated by the community customizing section 238.

Then, the recommendation transmitter 240 transmits the recommended information including the recommended program information and the popular program information created by the recommended program creator 239 to the program viewing terminal 2 (Step S23).

Subsequently, referring to FIG. 7, the recommendation receiver 226 in the program viewing terminal 2 receives the recommended information including the recommended program information and the popular program information transmitted by the recommendation transmitter 240 in the program recommendation server 3 (Step S31).

Then, the recommended program information extractor 227 judges whether recommended program information has been extracted from the recommended information received by the recommendation receiver 226 (Step S32). The recommended program information extractor 227 prompts the user to select one of the recommended program information and the popular program information. In the case where recommended program information has been selected by using the key section 220, the recommended program information is extracted. In the case where popular program information has been selected by using the key section 220, the popular program information is extracted. Alternatively, the program recommendation system may be configured in such a manner that both the recommended program information and the popular program information are extracted. The modification is advantageous in providing more alternatives to the user.

In the case where it is judged that the recommended program information has been selected (YES in Step S32), the program reservation determiner 228 judges whether a reserving operation with respect to the program viewing terminal 2 has been completed by utilizing the program identification information; or the broadcast date, the channel information, and the broadcast station identification information concerning the recommended program, which is included in the recommended program information extracted by the recommended program information extractor 227 (Step S33). For instance, the program reservation determiner 228 judges whether the program identification information included in the recommended program information coincides with the program identification information included in the reserved program information stored in the reservation memory 222.

If it is judged that an operation of reserving a recommended program has not been completed (NO in Step S33), the reservation manager 221 performs reservation setting on the recommended program (Step S34). After completion of reservation setting on the recommended program, or in the case where reservation setting on the recommended program has already been completed (YES in Step S33), the program reservation determiner 228 judges whether reservation setting on all the recommended program information included in the recommended information has been completed (Step S35).

If it is judged that reservation setting on all the recommended program information has not been completed (NO in Step S35), the routine returns to Step S33, and reservation setting on the rest of the recommended program information is repeatedly performed. If it is judged that reservation setting on all the recommended program information has been completed (YES in Step S35), the routine is ended.

If, on the other hand, it is judged that recommended program information has not been extracted, in other words, popular program information has been extracted (NO in Step S32), the program reservation determiner 228 judges whether a reserving operation with respect to the program viewing terminal 2 has been completed by utilizing the program identification information; or the broadcast date, the channel information, and the broadcast station identification information concerning the popular program, which is included in the popular program information extracted by the recommended program information extractor 227 (Step S36). For instance, the program reservation determiner 228 judges whether the program identification information included in the popular program information coincides with the program identification information included in the reserved program information stored in the reservation memory 222.

If it is judged that an operation of reserving a popular program has not been completed (NO in Step S36), the reservation manager 221 performs reservation setting on the popular program (Step S37). After completion of reservation setting on the popular program, or in the case where reservation setting on the popular program has already been completed (YES in Step S36), the program reservation determiner 228 judges whether reservation setting on all the popular program information included in the recommended information has been completed (Step S38).

If it is judged that reservation setting on all the popular program information has not been completed (NO in Step S38), the routine returns to Step S36, and reservation setting on the rest of the popular program information is repeatedly performed. If it is judged that reservation setting on all the popular program information has been completed (YES in Step S38), the routine is ended.

In this embodiment, all the recommended programs transmitted by the program recommendation server 3 are reserved. The invention is not limited to the above. Alternatively, in the case where it is judged that the recommended program is a program broadcast in the past, the recommended program extractor 229 in the program viewing terminal 2 may judge whether the recommended program is recorded in the recording medium 215. In the case where it is judged that the recommended program is recorded in the recording medium 215, the recommended program extractor 229 may output a message prompting the user to reproduce the recorded program to the monitor 211. Some of the recently-developed digital recorders are operable to automatically record a program by searching a keyword from EPG, or record programs of all the channels for 24 hours. In such a circumstance, it is easily conceived that a recommended program is or will be recorded, even if the user intentionally does not perform reservation setting or perform a recording operation. This enables to provide a system for prompting the user to reproduce a program which the user missed viewing in the similar manner as described above.

In the case where a program has already been viewed by the user, there is no need of prompting the user to view the program. In view of this, a flag representing viewing or non-viewing may be set to a program recorded in the recording medium 215, and an operation of prompting the user to reproduce a program may be disabled, in the case where the recommended program has already been viewed by the user.

In the embodiment, the user manipulation has been described by an operation of reserving recording a program. The invention is not limited to the above. Alternatively, the user manipulation may be any operation relating to the user's preference with respect to a program. For instance, the user manipulation may be an operation of reproducing a program, an operation of recording a program, or an operation of deleting a program.

In the case where the user manipulation is an operation of reproducing a program, the program viewing terminal 2 transmits information for identifying a reproduced program to the program recommendation server 3. The reserved information register 234 in the program recommendation server 3 administers the reproduced programs with respect to each of the users. The community reserved information statistics section 236 defines the users who reproduced identical programs as a community group, and generates a reproduction rate ranking of the programs reproduced by the users in the community group. The total user reserved information statistics section 237 defines all the registered users as a total user group, and generates a reproduction rate ranking of the programs reproduced by all the registered users. The community customizing section 238 subtracts the reproduction rate ranking of the programs created by the total user reserved information statistics section 237 from the reproduction rate ranking of the programs created by the community reserved information statistics section 236. Thereby, the community customizing section 238 generates a reproduction rate ranking customized to a user who reproduced a specific program, and the recommended program creator 239 generates recommended program information based on the reproduction rate ranking generated by the community customizing section 238.

In the case where the user manipulation is a recording operation, a similar operation as described above is performed. Specifically, in the case where the user manipulation is an operation of recording a program, the program viewing terminal 2 transmits information for identifying a recorded program to the program recommendation server 3. The reserved information register 234 in the program recommendation server 3 administers the recorded programs with respect to each of the users. The community reserved information statistics section 236 defines the users who recorded identical programs as a community group, and generates a recording rate ranking of the programs recorded by the users in the community group. The total user reserved information statistics section 237 defines all the registered users as a total user group, and generates a recording rate ranking of the programs recorded by all the registered users. The community customizing section 238 subtracts the recording rate ranking of the programs created by the total user reserved information statistics section 237 from the recording rate ranking of the programs created by the community reserved information statistics section 236. Thereby, the community customizing section 238 generates a recording rate ranking customized to a user who recorded a specific program, and the recommended program creator 239 generates recommended program information based on the recording rate ranking generated by the community customizing section 238.

The above idea is applicable to a case where the user manipulation is an operation of deleting a program. In the case where the user manipulation is an operation of deleting a program, the program viewing terminal 2 transmits information for identifying a deleted program to the program recommendation server 3. The reserved information register 234 in the program recommendation server 3 administers deleted programs with respect to each of the users. The community reserved information statistics section 236 defines the users who deleted identical programs as a community group, and generates a deleting rate ranking of the programs deleted by the users in the community group. The total user reserved information statistics section 237 defines all the registered users as a total user group, and generates a deleting rate ranking of the programs deleted by all the registered users. The community customizing section 238 subtracts the deleting rate ranking of the programs created by the total user reserved information statistics section 237 from the deleting rate ranking of the programs created by the community reserved information statistics section 236. Thereby, the community customizing section 238 generates a deleting rate ranking customized to a user who deleted a specific program, and the recommended program creator 239 generates recommended program information based on the deleting rate ranking generated by the community customizing section 238.

Similarly, it is possible to combine the above user manipulations. For instance, the program recommendation system may be operable to calculate reproduced program information, and prompt the user to reserve a program to be broadcast in the future. In the modification, it is possible to create recommended information for prompting the user to reproduce a program by defining the users having identical reserved information as a group, and calculating programs reproduced by the users in the group. Conversely, defining the users having identical reproduced program information as a group, and calculating reserved information within the group enables to automatically perform an operation of reserving a program according to the user's preference, based on reserved information of users who have reproduced identical programs, and accordingly have similar preferences.

Further alternatively, different operations may be combined as user manipulation. For instance, a ranking may be created by calculating programs involving a reproducing operation as user manipulation, and programs involving a recording operation as user manipulation. In the modification, a weight to be applied in data calculating may be changed depending on the different user manipulations. For instance, it is determined that the user's preference is high concerning a program which has been recorded and reproduced, as compared with a program which has been recorded but not reproduced. In view of this, a ranking is created with a weight based on the user's preference. For instance, in the case where only a recording operation has been performed with respect to a specific program, one point is added; in the case where the specific program has been recorded and reproduced, two points is added; and in the case where the specific program has been recorded but deleted, −1 point is added. The above arrangement enables to create a ranking based on the user's preference with high precision.

In this embodiment, manipulation information reflecting the user's preference on a program is calculated with respect to each of the program viewing terminals 2 (each of the users) by the program recommendation server 3; users having similar preferences are grouped; a program on which the user's preference is estimated to be high is recommended by collaborative filtering in the group; and the recommended program is automatically recorded, or the user is prompted to reproduce or delete the recorded program. Thus, the program recommendation system supports the users to view a program. This, however, may be insufficient to solve the problems to be solved by the invention of the specification. In view of this, according to the embodiment, even if there is a dominantly popular program supported by the majority, a recommended program customized to a first group can be generated by: defining the users based on a program with respect to which user manipulation has been performed, as the first group; defining a second group including the first group; and subtracting a ranking of the second group from a ranking of the first group i.e. deleting the dominantly popular program as noise in such a manner that the recommended program information customized to the first group is generated. Thus, the program recommendation system supports the users to view a program of high preference, while avoiding a cumbersome operation such as an operation of retrieving a program of the user's preference.

Next, a data structure of the reserved information DB 235 in the program recommendation system, and a statistical operation to be performed by the community reserved information statistics section 236 are described. FIGS. 8A through 8C are diagrams showing the data structure of the reserved information DB 235 in the first embodiment.

FIG. 8A is a diagram showing an example of a data structure on information to be stored in the reserved information DB 235 in the program reservation server 3. FIG. 8A shows the data structure of the reserved information DB 235, in the case where reserved information indicating that the user A has reserved the program A is received by the reserved information receiver 230 in the program recommendation server 3, and reserved program information 402 on the program A is registered in a list 401 of the user A in the reserved information DB 235 by the reserved information register 234. The reserved information DB 235 has a data structure, wherein user identification information for administering user identification information (user ID) of all the users registered in the program recommendation server is registered in column direction, and reserved program information representing programs whose recording has been reserved by the users is registered in row direction in correspondence to the individual user identification information. The users B, C, and D are registered in the list 403. The users B, C, and D are registered users other than the user A. Reserved program information corresponding to the users B, C, and D is registered in row direction of the individual users.

For instance, reserved program information called the program A, the program C, the program D, and the program E are correlated to the user B. Reserved program information called the program X, the program Y, the program Z, and the program S are correlated to the user C. Reserved program information called the program A, the program B, the program C, and the program E are correlated to the user D.

FIG. 8B is a diagram showing a result of grouping the users having the reserved information on the program A. FIG. 8B shows a result of grouping the users having the reserved information on the program A by the community reserved information statistics section 236. As shown in FIG. 8B, since all the users except for the user C have the reserved information on the program A, the users A, B, and D are defined as one group, except for the user C.

FIG. 8C is a diagram showing reservation rates of the programs other than the program A in the group obtained by grouping all the users who reserved the program A. Specifically, FIG. 8C shows a ranking of reservation frequencies of the programs other than the program A in the group constituted of the users who reserved the program A. In FIG. 8C, the reservation frequency of the program C, except for the program A, by the group of the users who reserved the program A, is the largest, whereas the reservation frequencies of the program B, the program D, and the program E are less.

The reservation rate ranking of programs is normalized by the number of users in the group i.e. three. As a result of normalization, the reservation rate of the program C is 100%, and the reservation rates of the program B, the program D, and the program E are all 67%.

Normalization may be performed by the sum of frequencies in a ranking. In this example, since the users A, B, and D each has three reserved program information other than the program A, the sum of frequencies is nine. Accordingly, the probability of the program C is normalized to 33%, and the probabilities of the program B, the program D, and the program E are normalized to 22%. The normalizing method is advantageous in generating an accurate ranking, because reservation probabilities with respect to each of the programs in the group are calculated, even if the reserved program information of users is different from each other.

Second Embodiment

In this section, the second embodiment of the invention is described. In the first embodiment, user manipulation information is collected with respect to each of the programs by the program recommendation server, and the user is provided with a recommended program by: defining the users as a group, based on user manipulation with respect to identical programs; ranking the programs according to the user's preference in the group; and extracting a recommended program customized to the group. In the second embodiment, the user is provided with a recommended scene or a recommended time zone in a program by calculating user manipulation information with respect to a designated part of a program along a time axis, in place of collecting user manipulation information with respect to each of the programs.

In this embodiment, user manipulation with respect to a designated part of a program along a time axis is described by using user manipulation of marking a scene of the user's preference in a program. A marking operation is user manipulation of attaching a mark to a favorite scene during viewing a broadcast program or during viewing a recorded program. Examples of the marking operation are continuing pressing a predetermined favorite scene button during viewing a favorite scene; inputting a start point of time and an end point of time of a favorite scene; manipulating the button at a start point of time of the favorite scene and designating a duration of a favorite scene; and manipulating the button at the end point of time of the favorite scene and designating a duration of a favorite scene.

In this embodiment, a program marking operation is performed individually by the users by program viewing terminals of the individual users, and marking information and program identification information are transmitted to a program recommendation server. The program recommendation server provides the users with a favorite scene by: defining users who performed a marking operation at identical times, or users having time similarity in marking operation, or users having partially overlapped marking periods as a group; calculating marking information in the group; and generating a recommended scene customized to the group.

Figure 9:
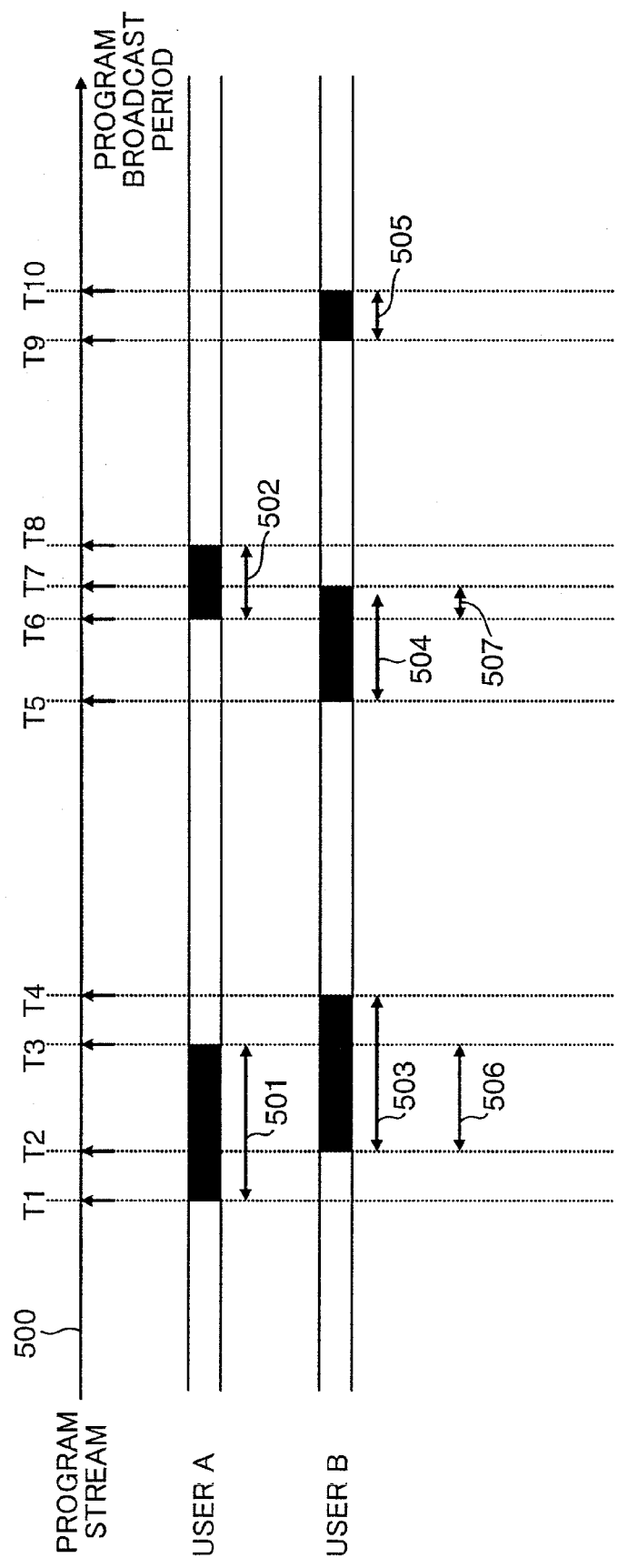
FIG. 9 is a timing chart for describing a marking method and a method for calculating marking information in a second embodiment of the invention.

FIG. 9 is a timing chart for describing a marking method with respect to a specific program selected by the user A and the user B, and a method for calculating marking information.

A program stream 500 shown in FIG. 9 indicates a lapse of time of a broadcast program along a time axis in rightward direction in FIG. 9. The program stream 500 is constituted of sequential frames of a program.

Referring to FIG. 9, the user A performs a marking operation with respect to the specific program. The user A performs a marking operation (corresponding to a first marking period 501) with respect to a scene from the point of time T1 to the point of time T3; and a marking operation (corresponding to a second marking period 502) with respect to a scene from the point of time T6 to the point of time T8 within the specific program.

Similarly to the user A, referring to FIG. 9, the user B performs a marking operation (corresponding to a first marking period 503) with respect to a scene from the point of time T2 to the point of time T4; a marking operation (corresponding to a second marking period 504) with respect to a scene from the point of time T5 to the point of time T7; and a marking operation (corresponding to a third marking period 505) with respect to a scene from the point of time T9 to the point of time T10 within the specific program.

After reproduction of the specific program is ended, the program viewing terminal of the user A transmits user information for identifying the user A, program identification information for identifying the specific program, and marking information of the user A to the program recommendation server. The marking information indicates a time period during which a marking operation has been performed within the specific program. For instance, the marking information includes the point of time when a marking operation is started, and the point of time when the marking operation is ended. In the case of the user A in FIG. 9, the marking start point of time T1 in the first marking period 501, the marking end point of time T3 in the first marking period 501, the marking start point of time T6 in the second marking period 502, and the marking end point of time T8 in the second marking period 502 are generated as marking information.

Similarly to the user A, after reproduction of the specific program is ended, the program viewing terminal of the user B transmits user information for identifying the user B, program identification information for identifying the specific program, and marking information of the user B to the program recommendation server. In the case of the user B in FIG. 9, the marking start point of time T2 in the first marking period 503, the marking end point of time T4 in the first marking period 503, the marking start point of time T5 in the second marking period 504, the marking end point of time T7 in the second marking period 504, the marking start point of time T9 in the third marking period 505, and the marking end point of time T10 in the third marking period 505 are generated as marking information. The user B has started viewing the specific program earlier than the user A, and transmitted the marking information earlier than the user A. Accordingly, the following description is made on the premise that the marking information of the user B has already been registered in the program recommendation server at the point of time when the user A transmits the marking information of the user A.

By registering user information in the program recommendation server, the user information is provided to the user from the program recommendation server, and is administered in the program viewing terminal used by the user.

Alternatively, the program identification information may be one of program identification information for identifying a program, which is provided with respect to each of the programs; and identification information represented by a broadcast date, channel information, and broadcast station identification information concerning a program.

The marking information includes a marking start point of time and a marking end point of time. For instance, in the case of the first marking period 501 marked by the user A, the point of time T1 is included as the marking start point of time, and the point of time T3 is included as the marking end point of time. In the case where a marking period is designated by a marking start point of time and a marking width, the marking start point of time and a marking end point of time are transmitted as the marking information.

In response to receiving the marking information of the user A from the program viewing terminal of the user A, the program recommendation server analyzes the received marking information, and defines the users having similar marking information as one group. The users having similar marking information are users having marking positions identical to each other time-wise, and users having marking positions partially overlapped with each other. In determining an overlapping degree of marking positions, it is judged whether the marking positions are overlapped with 50% or more with respect to the total marking period, and the users having marking positions overlapped with each other with 50% or more are defined as one group in order to precisely determine the sameness on the user's preference.

Referring to FIG. 9, a first overlapping period 506 and a second overlapping period 507 each indicates a period when the marking information of the user A and the marking information of the user B are partially overlapped. In this example, the sum of the first overlapping period 506 and the second overlapping period 507 is 50% or more with respect to the total marking period of the user A (the sum of the first marking period 501 and the second marking period 502). Accordingly, the user A and the user B are defined as an identical group. This embodiment is described by a case that the group is constituted solely of the user A and the user B. However, as far as users have marking periods overlapped with each other with 50% or more, the users are defined as an identical group.

As described above, in this embodiment, users are grouped based on user manipulation on marking a program.

Figure 10:
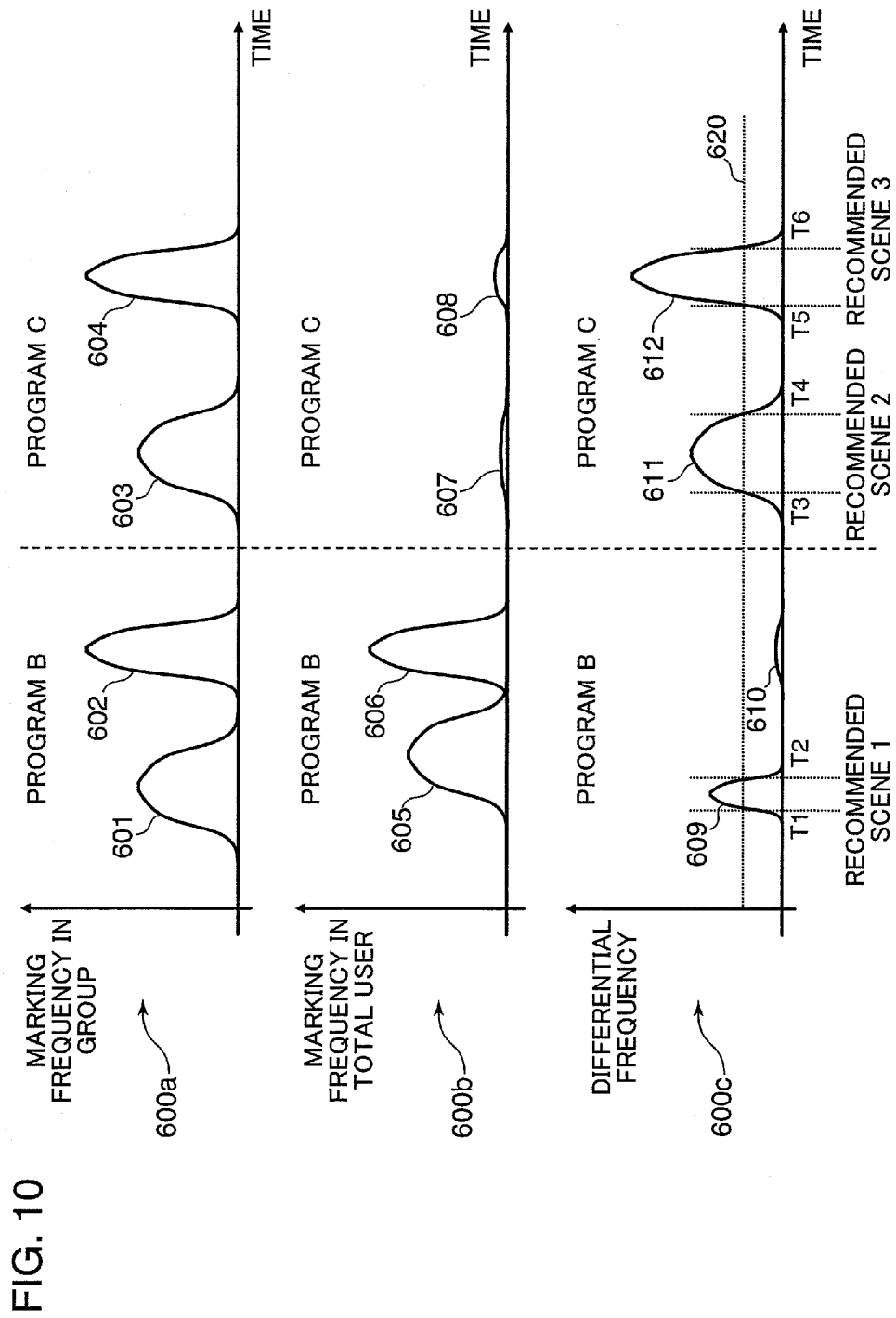
FIG. 10 is graphs showing marking frequencies in the second embodiment.

FIG. 10 shows graphs each representing marking frequencies of the program B and the program C having similar marking information, in the programs other than the specific program selected by the users in a group.

A frequency distribution graph 600a in FIG. 10 shows a frequency distribution representing overlapping of marking information of users in a group concerning a program B and a program C, wherein the graph is obtained by: defining the users having marking information similar to the marking information of the specific program selected by the user A, as a user group; and extracting the program B and the program C whose marking information is similar among the programs other than the specific program. In this example, a first peak 601 and a second peak 602 have a high marking frequency in the program B. Likewise, a first peak 603 and a second peak 604 have a high marking frequency in the program C. This means that marking operations are frequently performed at the first peak 601 in the program B, the second peak 602 in the program B, the first peak 603 in the program C, and the second peak 604 in the program C, in the user group having marking information similar to the marking information of the specific program selected by the user A.

A frequency distribution graph 600b in FIG. 10 shows a frequency distribution representing overlapping of marking information, concerning the program B and the program C, of all the users registered in the program recommendation server, as a group including the user group having marking information similar to the marking information of the specific program selected by the user A. In the total user frequency distribution graph 600b, marking operations are relatively frequently performed at a first peak 605 and a second peak 606 in the program B. However, the marking frequency is low as a whole in the program C, and marking operations are not frequently performed at a first peak 607 and a second peak 608.

A frequency distribution graph 600c in FIG. 10 shows a result obtained by subtracting the frequency distribution in the graph 600b obtained by normalizing the marking frequency of all the registered users by the total marking period of all the registered users, from the frequency distribution in the graph 600a obtained by normalizing the marking frequency of the group constituted of the users having marking information similar to the marking information of the user A by the total marking period of all the users in the user group. As a result of the subtracting operation, a first differential peak 609 in the program B is generated, because there is a time lag between the first peak 601 in the program B, and the first peak 605 in the program B.

The second peak 602 in the program B has substantially the same marking frequency as the second peak 606 in the program B. Accordingly, as a result of a differential operation, a second differential peak 610 does not have a significantly large marking frequency.

Concerning the program C in the total user frequency distribution graph 600b, neither the first peak 607 nor the second peak 608 has a high marking frequency, whereas in the user group frequency distribution graph 600a, both the first peak 603 and the second peak 604 have a high marking frequency. Accordingly, both a first differential peak 611 and a second differential peak 612 in the program C have a high marking frequency.

With use of the differential frequency distribution graph 600c in FIG. 10, threshold judgment is performed based on a differential marking frequency and a predetermined threshold value 620 with respect to each of the programs, and then a scene having a marking frequency larger than the threshold value 620 is generated as a recommended scene. In this example, a scene in the program B from the point of time T1 to the point of time T2 is generated as a recommended scene 1 in the program B; a scene in the program C from the point of time T3 to the point of time T4 is generated as a recommended scene 2 in the program C; and a scene in the program C from the point of time T5 to the point of time T6 is generated as a recommended scene 3 in the program C.

It is desirable that a program including a recommended scene having a larger integration value of marking frequency along the time axis of each of the programs, out of the recommended scenes extracted in the differential frequency distribution graph, is preferentially recommended with respect to each of the programs.

Figure 11:
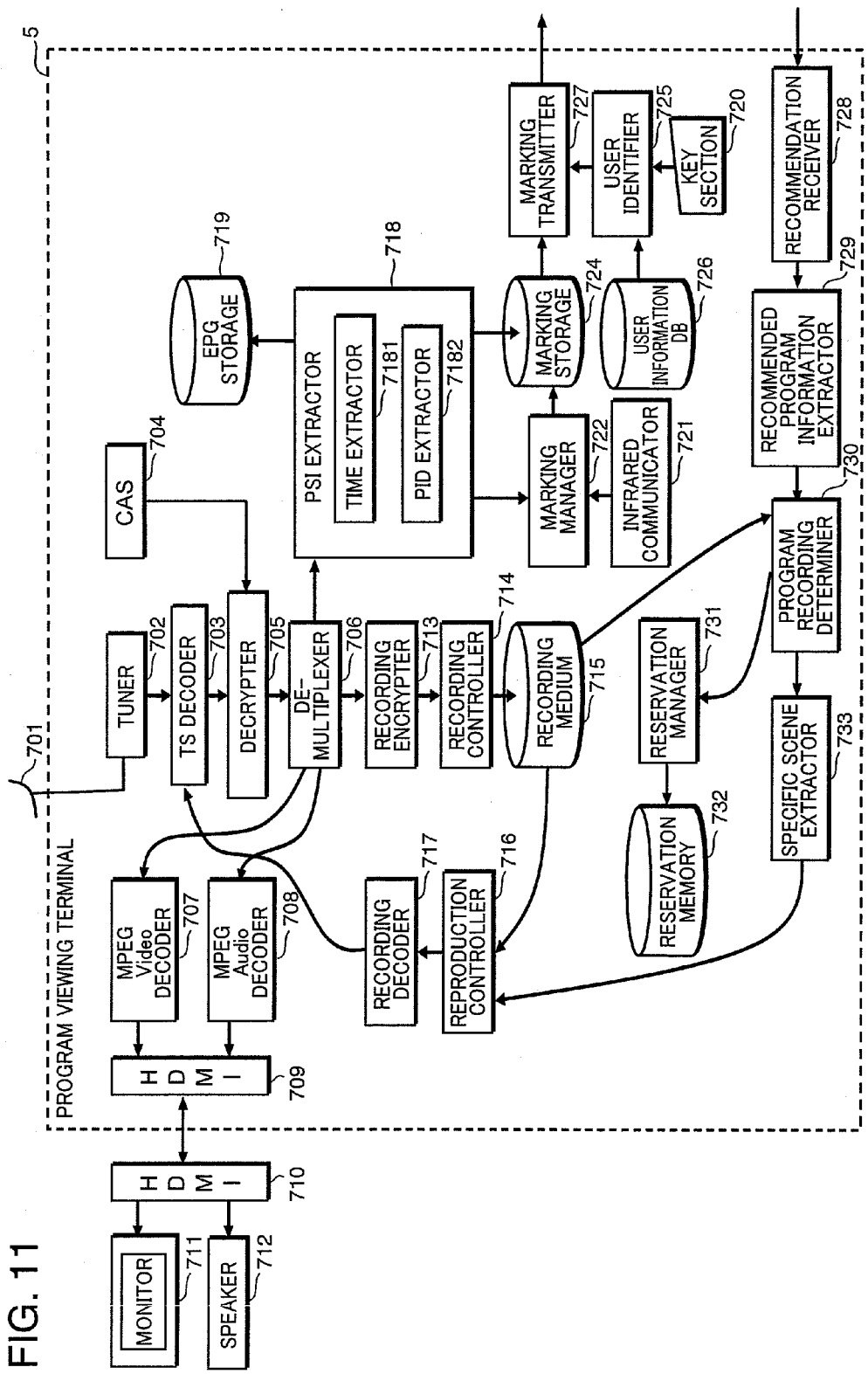
FIG. 11 is a block diagram showing an arrangement of a program viewing terminal in the second embodiment.
Figure 12:
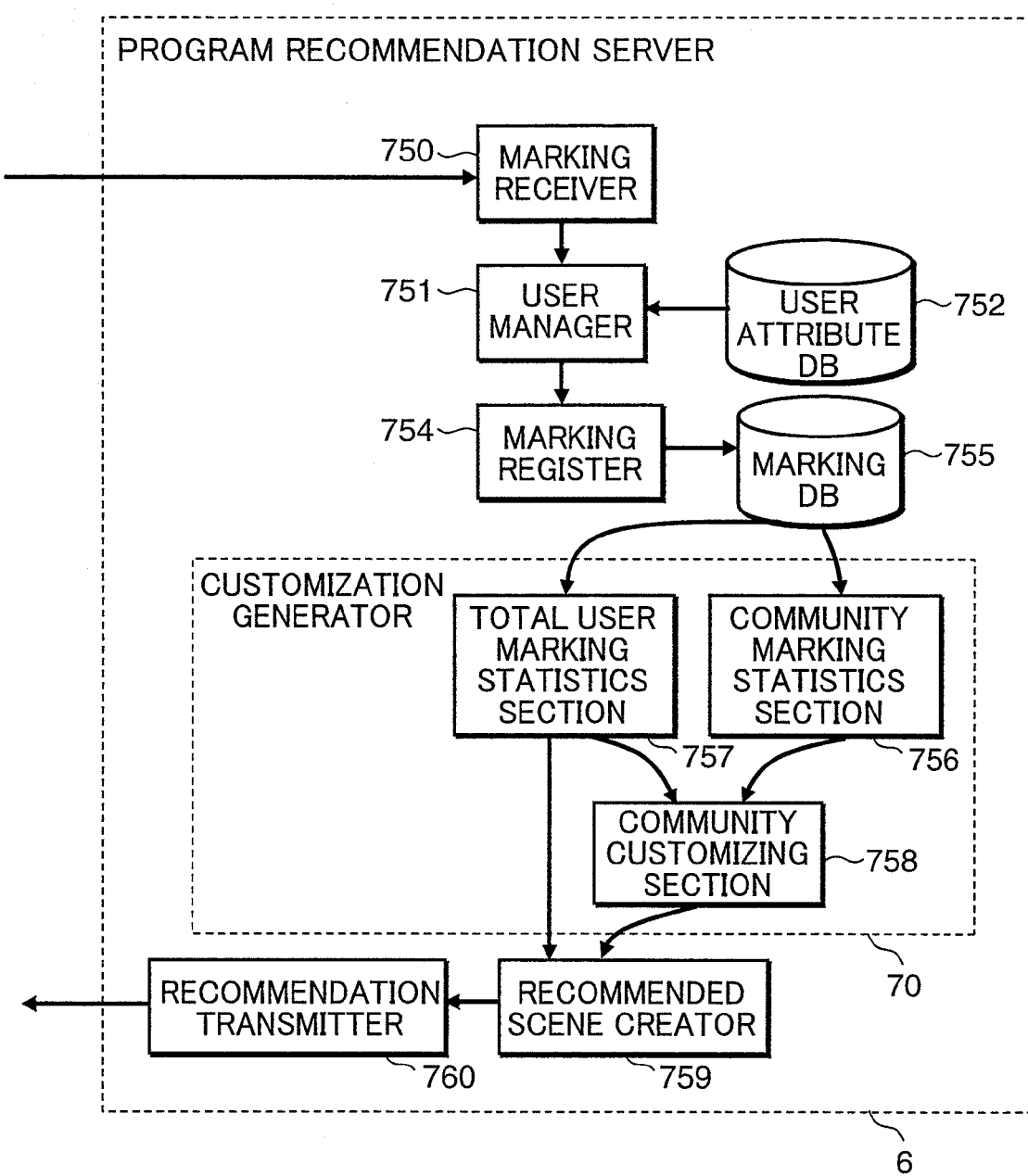
FIG. 12 is a block diagram showing an arrangement of a program reservation server in the second embodiment.

FIG. 11 is a block diagram showing an arrangement of a program viewing terminal in the second embodiment. FIG. 12 is a block diagram showing an arrangement of a program recommendation server in the second embodiment. The program recommendation system in the second embodiment includes program viewing terminals 5 such as program recording apparatuses, and a program recommendation server 6 communicatively connected to the program viewing terminals 5 via a general-purpose network 4 such as the Internet. The arrangement of the program recommendation system in the second embodiment is substantially the same as the arrangement of the program recommendation system shown in FIG. 2. In ordinary use, the program reservation server 6 is connected to the program viewing terminals 5. However, in this embodiment, to simplify the description, an arrangement that the program recommendation server 6 is connected to a single program viewing terminal 5 is described.

The program viewing terminal 5 allows a user to view a program, record a program, reproduce a recorded program, delete a recorded program, or reserve recording a program by receiving the program from a broadcast wave or an IP network. The program viewing terminal 5 includes an antenna 701, a tuner 702, a TS decoder 703, a CAS 704, a decrypter 705, a de-multiplexer 706, an MPEG Video decoder 707, an MPEG Audio decoder 708, an HDMI terminal 709, a recording encrypter 713, a recording controller 714, a recording medium 715, a reproduction controller 716, a recording decoder 717, a PSI extractor 718, an EPG storage 719, a key section 720, an infrared communicator 721, a marking manager 722, a marking storage 724, a user identifier 725, a user information DB 726, a marking transmitter 727, a recommendation receiver 728, a recommended program information extractor 729, a program recording determiner 730, a reservation manager 731, a reservation memory 732, and a specific scene extractor 733.

The program recommendation server 6 includes a marking receiver 750, a user manager 751, a user attribute DB 752, a marking register 754, a marking DB 755, a customization generator 70, a recommended scene creator 759, and a recommendation transmitter 760.

The customization generator 70 in the program recommendation server 6 is constituted of a community marking statistics section 756, a total user marking statistics section 757, and a community customizing section 758.

The tuner 702 is operable to receive a broadcast wave of a predetermined channel from a broadcast wave such as a terrestrial digital broadcast or a BS digital broadcast, or an IP broadcast to be transmitted in a multicast manner, and output the received broadcast wave to the TS decoder 703. The TS decoder 703 is operable to demodulate the received broadcast wave in a general transport stream format, and output the demodulated broadcast wave to the decrypter 705.

The CAS 704 is a general Conditional Access System, and is operable to read out encryption key information from an IC card recorded with user registration information and an encryption key on a program, and output the encryption key information to the decrypter 705.

The decrypter 705 is operable to decode an encrypted broadcast signal which has been subjected to demodulation by the TS decoder 703, with use of the encryption key from the CAS 704, decrypt the encrypted program information, and output the decryption result to the de-multiplexer 706.

The de-multiplexer 706 is operable to de-multiplex the multiplexed program information. The program information includes at least video information, audio information, and program administration information in a multiplexed manner. After the de-multiplexing, the video information is outputted to the MPEG Video decoder 707, the audio information is outputted to the MPEG Audio decoder 708, and the program administration information is outputted to the PSI extractor 718.

The MPEG Video decoder 707 is operable to demodulate the video information from the de-multiplexer 706, convert the demodulated video information into video data, and output the video data to the HDMI terminal 709. The MPEG Audio decoder 708 is operable to demodulate the audio information inputted from the de-multiplexer 706, convert the demodulated audio information into audio data, and output the audio data to the HDMI terminal 709. The HDMI terminal 709 is connected to an external HDMI terminal 710 via an HDMI cable. The HDMI terminal 710 is connected to a monitor 711 and a speaker 712.

The HDMI terminal 709, 710 is a general interface for use in transmitting/receiving video information and audio information, is operable to authenticate the program viewing terminal 5, the monitor 711, and the speaker 712 with each other, share an encryption key, encrypt video data or audio data by the shared encryption key, and output the encrypted data to the monitor 711 or the speaker 712.

The monitor 711 is a general device for displaying video information on a program, and is operable to decode the encrypted video data received by the HDMI terminal 710, and output the decoded video data on a program. The speaker 712 is a general device for outputting audio information on a program, and is operable to decode the encrypted audio data received by the HDMI terminal 710, and output the encrypted audio data on a program.

The recording encrypter 713 performs an encryption operation to record received program information into a recording medium. The recording encrypter 713 is operable to encrypt the program information inputted from the de-multiplexer 706, and output the encryption result to the recording controller 714. The recording encrypter 713 performs an encryption operation peculiar to a recording medium for recording program information. For instance, in the case where the recording medium is DVD-RAM, CPRM (Content Protection for Rewritable Media) is used, and in the case where the recording medium is Blu-ray disc or HD-DVD, AACS (Advanced Access Content System) is used.

The recording controller 714 controls recording program information encrypted by the recording encrypter 713 into a recording medium 715. The recording controller 714 is operable to record program information into a recording medium by performing a modulating operation or an error correction coding operation peculiar to the recording medium.

The recording medium 715 is a computer-readable recording medium for recording program information. Examples of the recording medium 715 are a magnetic recording disk such as a hard disk, an optical disc such as a DVD or a Blu-ray disc, a semiconductor memory such as an SD card, and a magnetooptical recording medium such as an MO/MD.

The reproduction controller 716 is operable to read out the program information recorded in the recording medium 715. Generally, the recording controller 714, the recording medium 715, and the reproduction controller 716 constitute a drive system.

The recording decoder 717 performs a decoding operation corresponding to an encryption operation to be performed by the recording encrypter 713. The recording decoder 717 is operable to decode the encrypted program information recorded in the recording medium 715, and output the decoded program information to the TS decoder 703. An operation of reproducing the program information outputted to the TS decoder 703 is substantially the same as the operation of reproducing a program received by the antenna 701.

The PSI extractor 718 is operable to extract a PSI (Program Specific Information) from the program administration information extracted by the de-multiplexer 706. The PSI primarily includes a PMT (Program Map Table), an EIT (Event Information Table), and a TOT (Time Offset Table).

The PMT stores therein each of packet identification information such as images or sounds included in a program. In this arrangement, as long as packet identification information such as images or sounds are obtainable from the PMT, a program can be reproduced by extracting packets attached with the packet identification information.

The EIT includes information relating to a program such as the name of a program, a broadcast date of a program, and broadcast contents of a program. The EPG (Electronic Program Guide) is created primarily with use of the information in the EIT.

The EPG storage 719 is operable to create EPG information by using the EIT in the PSI extracted by the PSI extractor 718, and stores the EPG information. The key section 720 is operable to accept input from a user, and is constituted of a remote controller and a front panel. The key section 720 functions as a marking section for allowing the user to perform a marking operation with respect to a program for viewing. Actually, the remote controller in the key section 720 has a marking button. During a period when the user presses the marking button, a marking operation is performed with respect to a program. Alternatively, the key section 720 may accept input of time information in a program in which a marking operation is performed by a user.

The infrared communicator 721 is a general light receiving section for receiving an infrared signal from the remote controller. The infrared communicator 721 is operable to generate a marking button pressing signal while the user continues pressing the marking button on the key section 720, and output the marking button pressing signal to the marking manger 722.

The marking manger 722 is operable to receive the marking button pressing signal from the infrared communicator 721, and judge whether the user continues pressing the marking button by the marking button pressing signal. In the case where it is judged that the user continues pressing the marking button by the marking button pressing signal, the marking manger 722 receives the time information in a program currently being reproduced from the PSI extractor 718, and outputs the time information to the marking storage 724.

The PSI extractor 718 is internally provided with a time extractor 7181 and a PID extractor 7182. The time extractor 7181 is operable to extract a reproducing time in a program by checking the time offset table (TOT) in the PSI. The PID extractor 7182 is operable to extract PID i.e. packet identification information for identifying a packet of currently reproduced video contents, and specify the currently reproduced packet.

The marking storage 724 is operable to store marked time information, in a program, which has been extracted by the marking manager 722, or a packet identification information group in a program in which a marking operation is performed. The marking storage 724 may store a marking start point of time, and a marking end point of time in a program in correlation to each other, as time information; or may store packet identification information for identifying a packet in a program corresponding to a marking start point of time, and packet identification information for identifying a packet in the program corresponding to a marking end point of time in correlation to each other, as a packet identification information group. Further alternatively, packet identification information of all the packets in a marking operation may be stored as a packet identification information group. The time information and the packet information are stored in the marking storage 724 in correlation to program identification information for identifying a program being reproduced. The program identification information is included in the PSI extracted by the PSI extractor 718. Time information and packet identification information representing marking positions, corresponding to the program identification information, are stored in the marking storage 724 as marking information.

The user identifier 725 is operable to identify a user using the program viewing terminal 5. Specifically, the user identifier 725 is operable to identify a user using the program viewing terminal 5, based on user information to be inputted by using the key section 720.

The user information DB 726 is a database in which user information of all the users using the program viewing terminal 5 is registered. The user identifier 725 is operable to identify a user based on user information to be inputted by using the key section 720, and user information pre-stored in the user information DB 726. The user identifier 725 is operable to output user information of the user currently using the program viewing terminal 5 to the marking transmitter 727, if user authentication is successful.

The marking transmitter 727 is a general network interface, and is operable to transmit the marking information stored in the marking storage 724 and the user information inputted from the user identifier 725 to the program recommendation server 6, after a network with the program reservation server 6 to be connected via the general-purpose network 7 is established.

The marking storage 724 is operable to store user information of a user who performed a marking operation in association with the user identifier 725, and administer marking information which has been transmitted to the program recommendation server 6 by the marking transmitter 727, and non-transmitted marking information in a discriminative manner.

The recommendation receiver 728 is operable to receive recommended information relating to a program recommended by the program recommendation server 6 via the general-purpose network 7. The recommended program information extractor 729 is operable to extract recommended program information from the recommended information received by the recommendation receiver 728. The recommended program information is information capable of uniquely identifying a recommended program. For instance, the recommended program information may include program identification information for identifying a program; or a broadcast date, channel information, and broadcast station identification information for identifying a broadcast station concerning a program. The recommended program information also includes time information or packet identification information capable of uniquely specifying a recommended scene in a program. The extracted recommended program information is outputted to the program recording determiner 730.

The program recording determiner 730 is operable to check whether a program identified by the program identification information is recorded in the recording medium 715, based on the program identification information included in the received recommended program information. In the case where it is judged that a program represented by the recommended program information is recorded in the recording medium 715, the program recording determiner 730 judges whether a recommended scene identified by the time information or the packet identification information in the program represented by the recommended program information is recorded. In the case where it is judged that a recommended scene is recorded, the program recording determiner 730 outputs the recommended program information to the specific scene extractor 733. In the case where it is judged that a program represented by the recommended program information is not recorded, or in the case where a recommended scene in the program is not recorded, the program recording determiner 730 judges whether a program represented by the recommended program information is a program to be broadcast in the future, based on the program identification information for identifying the program and the EPG information stored in the EPG storage 719. In the case where it is judged that the program represented by the recommended program information is a program to be broadcast in the future, the program recording determiner 730 outputs the program identification information to the reservation manager 731.

The reservation manager 731 performs an operation of reserving recording a program identified by the program identification information, based on the program identification information outputted from the program recording determiner 730. The reservation memory 732 is operable to store the program identification information for identifying the program to be reserved by the reservation manager 731 in correlation to the user information to be inputted from the user identifier 725.

The specific scene extractor 733 is operable to extract a program represented by the program identification information from the program recording determiner 730 in response to input of the recommended program information, and reproduce the program from the start point of time to the end point of time of the recommended scene included in the recommended program information.

Next, an arrangement of the program recommendation server 6 in the program recommendation system in this embodiment is described. The marking receiver 750 is operable to receive marking information on a program marked by each of the users, and user information of users who performed a marking operation, from the marking transmitters 727 in the program viewing terminals 5 connected to the general-purpose network 7. The marking information includes program identification information capable of uniquely identifying a program in which a marking operation has been performed; or a broadcast date, channel information, and broadcast station identification information concerning a reserved program. The marking information also includes time information or packet identification information in a program in which a marking operation has been performed. The received marking information and user information are outputted to the user manager 751.

The user attribute 752 is operable to administer user information of a registered user, and, as required, user attribute information such as the name, the sex, and the address/telephone number of a user; the name of the manufacturer/model of a program viewing terminal; the resolution of a monitor to be connected; and the network ID of a program viewing terminal, as a user registration list. A user performs a user registration in advance with respect to the program reservation server 6 for program recommendation. The user registration comprises: notifying user registration information such as setting the user name, and notification of the address/telephone number of a user to the program recommendation server 6; and generating user information, notifying the user information to the user, and storing/administering user attribute information notified from the user, in correlation to the user information generated in the user attribute DB 752 by the program recommendation server 6.

The user manager 751 is operable to judge whether the user specified by the received user information coincides with a user registered in the program recommendation server 6. The user manager 751 is operable to retrieve user information coincident with the received user information from the user registration list stored in the user attribute DB 752. In the case where it is judged that the received user information has been registered in the user attribute DB 752, the user manger 751 judges that the user specified by the received user information is a user registered in the program recommendation server 6, and continues the operation.

If, on the other hand, it is judged that the received user information is not registered in the user attribute DB 752, the user manger 751 judges that the user specified by the received user information is not a user registered in the program recommendation server 6, transmits an error message indicating that the user specified by the received user information is not a registered user to the program viewing terminal 5 used by the user, and suspends the operation thereafter. Upon receiving the error message, the program viewing terminal 5 causes the monitor 711 to display the error message.

In the case where the user manager 751 judges that the user specified by the received user information coincides with a user registered in the program recommendation server 6, the marking register 754 stores the marking information of each of the users received by the marking receiver 750 into the marking DB 755 in correlation to the received user information.

The community marking statistics section 756 is operable to define all the users having marking information similar to the marking information received by the marking receiver 750 as a community group, based on the marking information received by the marking information receiver 750.

The community marking information statistics section 756 is operable to calculate marking information of the programs other than a program having marking information of all the users belonging to the community group; and calculate a marking rate of each of the programs within the community group by normalizing the aggregate calculation result by the number of all the users belonging to the community group. The community marking statistics section 756 is operable to output the normalized marking rate to the community customizing section 758.

The aforementioned state that marking information is similar to each other indicates that a marking position in a program represented by the marking information received by the marking receiver 750, and a marking position in a program represented by the marking information stored in the marking DB 755 are partially overlapped; or packet identification information in a program represented by the marking information received by the marking receiver 750, and packet identification information in a program represented by the marking information stored in the marking DB 755 are partially overlapped. Preferably, an overlapped portion of a marking position in a program represented by the received marking information, and a marking position in a program represented by the marking information stored in the marking DB 755 is 50% or more with respect to the total marking period in the received marking information. Also preferably, an overlapped portion of a packet identification information group in a program represented by the received marking information, and a packet identification information group in a program represented by the marking information stored in the marking DB 755 is 50% or more with respect to the total number of marking packets in the received marking information.

Unlike the community marking statistics section 756 for defining all the users having marking information similar to the marking information received by the marking receiver 750 as a community group, the total user marking statistics section 757 is operable to define all the users registered in the user attribute DB 752 i.e. all the users registered in the program recommendation server 6 as a total user group including the community group.

After defining a total user group, the total user marking statistics section 757 is operable to create a marking frequency with respect to each of the programs by performing a statistical operation with respect to marking information of all the users in the programs other than the program having the marking information received by the marking receiver 750. The marking frequency is normalized by the total marking period of all the registered users, or the total number of marking packets. The created marking frequency is outputted to the community customizing section 758 and the recommended scene creator 759.

The community customizing section 758 is operable to create a marking frequency customized to the community group defined by the community marking statistics section 756, by subtracting the marking frequency calculated by the total user marking information statistics section 757 from the marking frequency calculated by the community marking statistics section 756; and output the marking frequency to the recommended scene creator 759. The marking frequency subtracting operation is performed by subtracting the marking frequency of each of the programs with respect to identical programs.

The recommended scene creator 759 is operable to extract a program having a marking frequency higher than a predetermined threshold value, as a recommended program, based on the marking frequency generated by the community customizing section 758. The recommended scene creator 759 is operable to extract a start point of time and an end point of time of a scene whose marking frequency is higher than a threshold value; or packet identification information for identifying a starting packet and packet identification information for identifying an ending packet, within each of the programs, as recommended scene information. The recommended scene creator 759 is operable to create recommended program information including program identification information for identifying a recommended program; or a broadcast date of a recommended program, channel information of a recommended program to be broadcast, and broadcast station identification information for identifying a broadcast station for broadcasting a recommended program, as well as the recommended scene information. Thus, the recommended scene creator 759 is operable to create a recommended scene customized to the community group.

Likewise, the recommended scene creator 759 is operable to extract a program having a marking frequency higher than a predetermined threshold value, as a popular program, based on the marking frequency generated by the total user marking statistics section 757. The recommended scene creator 759 is operable to extract a start point of time and an end point of time of a scene whose marking frequency is higher than a threshold value; or packet identification information for identifying a starting packet and packet identification information for identifying an ending packet, within each of the programs, as popular scene information. The recommended scene creator 759 is operable to create popular program information including program identification information for identifying a popular program; or a broadcast date of a popular program, channel information of a popular program to be broadcast, and broadcast station identification information for identifying a broadcast station for broadcasting a popular program, as well as the popular scene information. Thus, the recommended scene creator 759 is operable to generate recommended program information including a start point of time and an end point of time of a recommended scene customized to the community group, and including program identification information for identifying a program having a recommended scene; and generate popular program information including a start point of time and an end point of time of a popular scene, and including program identification information for identifying a program having a popular scene. Then, the recommended program information and the popular program information are outputted to the recommendation transmitter 760.

The recommendation transmitter 760 is operable to transmit the recommended program information including recommended scene information, and the popular program information including popular scene information, which have been created by the recommended scene creator 759, to the program viewing terminal 5.

Next, an operation of the program recommendation system in the embodiment is described. For instance, a user A performs a marking operation with respect to a part of a program A by the program viewing terminal 5 owned by the user A. The program viewing terminal 5 transmits user information for identifying the user A, program identification information for identifying the program A, and marking information for specifying the marking position in the program to the program recommendation server 6.

The marking receiver 750 in the program recommendation server 6 receives, from the program viewing terminal 5 owned by the user A, the user identification information for identifying the user A, the program identification information for identifying the program A, and the marking information for specifying the marking position in the program. The user manager 751 judges whether the received user information is stored in the user attribute DB 752. If it is judged that the received user information is stored in the user attribute DB 752, the user manager 751 continues the operation, assuming that the user A is a user registered in the program recommendation server 6.

The marking register 754 registers the program identification information for identifying the program A, and the marking information for specifying the marking position in the program in correlation to the user information for identifying the user A. The community marking statistics section 756 defines a community group by extracting all the users having marking information similar to the marking information of the program A from the marking DB 755. The community marking statistics section 756 performs a statistical operation with respect to the marking information of the programs other than the program A in the community group. The community marking statistics section 756 calculates a marking frequency of the programs other than the program A in the community group, and outputs the calculation result to the community customizing section 758.

The total user marking statistics section 757 defines a total user group including the community group defined by the community marking statistics section 756 by extracting all the users registered in the user attribute DB 752 in the program reservation server 6 from the marking DB 755. The total user marking statistics section 757 extracts the marking information correlated to the user information in the total user group from the marking DB 755, and performs a statistical operation with respect to the marking information of the programs other than the program A. Then, the total user marking statistics section 757 calculates a marking frequency of the programs other than the program A in the total user group, and outputs the calculation result to the community customizing section 758 and the recommended scene creator 759.

The community customizing section 758 subtracts the marking frequency of the programs other than the program A, which has been created by the total user marking statistics section 757, from the marking frequency of the programs other than the program A, which has been created by the community marking statistics section 756. Thus, the community customizing section 758 creates a marking frequency of the programs customized to the community group of the user who marked a certain position in the program A, and outputs the marking frequency to the recommended scene creator 759.

The recommended scene creator 759 creates recommended program information by extracting program identification information for identifying a program having a marking frequency higher than a threshold value, and recommended scene information representing a start point of time and an end point of time of a scene having a marking frequency higher than a threshold value, based on the marking frequency customized to the community group, which has been created by the community customizing section 758. The recommended scene creator 759 also creates popular program information by extracting program identification information for identifying a program having a marking frequency higher than a threshold value, and popular scene information representing a start point of time and an end point of time of a scene having a marking frequency higher than a threshold value, based on the marking frequency generalized to all the registered users, which has been created by the total user marking statistics section 757. The recommendation transmitter 760 outputs the recommended program information and the popular program information created by the recommended scene creator 759 to the program viewing terminal 5 of the user A.

Figure 13:
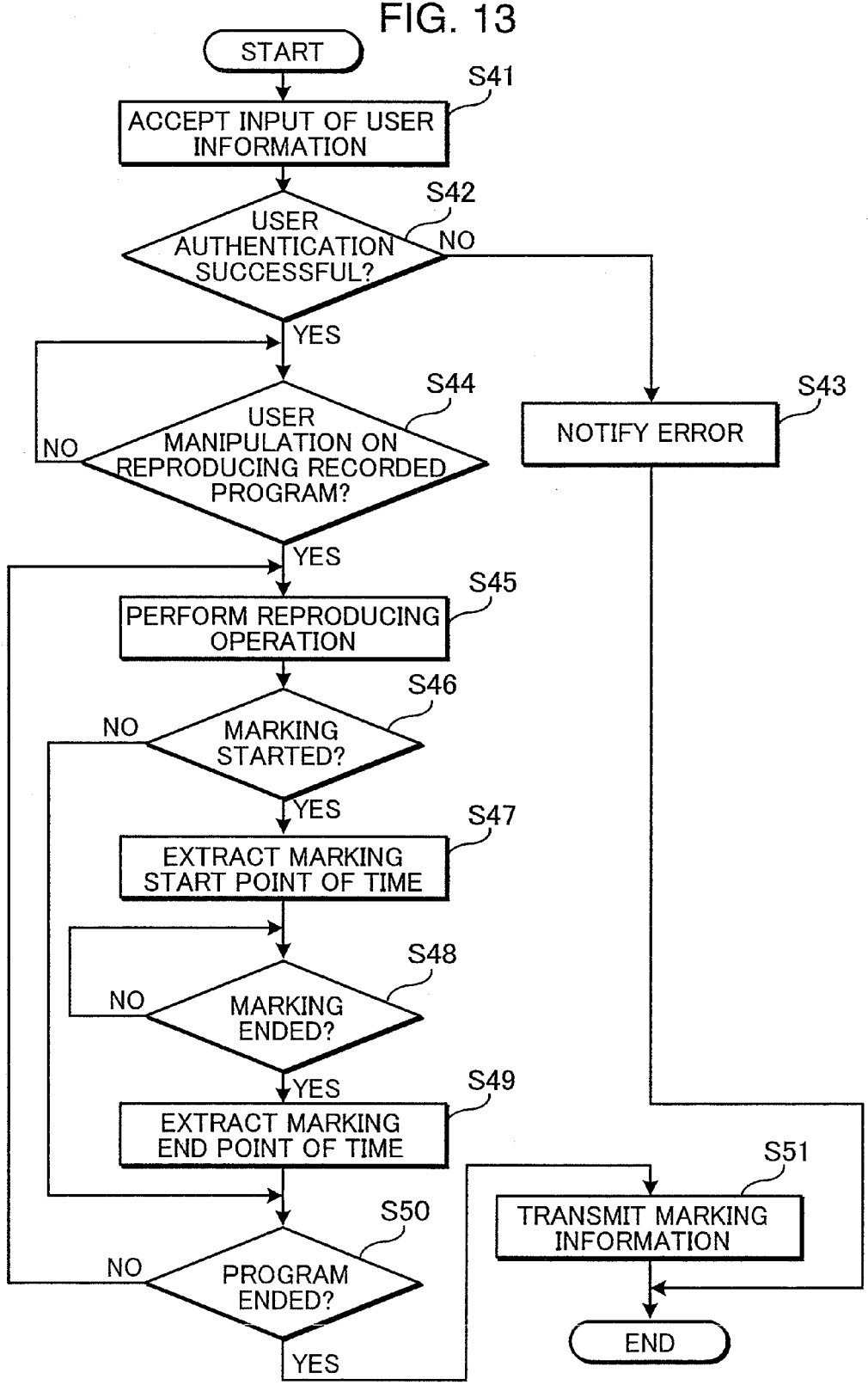
FIG. 13 is a flowchart showing a flow of operation until marking information is transmitted to the program viewing terminal in the second embodiment.
Figure 14:
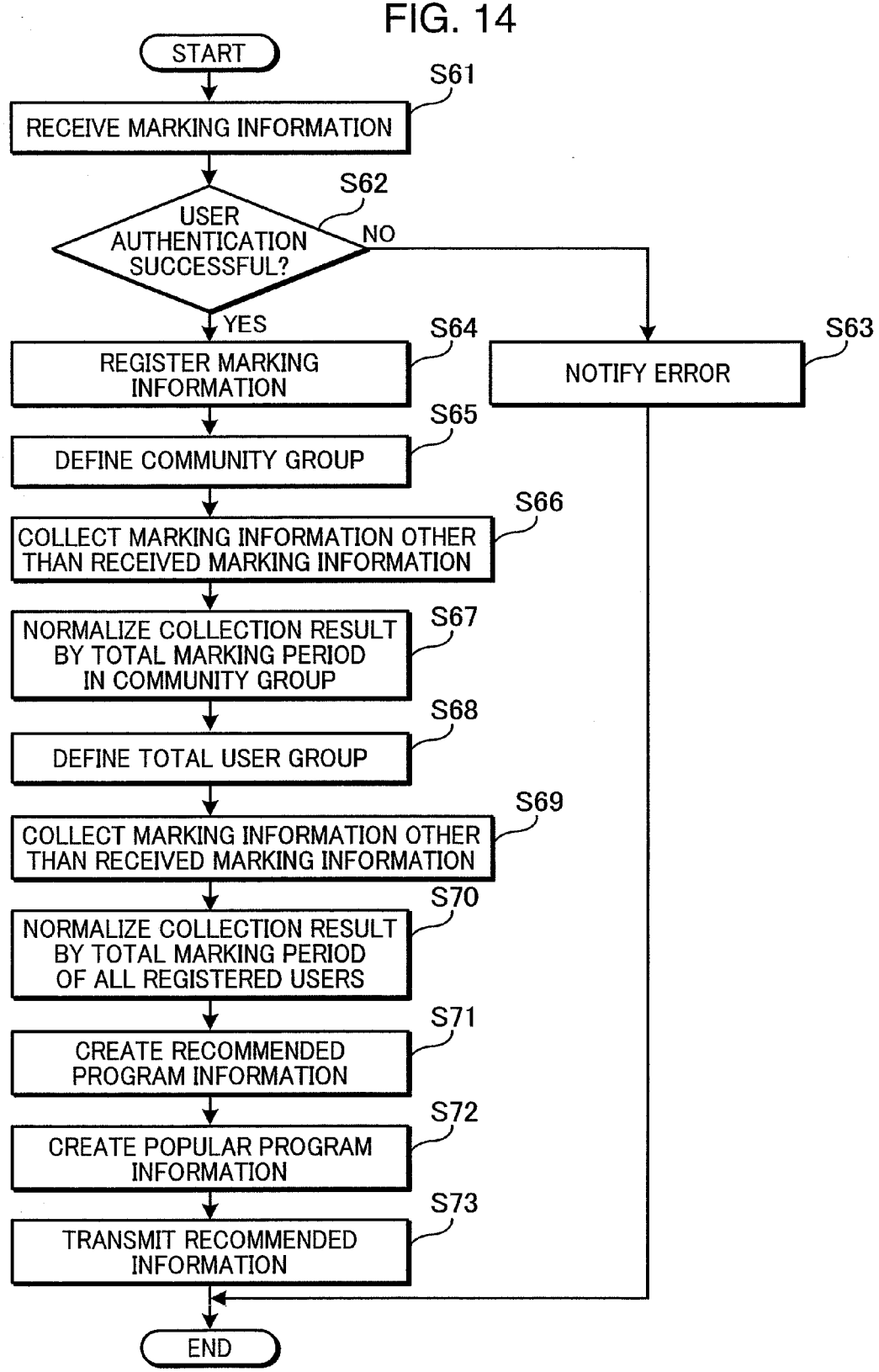
FIG. 14 is a flowchart showing a flow of operation in the program reservation server in the second embodiment.
Figure 15:
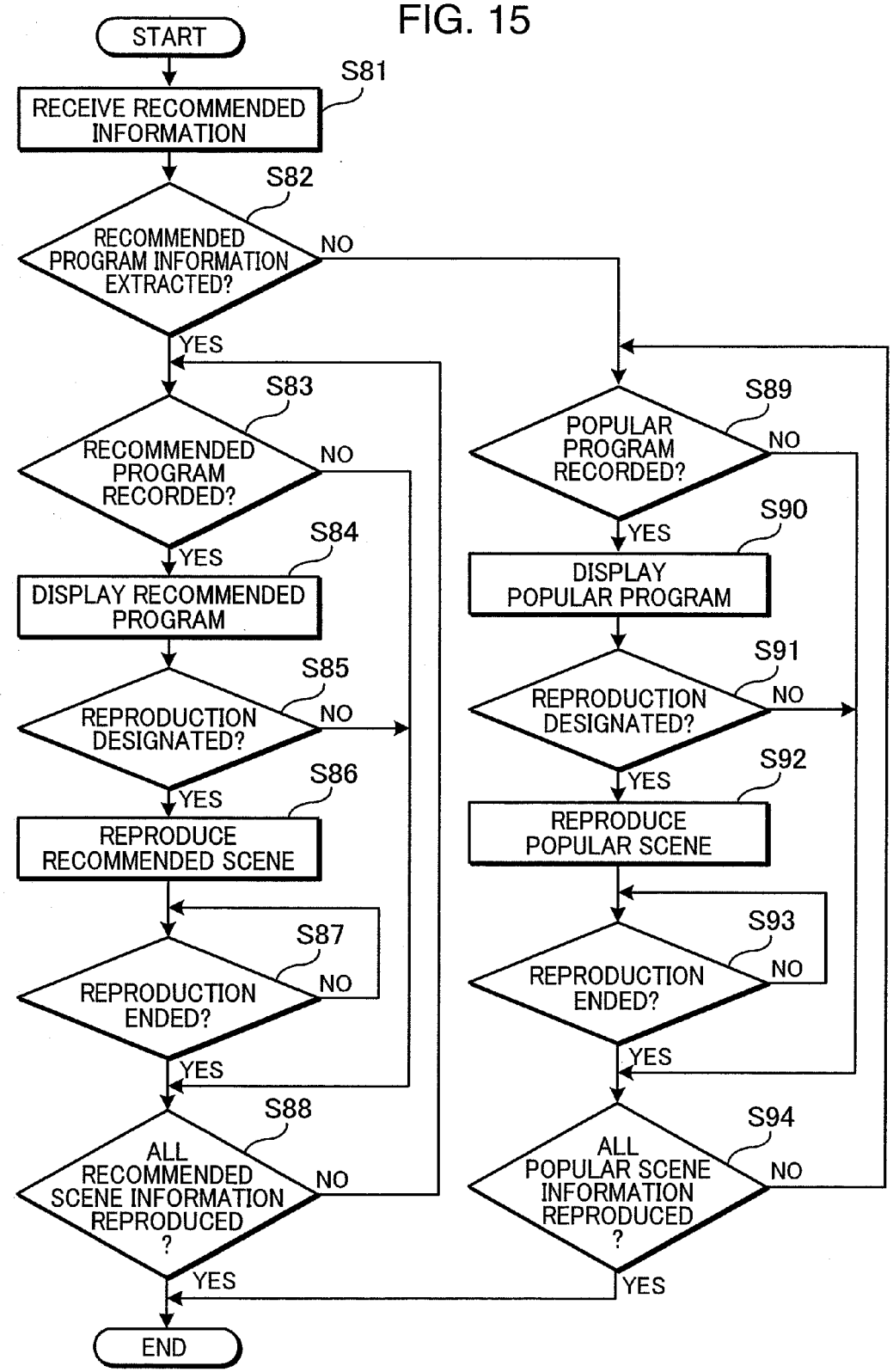
FIG. 15 is a flowchart showing a flow of operation after recommended information is received by the program viewing terminal in the second embodiment.

Next, a flow of operation to be performed by the program recommendation system in the embodiment is described in detail. FIGS. 13 through 15 are flowcharts showing a flow of operation to be performed by the program recommendation system in accordance with the second embodiment. FIG. 13 is a flowchart showing a flow of operation until marking information is transmitted from the program viewing terminal in accordance with the second embodiment. FIG. 14 is a flowchart showing a flow of operation to be performed by the program recommendation server in accordance with the second embodiment. FIG. 15 is a flowchart showing a flow of operation after recommended information is received by the program viewing terminal in accordance with the second embodiment.

Referring to FIG. 13, first, the user identifier 725 displays a user authentication screen for allowing a user to perform user authentication on the monitor 711, and the key section 720 accepts input of user information by the user and user's log-in to the program viewing terminal 5 (Step S41). Then, the user identifier 725 judges whether user authentication is successful, in other words, the inputted user information coincides with the user information pre-registered in the user information DB 726 (Step S42).

If it is judged that the inputted user information is not registered in the user information DB 726, in other words, the user manipulating the program viewing terminal 5 is not a registered user, or the inputted user information is incorrect (NO in Step S42), the user identifier 725 outputs an error message to the monitor 711, and suspends the operation thereafter (Step S43).

If, on the other hand, it is judged that the inputted user information is correct, and the user manipulating the program viewing terminal 5 is a registered user (YES in Step S42), the reproduction controller 716 judges whether user manipulation on reproducing a recorded program from the recording medium 715 has been performed (Step S44). If it is judged that user manipulation on reproduction has not been performed (NO in Step S44), the reproduction controller 716 waits until the user manipulation on reproduction is performed.

If it is judged that user manipulation on reproduction has been performed (YES in Step S44), the reproduction controller 716 performs an operation of reproducing a program selected by the user from the recording medium 715, and outputting the program to the monitor 711 (Step S45).

Then, the marking manager 722 judges whether user manipulation on marking has been started during reproduction of the program (Step S46). In the case where the infrared communicator 721 detects an infrared signal to be outputted in response to pressing the marking button on the remote controller, the infrared communicator 721 generates a marking button pressing signal, and outputs the marking button pressing signal to the marking manager 722. The marking manger 722 judges that user manipulation on marking has been started in response to input of the marking button pressing signal.

If it is judged that user manipulation on marking has been started (YES in Step S46), the time extractor 7181 extracts a reproducing time in the program from the PSI multiplexed in the broadcast program, and temporarily stores the reproducing time into the marking storage 724, as a marking start point of time when the user manipulation on marking has been started (Step S47). If, on the other hand, it is judged that user manipulation on marking has not been started (NO in Step S46), the routine proceeds to an operation of judging whether the program being reproduced is ended (Step S50).

Then, the marking manager 722 judges whether the user manipulation on marking is ended (Step S48). In response to releasing pressing the marking button on the remote controller, the infrared communicator 721 terminates generating the marking button pressing signal. The marking manager 722 judges that the user manipulation on marking is ended in response to termination of input of the marking button pressing signal.

If it is judged that the user manipulation on marking is ended (YES in Step S48), similarly to the operation of extracting a marking start point of time, the time extractor 7181 extracts a reproducing time in the program from the PSI multiplexed in the broadcast program, and temporarily stores the reproducing time into the marking storage 724, as a marking end point of time when the user manipulation on marking is ended (Step S49). If, on the other hand, it is judged that the user manipulation on marking is not ended (NO in Step S48), the marking manager 722 waits until the user manipulation on marking is ended.

Then, the marking transmitter 727 judges whether the program being reproduced is ended (Step S50). In the case where it is judged that the program being reproduced is ended (YES in Step S50), the marking transmitter 727 transmits a marking start point of time, a marking end point of time, and program identification information for identifying a program being reproduced, which are stored in the marking storage 724, and user information of a user identified by the user identifier 725 to the program recommendation server 6, as marking information (Step S51). If, on the other hand, it is judged that the program being reproduced is not ended (NO in Step S50), the reproduction controller 716 continues the reproducing operation in Step S45.

Subsequently, referring to FIG. 14, the marking receiver 750 in the program recommendation server 6 receives the marking information transmitted from the marking transmitter 727 in the program viewing terminal 5 (Step S61).

Then, the user manager 751 judges whether user authentication is successful, in other words, user information included in the marking information received by the marking receiver 750 coincides with the user information pre-registered in the user attribute DB 752 in the program recommendation server 6 (Step S62). If it is judged that user authentication has failed, and the user manipulating the program viewing terminal 5 is not a registered user (NO in Step S62), the user manager 751 creates an error message indicating that the user manipulating the program viewing terminal 5 is not a registered user, transmits the error message to the program viewing terminal 5, and suspends the operation thereafter (Step S63). Upon receiving the error message, the program viewing terminal 5 outputs, to the monitor 711, an error notification indicating that user authentication has failed.

If, on the other hand, it is judged that user authentication is successful, and the user manipulating the program viewing terminal 5 is a registered user (YES in Step S62), the marking register 754 registers the marking information received by the marking receiver 750 into the marking DB 755 in correlation to the user information of the user manipulating the program viewing terminal 5 (Step S64).

Then, the community marking statistics section 756 extracts all the users having marking information similar to the marking information received by the marking receiver 750 from the marking DB 755, and defines the extracted users as a community group (Step S65). Similar marking information in the embodiment includes program identification information identical to the program identification information represented by the marking information received by the marking receiver 750, and marking information indicating that marking periods in a program, or marked packet identification information in a program are partially overlapped. Preferably, marking information indicating that marking periods or marked packet identification information are overlapped with 50% or more within an identical program with respect to each of the users is determined as similar marking information.

Then, the community marking statistics section 756 makes up marking information of the programs other than the program having the marking information received by the marking receiver 750, out of the marking information of all the users registered in the community group constituted of the users having similar marking information, with respect to each of the programs (Step S66). The community marking statistics section 756 counts the number of users who performed a marking operation per unit time in each of the programs, and calculates a frequency distribution along a time axis with respect to each of the programs. Alternatively, the community marking statistics section 756 may count the number of users who performed a marking operation with respect to each of the packets in each of the programs, and calculate a frequency distribution per packet with respect to each of the programs.

Then, the community marking statistics section 756 normalizes the aggregate calculation result by the total marking period of all the users in the community group, or the total number of marking packets (Step S67). The community marking statistics section 756 outputs the normalization result to the community customizing section 758.

Then, the total user marking statistics section 757 extracts the users registered in the user attribute DB 752 i.e. all the users registered in the program recommendation server 6, and defines all the users including the community group constituted of the users having similar marking information as a total user group (Step S68).

Then, the total user marking statistics section 757 makes up marking information of the programs other than the program having the marking information received by the marking receiver 750 by extracting marking information of all the users in the total user group from the marking DB 755 (Step S69). The total user marking statistics section 757 counts the number of users who performed a marking operation per unit time in each of the programs, and calculates a frequency distribution along a time axis with respect to each of the programs. Alternatively, the total user marking statistics section 757 may count the number of users who performed a marking operation with respect to each of the packets in each of the programs, and calculate a frequency distribution per packet with respect to each of the programs.

Then, the total user marking statistics section 757 normalizes the aggregate calculation result by the total marking period of all the registered users, or the total number of marking packets (Step S70). The total user marking statistics section 757 outputs the normalization result to the community customizing section 758 and the recommended scene creator 759.

Then, the community customizing section 758 subtracts the marking aggregate calculation result (marking frequency) in the total user group obtained by normalization, from the marking aggregate calculation result (marking frequency) in the community group constituted of the users having similar marking information, which has been obtained by normalization. Then, the recommended scene creator 759 generates recommended program information by: performing threshold judgment based on the subtraction result; and extracting program identification information for identifying a program having a marking frequency higher than a threshold value, and recommended scene information representing a start point of time and an end point of time of a scene having a marking frequency higher than a threshold value (Step S71). The start point of time corresponds to a time position where the marking frequency is over the threshold value; and the end point of time corresponds to a time position where the marking frequency is under the threshold value. The start points of time and the end points of time of all the extracted recommended scenes are outputted to the recommendation transmitter 760 as recommended program information in correlation to the corresponding program identification information.

Then, the recommended scene creator 759 creates popular program information by: performing threshold judgment based on the marking aggregate calculation result in the total user group, which has been obtained by normalization by the total user marking statistics section 757; and extracting program identification information for identifying a program having a marking frequency higher than a threshold value, and popular scene information representing a start point of time and an end point of time of a scene having a marking frequency higher than a threshold value (Step S72). The start points of time and the end points of time of all the extracted popular scenes are outputted to the recommendation transmitter 760 as popular program information in correlation to the corresponding program identification information.

Then, the recommendation transmitter 760 transmits the recommended program information and the popular program information created by the recommended scene creator 759 to the program viewing terminal 5, as recommended information (Step S73).

Subsequently, referring to FIG. 15, the recommendation receiver 728 in the program viewing terminal 5 receives the recommended information including the recommended program information and the popular program information transmitted by the program recommendation server 6 (Step S81).

Then, the recommended program information extractor 729 judges whether recommended program information has been extracted from the recommended information received by the recommendation receiver 728 (Step S82). The recommended program information extractor 729 prompts the user to select one of the recommended program information and the popular program information. In the case where recommended program information has been selected by using the key section 720, the recommended program information extractor 729 extracts the recommended program information. In the case where popular program information has been selected, the recommended program information extractor 729 extracts the popular program information. Alternatively, the program recommendation system may be configured in such a manner that both the recommended program information and the popular program information are extracted. The modification is advantageous in providing more alternatives to the user.

In the case where it is judged that recommended program information has been selected (YES in Step S82), the program recording determiner 730 judges whether a program including a recommended scene is recorded in the recording medium 715, based on program identification information corresponding to a recommended scene attached to recommended scene information included in the recommended program information extracted by the recommended program information extractor 729 (Step S83). In Step S83, it is preferred to judge whether a recommended scene itself is recorded in the recording medium 715 based on the start point of time and the end point of time of the recommended scene, in addition to a judgment as to whether a program is recorded. In view of this, in the case where it is judged that a program including a recommended scene, or a recommended scene itself is not recorded in the recording medium 715 (NO in Step S83), the routine proceeds to Step S88.

If, on the other hand, it is judged that a program including a recommended scene, or a recommended scene itself is recorded in the recording medium 715 (YES in Step S83), the specific scene extractor 733 displays the recommended program on the monitor 711 (Step S84). In performing this operation, the specific scene extractor 733 may display a start point of time and an end point of time of a recommended scene, a time duration of a recommended scene, and a captured image or a video image in a recommended scene, simultaneously with the title of a program.

Further alternatively, the program recommendation server 6 may attach priority to each of the recommended scenes, based on a value obtained by integrating a frequency distribution with respect to each of the recommended scenes, or a peak frequency in a frequency distribution in accordance with a frequency distribution of each of the recommended scenes created by the recommended scene creator 759; and transmit the recommended scenes with the priorities to the program viewing terminal 5. In the modification, in displaying a recommended scene, the specific scene extractor 733 may further preferably display the recommended scene according to the size of a text proportional to the priority, or the size of the captured image. The modification is advantageous in allowing the user to determine the priority of a recommended scene in a program at a glance.

If a recommended scene is displayed on the monitor 711 in Step S84, the specific scene extractor 733 judges whether user designation on selecting and reproducing a recommended scene has been issued (Step S85). If it is judged that user designation on selecting and reproducing a recommended scene has not been issued (NO in Step S85), the routine proceeds to Step S88. If, on the other hand, it is judged that user designation on selecting and reproducing a recommended scene has been issued (YES in Step S85), the specific scene extractor 733 extracts program identification information for identifying the program selected by the user, and the start point of time of the recommended scene from the recommended program information. Then, the reproduction controller 716 reads out program information corresponding to the program identification information extracted by the specific scene extractor 733, and reproduces the recommended scene from the start point of time extracted by the specific scene extractor 733 (Step S86).

Then, the specific scene extractor 733 judges whether reproduction of the recommended scene is ended (Step S87). If it is judged that reproduction of the recommended scene is not ended (NO in Step S87), the specific scene extractor 733 waits until reproduction of the recommended scene is ended.

If, on the other hand, it is judged that reproduction of the recommended scene is ended (YES in Step S87), the specific scene extractor 733 judges whether reproduction of all the recommended scene information included in the recommended program information transmitted by the program recommendation server 6 is ended (Step S88). If it is judged that reproduction of all the recommended scene information is not ended (NO in Step S88), the routine returns to Step S83, and a judging operation as to whether reproduction of the rest of the recommended scene information is ended is performed. If, on the other hand, it is judged that reproduction of all the recommended scene information is ended (YES in Step S88), all the operations of the routine are ended.

If, on the other hand, it is judged that recommended program information has not been extracted, in other words, it is judged that popular program information has been extracted (NO in Step S82), the program recording determiner 730 judges that a program including a popular scene is recorded in the recording medium 715, based on program identification information corresponding to a popular scene attached to popular scene information included in the popular program information extracted by the recommended program information extractor 729 (Step S89). In Step S89, it is preferred to judge whether a popular scene itself is recorded in the recording medium 715 based on the start point of time and the end point of time of the popular scene, in addition to a judgment as to whether a program is recorded. In view of this, in the case where it is judged that a program including a popular scene, or a popular scene itself is not recorded in the recording medium 715 (NO in Step S89), the routine proceeds to Step S94.

If, on the other hand, it is judged that a program including a popular scene, or a popular scene itself is recorded in the recording medium 715 (YES in Step S89), the specific scene extractor 733 displays the popular program on the monitor 711 (Step S90). In performing this operation, the specific scene extractor 733 may display a start point of time and an end point of time of a popular scene, a time duration of a popular scene, and a captured image or a video image in a popular scene, simultaneously with the title of a program.

Further alternatively, the program recommendation server 6 may attach priority to each of the popular scenes, based on a value obtained by integrating a frequency distribution with respect to each of the popular scenes, or a peak frequency in a frequency distribution in accordance with a frequency distribution of each of the popular scenes created by the recommended scene creator 759; and transmit the popular scenes attached with the priorities to the program viewing terminal 5. In the modification, in displaying a popular scene, the specific scene extractor 733 may further preferably display the popular scene according to the size of a text proportional to the priority, or the size of the captured image. The modification is advantageous in allowing the user to determine the priority of a popular scene in a program at a glance.

If a popular scene is displayed on the monitor 711 in Step S90, the specific scene extractor 733 judges whether user designation on selecting and reproducing a popular scene has been issued (Step S91). If it is judged that user designation on reproducing a popular scene has not been issued (NO in Step S91), the routine proceeds to Step S94. If, on the other hand, it is judged that user designation on reproducing a popular scene has been issued (YES in Step S91), the specific scene extractor 733 extracts program identification information for identifying the program selected by the user, and the start point of time of the popular scene from the popular program information. Then, the reproduction controller 716 reads out program information corresponding to the program identification information extracted by the specific scene extractor 733, and reproduces the popular scene from the start point of time extracted by the specific scene extractor 733 (Step S92).

Then, the specific scene extractor 733 judges whether reproduction of the popular scene is ended (Step S93). If it is judged that reproduction of the popular scene is not ended (NO in Step S93), the specific scene extractor 733 waits until reproduction of the popular scene is ended.

If, on the other hand, it is judged that reproduction of the popular scene is ended (YES in Step S93), the specific scene extractor 733 judges whether reproduction of all the popular scene information included in the popular program information transmitted by the program recommendation server 6 is ended (Step S94). If it is judged that reproduction of all the popular scene information is not ended (NO in Step S94), the routine returns to Step S89, and a judging operation as to whether reproduction of the rest of the popular scene information is ended is performed. If, on the other hand, it is judged that reproduction of all the popular scene information is ended (YES in Step S94), all the operations of the routine are ended.

In Step S83, in the case where the program recording determiner 730 judges that a program including a recommended scene, or a recommended scene has already been reproduced by the user, in addition to a judgment as to whether a program including a recommended scene is recorded, the routine may proceed to an operation of reproducing a succeeding recommended scene, without reproducing the recommended scene which has already been reproduced. In performing the above operation, a reproduction-completed flag is set to a reproduced part of the program recorded in the recording medium 715, in association with user information for identifying the user who reproduced the part, along a time axis. This enables to determine which scene in the program has been browsed by each of the users. This eliminates the need of displaying a recommended scene in Step S84, in the case where the recommended scene has already been reproduced.

As described above, the program recommendation system in the embodiment is operable to allow users to directly perform a marking operation with respect to a scene of preference in a program; administer favorite scenes by the program recommendation server 6 with respect to each of the users; define the users having similar marking information as a group; generate marking frequencies in the group, and recommend a scene relating to other preference to the users, based on the marking frequencies. Thereby, the users are enabled to efficiently view minimally required scenes, as compared with a case of viewing a whole program. Also, even if there is a program, e.g. a popular program, with respect to which almost all the users may perform a marking operation, the program recommendation system is operable to recommend a certain scene in a program customized to a user group by deleting the viewing inclination of the total users in generating recommended program information in the group.

Next, a first applied example of the program recommendation system in the second embodiment is described. FIG. 16 is a diagram showing an example of a data structure on marking information to be communicated between the marking transmitter 727 and the marking receiver 750. The marking information shown in FIG. 16 has a data structure to be used in the case where a user specified by the user information "A" performed a marking operation with respect to a program specified by the program ID "1" for seven minutes from the start point of time of the program. The program viewing terminal 5 transmits marking information including the user information "A", the program ID "1", and time information indicating that a marking operation has been performed for seven minutes from the start point of time of the program.

FIG. 17 is a diagram showing an example of a data structure on marking information with respect to each of the users registered in the program recommendation server 6, which is stored in the marking DB 755. In the case where marking information including the user ID "A" and the program ID "1" has been transmitted, as described above, the user manager 751 checks whether the user ID "A" is registered in the user attribute DB 752. If it is judged that the user ID "A" is registered, the received marking information shown in FIG. 16 is registered in the marking DB 755. Thereby, as shown in FIG. 16, marking information 1001 relating to the user ID "A" is added to the marking DB 755.

In this example, user IDs "B", "C", and "D" are correlated to the program ID "1", in addition to the user ID "A". Marking information 1002 includes the user ID "B", the program ID "1", and time information indicating that a marking operation has been performed for a time duration from 2 to 8 minutes after start of the program. Marking information 1003 includes the user ID "C", the program ID "1", and time information indicating that a marking operation has been performed for a time duration from 5 to 12 minutes after start of the program. Marking information 1004 includes the user ID "C", the program ID "1", and time information indicating that a marking operation has been performed twice i.e. for a time duration from 1 to 8 minutes and a time duration from 16 to 25 minutes after start of the program.

The community marking statistics section 756 extracts users who performed a marking operation with respect to a program having marking information identical to the received marking information, and determines a degree of similarity between the marking information for grouping.

Figure 18:
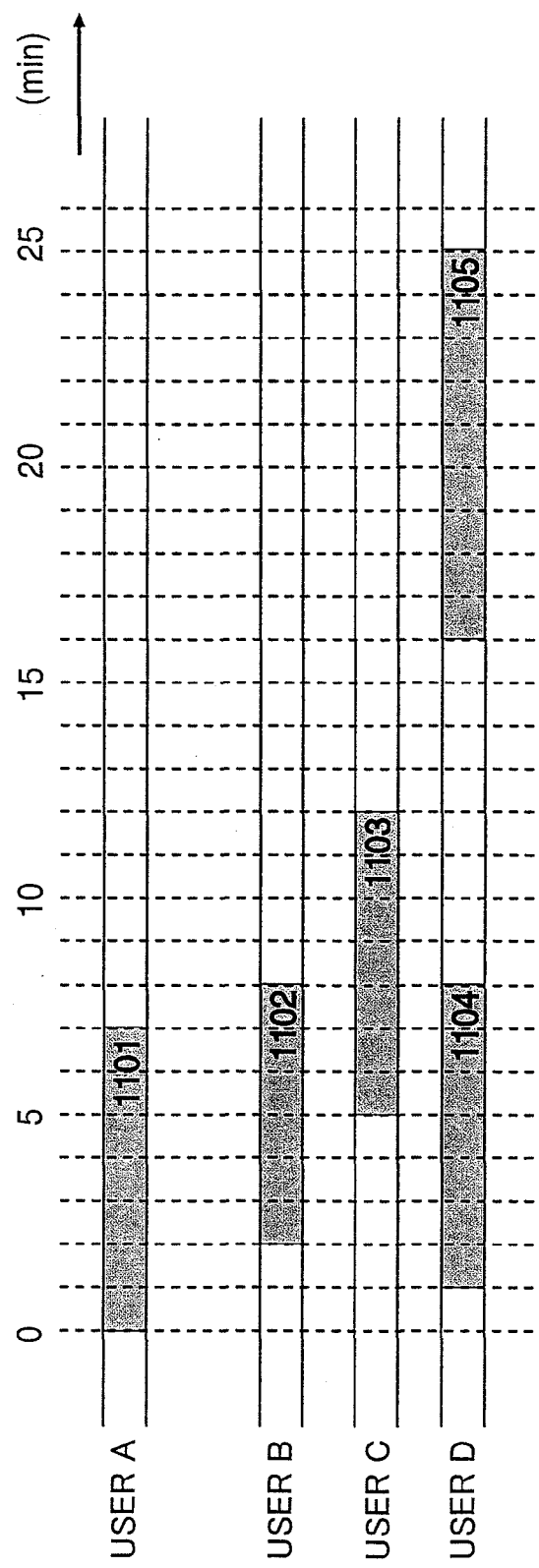
FIG. 18 is a timing chart showing the marking information in the second embodiment along a time axis.

FIG. 18 is a timing chart showing the marking information illustrated in FIG. 17 along a time axis. A marking period 1101 in the program "1" selected by the user "A" is seven minutes from the point of time 0 minute after start of the program to the point of time 7 minutes after start of the program. A marking period 1102 in the program "1" selected by the user "B", which is stored in the marking DB 755, is seven minutes from the point of time 2 minutes after start of the program to the point of time 9 minutes after start of the program. The marking period 1101 of the user "A", and the marking period 1102 of the user "B" are overlapped with each other with 50% or more. Accordingly, the user "A" and the user "B" are defined as an identical group.

A marking period 1103 in the program "1" selected by the user "C", which is stored in the marking DB 755, is seven minutes from the point of time 5 minutes after start of the program to the point of time 12 minutes after start of the program. The marking period 1101 of the user "A", and the marking period 1103 of the user "C" are not overlapped with each other with 50% or more. Accordingly, the user "C" is not defined as the group of the user "A".

A marking period 1104 in the program "1" selected by the user "D", which is stored in the marking DB 755, is seven minutes from the point of time 1 minute after start of the program to the point of time 8 minutes after start of the program. A marking period 1105 in the program "1" selected by the user "D", which is stored in the marking DB 755, is seven minutes from the point of time 16 minutes after start of the program to the point of time 25 minutes after start of the program. The marking period 1101 of the user "A", and the marking period 1104 of the user "D" are overlapped with each other with 50% or more. Accordingly, the user "D" is defined as the group of the user "A".

As described above, the community marking statistics section 756 extracts users having marking information similar to the marking information received by the marking receiver 750 from the marking information registered in the marking DB 755, based on the marking information received by the marking receiver 750 for grouping.

FIG. 19 is a diagram showing an example of a data structure of the marking DB 755, in which marking information including the program IDs other than the program ID "1" is stored. As described above, the data structure of the marking DB 755 shown in FIG. 19 stores marking information of the user "Z", in addition to the marking information of the user "B" and the user "D" having marking information similar to the marking information of the user "A" and belonging to the same group as the user "A", and also stores marking information including the program IDs other than the program ID "1".

The user ID "A" is correlated to the program ID "2" and the program ID "4", in addition to the program ID "1". Marking information 1201 includes the user ID "A", the program ID "2", and time information indicating that a marking operation has been performed with respect to a program identified by the program ID "2" from the point of time 0 minute after start of the program to the point of time 40 minutes after start of the program. Marking information 1202 includes the user ID "A", the program ID "4", and time information indicating that a marking operation has been performed with respect to a program identified by the program ID "4" from the point of time 30 minutes after start of the program to the point of time 70 minutes after start of the program, and from the point of time 90 minutes after start of the program to the point of time 110 minutes after start of the program.

The user ID "B" is correlated to the program ID "2", the program ID "3", and the program ID "4", in addition to the program ID "1". Marking information 1203 includes the user ID "B", the program ID "2", and time information indicating that a marking operation has been performed with respect to a program identified by the program ID "2" from the point of time 10 minutes after start of the program to the point of time 50 minutes after start of the program. Marking information 1204 includes the user ID "B", the program ID "3", and time information indicating that a marking operation has been performed with respect to a program identified by the program ID "3" from the point of time 10 minutes after start of the program to the point of time 50 minutes after start of the program. Marking information 1205 includes the user ID "B", the program ID "4", and time information indicating that a marking operation has been performed with respect to a program identified by the program ID "4" from the point of time 30 minutes after start of the program to the point of time 70 minutes after start of the program.

The user ID "Z" is correlated to the program ID "3" and the program ID "4", in addition to the program ID "1". Marking information 1206 includes the user ID "Z", the program ID "3", and time information indicating that a marking operation has been performed with respect to a program identified by the program ID "3" from the point of time 10 minutes after start of the program to the point of time 50 minutes after start of the program. Marking information 1207 includes the user ID "Z", the program ID "4", and time information indicating that a marking operation has been performed with respect to a program identified by the program ID "4" from the point of time 20 minutes after start of the program to the point of time 60 minutes after start of the program.

The user ID "D" is correlated to the program ID "2", the program ID "3", and the program ID "4", in addition to the program ID "1". Marking information 1208 includes the user ID "D", the program ID "2", and time information indicating that a marking operation has been performed with respect to a program identified by the program ID "2" from the point of time 20 minutes after start of the program to the point of time 40 minutes after start of the program. Marking information 1209 includes the user ID "D", the program ID "3", and time information indicating that a marking operation has been performed with respect to a program identified by the program ID "3" from the point of time 20 minutes after start of the program to the point of time 30 minutes after start of the program. Marking information 1210 includes the user ID "D", the program ID "4", and time information indicating that a marking operation has been performed with respect to a program identified by the program ID "4" from the point of time 40 minutes after start of the program to the point of time 50 minutes after start of the program, and from the point of time 100 minutes after start of the program to the point of time 120 minutes after start of the program.

Figure 20:
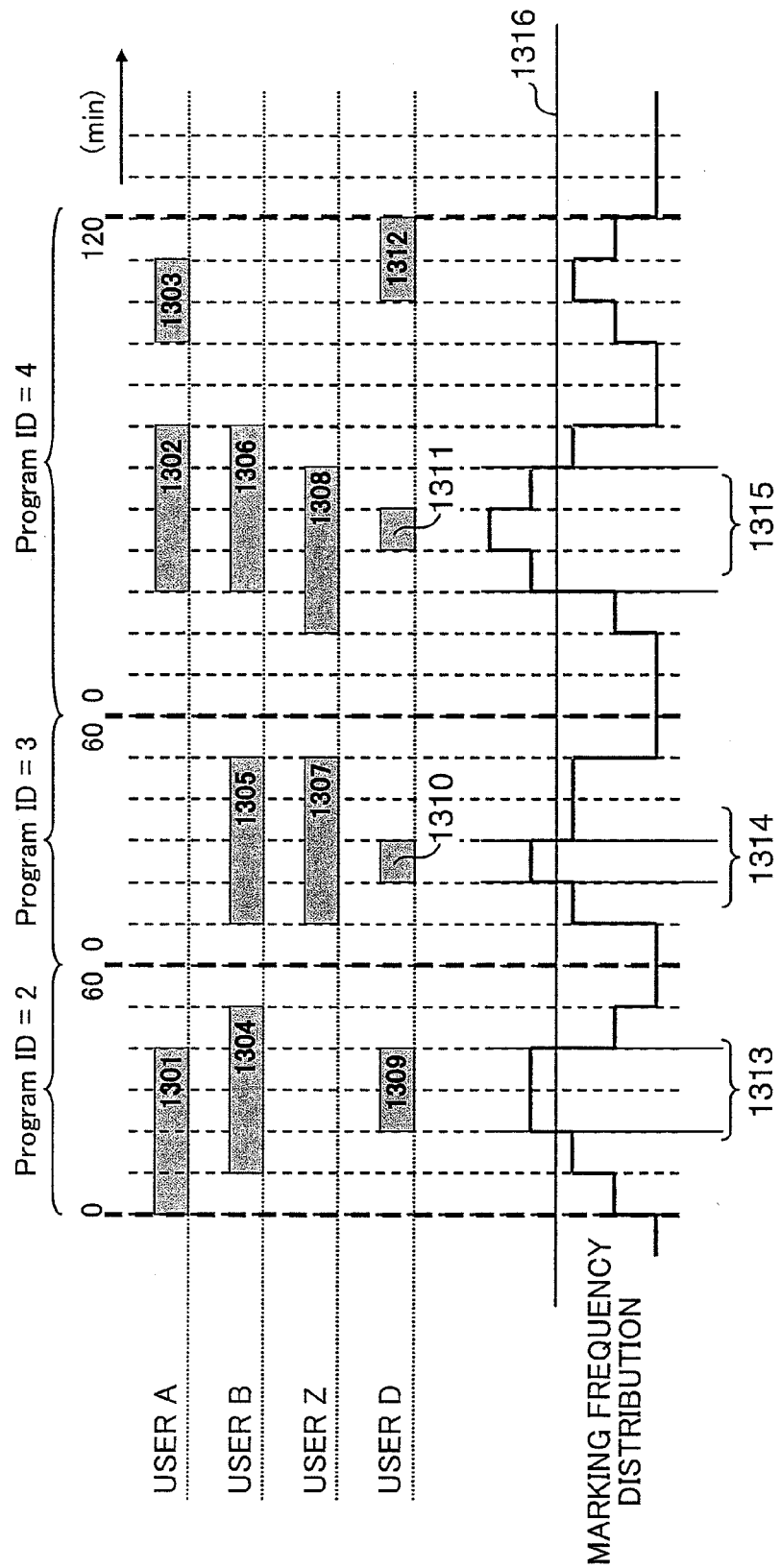
FIG. 20 is a conceptual diagram for describing a method for calculating marking information in the first applied example of the second embodiment.

Next, a method for calculating marking information in a group is described. FIG. 20 is a conceptual diagram for describing a method for calculating marking information in a group to be performed by the community marking statistics section 756 in the program recommendation server 6 of the program recommendation system in the embodiment. In horizontal axis direction in FIG. 20, a leading time zone from 0 to 60 minutes represents a reproducing time of a program having the program ID "2"; a succeeding time zone from 0 to 60 minutes represents a reproducing time of a program having the program ID "3"; and a succeeding time zone from 0 to 120 minutes represents a reproducing time of a program having the program ID "4".

Marking period 1301, 1302, and 1303 in FIG. 20 each is a marking period of the user "A". The marking period 1301 is 40 minutes corresponding to a time duration from start of the program "2" to the point of time 40 minutes after start of the program "2", which is represented by the marking information 1201 in FIG. 19. The marking period 1302 is 40 minutes corresponding to a time duration from the point of time 30 minutes after start of the program "4" to the point of time 70 minutes after start of the program "4", which is represented by the marking information 1202 in FIG. 19. The marking period 1303 is 20 minutes corresponding to a time duration from the point of time 90 minutes after start of the program "4" to the point of time 110 minutes after start of the program "4", which is represented by the marking information 1202 in FIG. 19.

Marking period 1304, 1305, and 1306 in FIG. 20 each is a marking period of the user "B". The marking period 1304 is 40 minutes corresponding to a time duration from the point of time 10 minutes after start of the program "2" to the point of time 50 minutes after start of the program "2", which is represented by the marking information 1203 in FIG. 19. The marking period 1305 is 40 minutes corresponding to a time duration from the point of time 10 minutes after start of the program "3" to the point of time 50 minutes after start of the program "3", which is represented by the marking information 1204 in FIG. 19. The marking period 1306 is 40 minutes corresponding to a time duration from the point of time 30 minutes after start of the program "4" to the point of time 70 minutes after start of the program "4", which is represented by the marking information 1205 in FIG. 19.

Marking periods 1307 and 1308 in FIG. 20 each is a marking period of the user "Z". The marking period 1307 is 40 minutes corresponding to a time duration from the point of time 10 minutes after start of the program "3" to the point of time 50 minutes after start of the program "3", which is represented by the marking information 1206 in FIG. 19. The marking period 1308 is 40 minutes corresponding to a time duration from the point of time 20 minutes after start of the program "4" to the point of time 60 minutes after start of the program which is represented by the marking information 1207 in FIG. 19.

Marking periods 1309, 1310, 1311, and 1312 in FIG. 20 each is a marking period of the user "D". The marking period 1309 is 20 minutes corresponding to a time duration from the point of time 20 minutes after start of the program "2" to the point of time 40 minutes after start of the program "2", which is represented by the marking information 1208 in FIG. 19. The marking period 1310 is 10 minutes corresponding to a time duration from the point of time 20 minutes after start of the program "3" to the point of time 30 minutes after start of the program "3", which is represented by the marking information 1209 in FIG. 19. The marking period 1311 is 10 minutes corresponding to a time duration from the point of time 40 minutes after start of the program "4" to the point of time 50 minutes after start of the program "4", which is represented by the marking information 1210 in FIG. 19. The marking period 1312 is 20 minutes corresponding to a time duration from the point of time 100 minutes after start of the program "4" to the point of time 120 minutes after start of the program "4", which is represented by the marking information 1210 in FIG. 19.

The marking frequency distribution in FIG. 20 indicates a statistical result of marking information of the programs "2", "3", and "4" in the community group. In the embodiment, a statistical operation is performed by counting the number of marking operations with respect to each of the users per unit time (in this example, every ten minutes), and generating a frequency distribution. Then, a marking frequency distribution customized to a community group is generated by: normalizing the frequency distribution by the total marking period of all the users in the community group; and subtracting a statistical result on marking information of the total user group obtained by normalization, from a statistical result on marking information of the community group obtained by normalization. In this example, statistical results on the program "2", and "4" obtained by normalization are approximated to "0" in any unit time. Accordingly, a marking frequency distribution obtained by subtracting the statistical result of the total user group is substantially the same as the marking frequency distribution in the community group.

Then, the recommended scene creator 759 creates a recommended scene by performing threshold judgment using a predetermined threshold value 1316, based on the marking frequency distribution in the community group obtained by normalization.

In this example, a program scene 1313 in the program "2" having a marking frequency larger than the threshold value 1316 and corresponding to a time duration from 20 to 40 minutes after start of the program "2"; a program scene 1314 in the program "3" having a marking frequency larger than the threshold value 1316 and corresponding to a time duration from 20 to 30 minutes after start of the program "3"; and a program scene in the program "4" having a marking frequency larger than the threshold value 1316 and corresponding to a time duration from 30 to 50 minutes after start of the program "4" are created, as recommended scenes. Then, recommended information including time information for specifying a recommended scene, and program identification information for identifying a program including a recommended scene is transmitted to the program viewing terminal 5. Priority is attached to a recommended scene whose integrated value of frequency distribution of each of the program scenes is higher, i.e. in the order of the program scene 1315, the program scene 1313, and the program scene 1314.

The recommendation receiver 728 in the program viewing terminal 5 receives the recommended information. Then, the program recording determiner 730 judges whether each of the recommended scenes is recorded in the recording medium 715. If it is judged that a recommended scene is not recorded in the recording medium 715, the recommended scene is deleted from the recommended information. The recording medium 715 also deletes a recommended scene which has already been reproduced by the user to disable displaying the recommended scene. In this example, since the recommended scene 1313 and the recommended scene 1315 have already been reproduced by the user "A", the recommended scene 1313 and the recommended scene 1315 are not recommended to the user "A".

In this applied example, the program recommendation system is operable to recommend the user "A the program scene 1314, which has not been viewed by the user "A", and is estimated to be highly preferred by the user "A" based on a viewing result of the other users.

Next, a second applied example of the program recommendation system in this embodiment is described. FIG. 21 is a diagram showing an example of a data structure of a marking DB to be used in the second applied example of the second embodiment. Similarly to FIG. 19, FIG. 21 shows marking information of programs, other than the program "1", selected by all the users in a group constituted of users having marking information similar to the marking information with respect to the program "1" selected by a user, which has been received by the marking receiver 750. The data structure shown in FIG. 21 is different from the data structure shown in FIG. 19 in that a flag 1400 representing a kind of user manipulation is provided.

The data structure of the marking DB 755 has the flag 1400 as described above. In other words, a flag representing a kind of user manipulation with respect to a program is attached to marking information to be transmitted from the program viewing terminal 5 to the program recommendation server 6. For instance, in the case where a marking operation is performed with respect to the program "A" for a time duration from 10 to 50 minutes after start of the program "A", marking information constituted of program identification information for identifying the program "A", marking period information or packet identification information representing a time duration from 10 to 50 minutes, and identification information for identifying user manipulation on marking is transmitted. In performing the above operation, the user manipulation is not limited to a marking operation. Alternatively, identification information for identifying user manipulation such as a reproducing operation, a deleting operation, or a fast-forwarding operation may be attached.

The data structure shown in FIG. 21 is a result obtained by defining the users "B", "C", and "D" having marking information similar to the marking information indicating that the user "A" has performed a marking operation with respect to the program "1", which has been received by the marking receiver 750, as a group; and extracting marking information of the programs, other than the program "1", in the group.

The user ID "A" is correlated to the program ID "2", in addition to the program ID "1". Marking information 1401 includes marking periods and flags indicating that the program "2" has been fast-forwarded for time durations from 0 to 5 minutes, from 15 to 35 minutes, and from 50 to 80 minutes after start of the program "2"; and the program "2" has been reproduced for time durations from 5 to 15 minutes, from 35 to 50 minutes, and from 80 to 95 minutes after start of the program "2". In the flag 1400 shown in FIG. 21, the symbol "F" indicates a fast-forwarding operation, the symbol "P" represents a reproducing operation, the symbol "M" represents a marking operation, and the symbol "D" represents a deleting operation.

The user ID "B" is correlated to the program ID "2", in addition to the program ID "1". The marking information 1402 includes marking periods and flags indicating that the program "2" has been reproduced for time durations from 30 to 35 minutes, from 45 to 65 minutes, and from 70 to 95 minutes after start of the program "2"; the program "2" has been marked for a time duration from 35 to 45 minutes after start of the program "2"; and the program "2" has been fast-forwarded for a time duration from 65 to 70 minutes after start of the program "2".

The user ID "C" is correlated to the program ID "2", in addition to the program ID "1". The marking information 1403 includes marking periods and flags indicating that the program "2" has been reproduced for time durations from 0 to 10 minutes, from 20 to 35 minutes, from 40 to 85 minutes, and from 90 to 125 minutes after start of the program "2"; and the program "2" has been marked for time durations from 10 to 20 minutes, from 35 to 40 minutes, and from 85 to 90 minutes after start of the program "2".

The user ID "D" is correlated to the program ID "2", in addition to the program ID "1". The marking information 1404 includes marking periods and flags indicating that the program "2" has been reproduced for time durations from 0 to 25 minutes, from 30 to 65 minutes, from 70 to 85 minutes, and from 90 to 125 minutes after start of the program "2"; deleted for time durations from 25 to 30 minutes and from 65 to 70 minutes after start of the program "2"; and the program "2" has been marked for a time duration from 85 to 95 minutes after start of the program "2".

In defining a group by extracting marking information similar to the marking information of the user "A", which has been received by the marking receiver 750, judgment as to whether user manipulation on a program coincides with each other may be performed, in addition to determining similarity simply based on an overlapped state of marking information on a time axis or packets. In other words, grouping may be performed by judging that users who performed the same manipulation in an identical scene in an identical program have substantially the same preferences.

Figure 22:
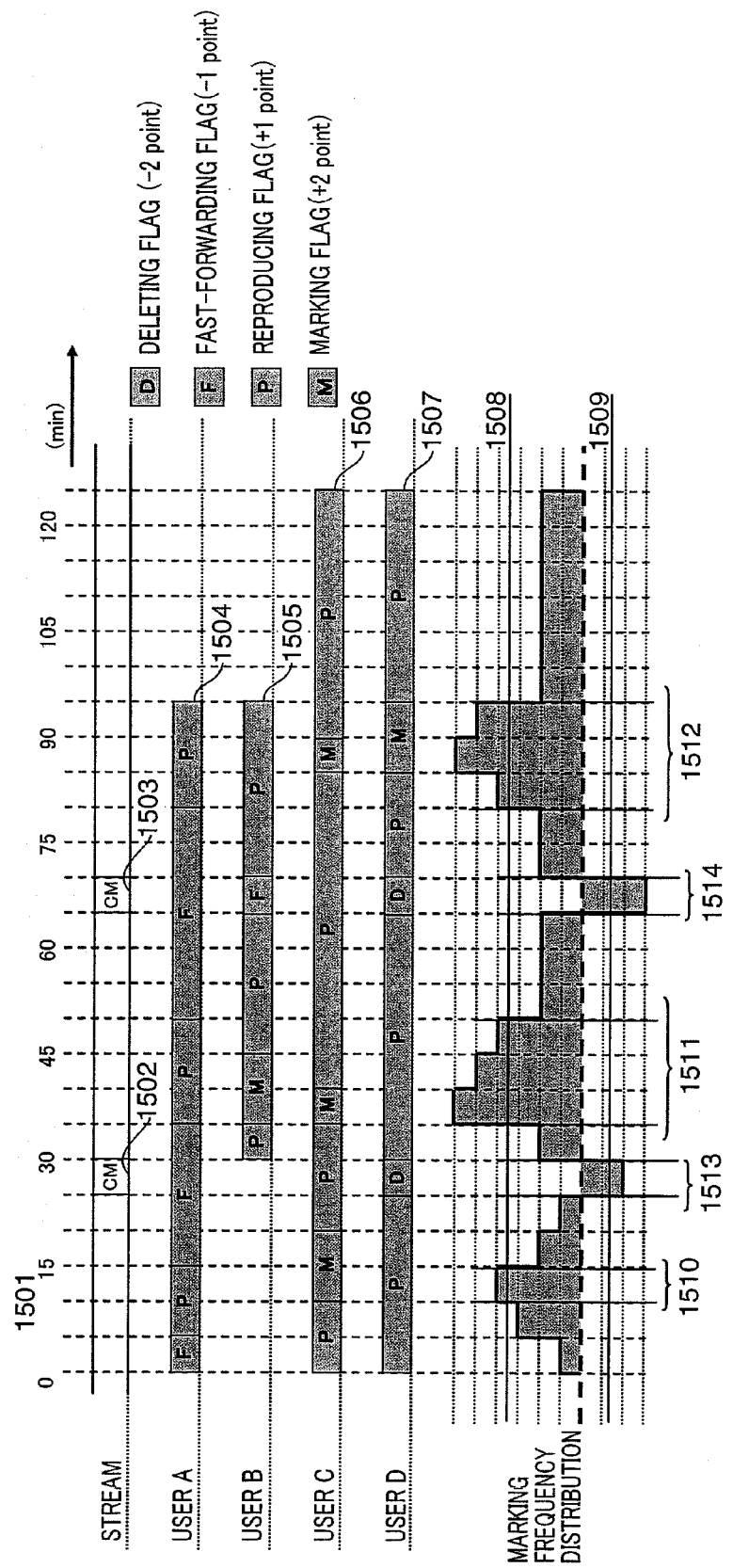
FIG. 22 is a conceptual diagram for describing a method for calculating marking information in the second applied example of the second embodiment.

FIG. 22 is a conceptual diagram for describing a method for calculating marking information obtained by grouping the users as shown in FIG. 21.

A data stream in FIG. 22 virtually illustrates a data stream of the program "2" along a time axis. A CM (commercial message) is broadcast for time durations from 25 to 30 minutes, and from 65 to 70 minutes after a program start point of time 1501.

A marking period 1504 shown in FIG. 22 is a marking period in the program "2", other than the program "1" selected by the user "A", which is represented by the marking information 1401 in FIG. 21. During the marking period 1504, the user "A" performed a fast-forwarding operation for time durations from 0 to 5 minutes, from 15 to 35 minutes, and from 50 to 80 minutes after the program start point of time 1501; and performed a reproducing operation for time durations from 5 to 15 minutes, from 35 to 50 minutes, and from 80 to 95 minutes after the program start point of time 1501.

A marking period 1505 shown in FIG. 22 is a marking period in the program "2", other than the program "1" selected by the user "B", which is represented by the marking information 1402 in FIG. 21. During the marking period 1505, the user "B" performed a reproducing operation for time durations from 30 to 35 minutes, from 45 to 65 minutes, and from 70 to 95 minutes after the program start point of time 1501; performed a marking operation for a time duration from 35 to 45 minutes after the program start point of time 1501; and performed a fast-forwarding operation for a time duration from 65 to 70 minutes after the program start point of time 1501.

A marking period 1506 shown in FIG. 22 is a marking period in the program "2", other than the program "1" selected by the user "C", which is represented by the marking information 1403 in FIG. 21. During the marking period 1506, the user "C" performed a reproducing operation for time durations from 0 to 10 minutes, from 20 to 35 minutes, from 40 to 85 minutes, and from 90 to 125 minutes after the program start point of time 1501; and performed a marking operation for time durations from 10 to 20 minutes, from 35 to 40 minutes, and from 85 to 90 minutes after the program start point of time 1501.

A marking period 1507 shown in FIG. 22 is a marking period in the program "2", other than the program "1" selected by the user "D", which is represented by the marking information 1404 in FIG. 21. During the marking period 1507, the user "D" performed a reproducing operation for time durations from 0 to 25 minutes, from 30 to 65 minutes, from 70 to 85 minutes, and from 90 to 125 minutes after the program start point of time 1501; performed a deleting operation for time durations from 25 to 30 minutes, and from 65 to 70 minutes after the program start point of time 1501; and performed a marking operation for a time duration from 85 to 95 minutes after the program start point of time 1501.

The marking frequency distribution shown in FIG. 22 represents an aggregate calculation result of marking information in the community group. In the embodiment, an aggregate calculating operation is performed by summing up the points which differs depending on user manipulation information represented by marking information per unit time in a program. In this example, for instance, "−2" points are added to the deleting flag "D"; "−1" point is added to the fast-forwarding flag "F"; "+1" point is added to the reproducing flag "P"; and "+2" points are added to the marking flag "M", as a weight per unit time. The aggregate calculation result is normalized by the total marking period to which the manipulation flags of all the users in the community group are attached.

Similarly to the above, marking information of the programs, other than the program "1", selected by the total user group constituted of all the users registered in the program recommendation server 6 and including the community group is calculated, and the aggregate calculation result is normalized by the total marking period to which the manipulation flags of all the users in the total user group are attached. Then, an aggregate calculation result customized to the community group is created by subtracting an aggregate calculation result of marking information of the total user group obtained by normalization, from an aggregate calculation result of marking information of the community group obtained by normalization. In this example, aggregate calculation results of the total user group obtained by normalization are approximated to "0" in any unit time. Accordingly, an aggregate calculation result obtained by subtracting the aggregate calculation result of the total user group is substantially the same as the aggregate calculation result before the subtracting operation is performed.

Then, a recommended scene is generated by performing threshold judgment using a predetermined threshold value with respect to the aggregate calculation result obtained by performing the subtracting operation. In this example, viewing recommended information on a program scene, and deleting recommended information on a program scene are created by using two threshold values.

Then, the recommended scene creator 759 generates viewing recommended information on viewing recommended scenes 1510, 1511, and 1512 out of the program scenes, by extracting marking time information whose aggregate calculation result obtained by normalization and subtraction is larger than a first threshold value 1508 corresponding to the higher threshold value of the two threshold values. The recommended scene creator 759 generates deleting recommended information on deleting recommended scenes 1513 and 1514 out of the program scenes, by extracting marking period information whose aggregate calculation result obtained by normalization and subtraction is smaller than a second threshold value 1509 corresponding to the lower threshold value of the two threshold values.

The viewing recommended information and the deleting recommended information are transmitted to the program viewing terminal 5 by the recommendation transmitter 760, as recommended information including program identification information for identifying each of the programs, and a start point of time and an end point of time of each of the program scenes.

The recommended information is received by the recommendation receiver 728 in the program viewing terminal 5. Then, judgment is made as to whether the program included in the recommended information is recorded in the recording medium 715, based on the program identification information included in the recommended information. If it is judged that the program is recorded in the recording medium 715, the program recording determiner 730 judges whether a program scene in each of the programs is recorded, based on the start point of time and the end point of time of each of the program scenes. In the case where it is judged that the program scene is recorded, and the program scene is a deleting recommended scene, the program recording determiner 730 automatically deletes the program scene. In the case where it is judged that the program scene is recorded, and the program scene is a viewing recommended scene, the program recording determiner 730 extracts program information based on the start point of time of the program scene, creates a thumbnail image, displays the thumbnail image on the monitor 711, and prompts the user to view the program scene.

In the above example, if the program "2" is CM, and each of the users performs a fast-forwarding operation or a deleting operation at a time position corresponding to CM, a time duration corresponding to CM in the program is selected, as a deleting recommended scene.

In the case where deleting recommended information on a program scene is received, and the program scene is deleted, the program viewing terminal 5 may preferably link the time position in the program when the deleting operation is started, and the time position in the program when the deleting operation is ended.

As described above, in the applied examples, calculating marking information of each of the users by weighted summation depending on the kind of user manipulation enables to recommend deleting a program scene or fast-forwarding a program scene, in addition to recommending viewing a program scene. This is advantageous in recommending a program in a sophisticated manner, as compared with the embodiment without incorporating the applied examples.

Third Embodiment

Figure 23:
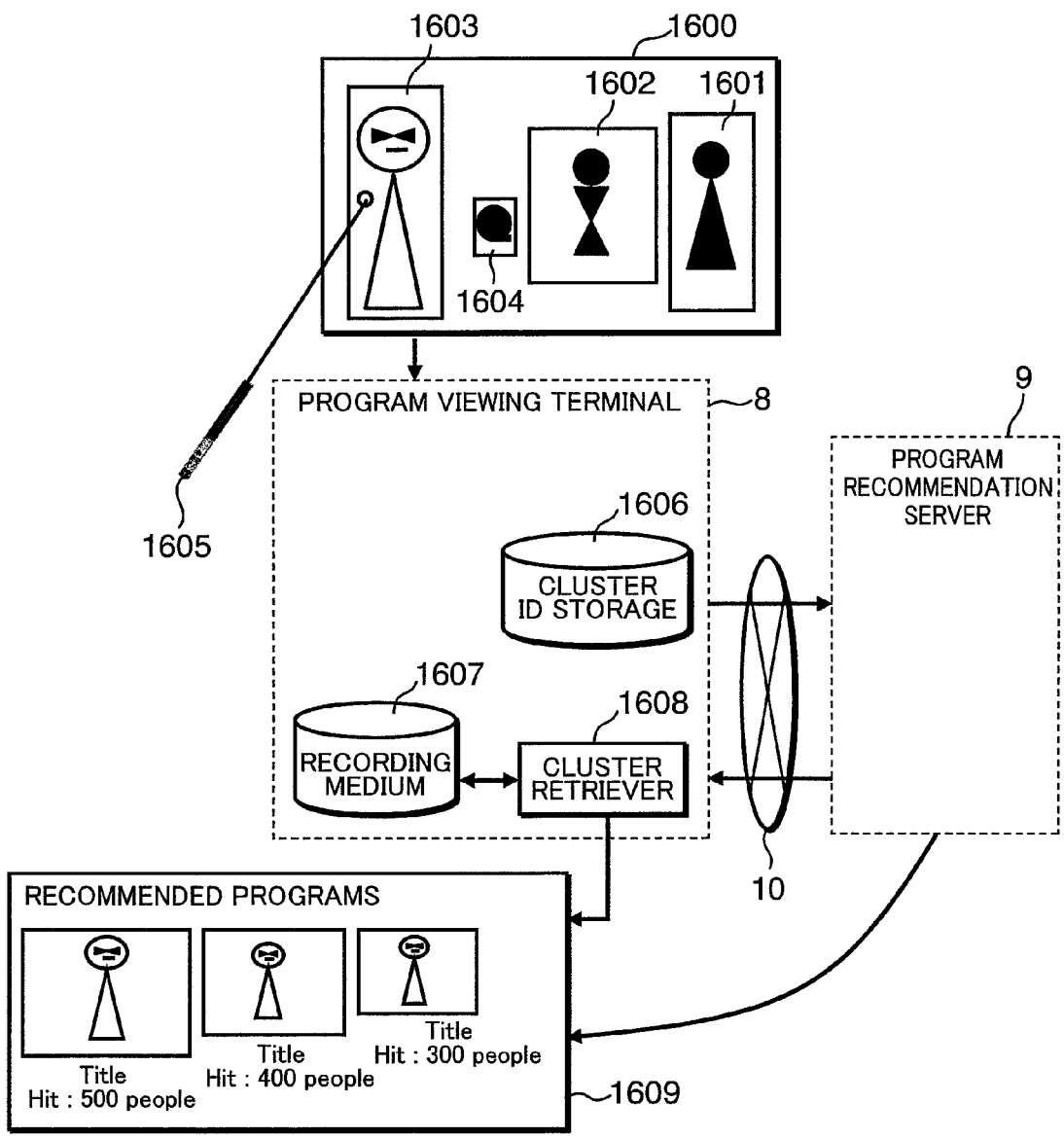
FIG. 23 is a conceptual diagram showing a schematic arrangement of a program recommendation system in a third embodiment of the invention.

In this section, the third embodiment of the invention is described. FIG. 23 is a conceptual diagram showing a schematic arrangement of a program recommendation system in the third embodiment.

In the third embodiment, a program to be distributed by utilizing a broadcast wave or an IP network has a feature that one screen 1600 in a program is divided into clusters 1601, 1602, 1603, and 1604. Each of the clusters 1601 through 1604 is selectively broadcast by using a pointing device 1605 such as a laser pointer or a mouse. The clusters 1602 through 1604 are broadcast in a state that an object e.g. an actor or a commodity in a program is included. Coordinate information of each of the clusters is multiplexed in program information. The coordinate information may be distributed to a program viewing terminal 8 from a cluster information providing server for providing coordinate information of clusters, via a network 10, in synchronism with broadcast of a program. In the modification, the program viewing terminal 8 transmits program identification information for identifying a received broadcast program to the unillustrated cluster information providing server, and receives cluster information corresponding to the transmitted program identification information.

A user selects an object of his or her preference among the objects to be displayed on the screen, using the pointing device 1605. For instance, in the case where a laser pointer is used as the pointing device, a photosensitive film is attached to a surface of a screen of a monitor connected to the program viewing terminal 8 to extract coordinate information of a site irradiated by a laser. In the case where a mouse is used as the pointing device, a marker such as an arrow is displayed on the screen to extract coordinate information of a site clicked by the user using the mouse. The cluster information multiplexed in the program is recorded in a cluster ID storage 1606. The program viewing terminal 8 judges as to which cluster the coordinate information selected by the pointing device 1605 belongs, based on the coordinate information selected by the pointing device 1605; acquires cluster identification information based on the multiplexed cluster information; and transmits the cluster identification information to a program recommendation server 9 to be connected via the general-purpose network 10.

The program recommendation server 9 extracts users having cluster identification information identical to the received cluster identification information, from a cluster DB of the users for grouping. The program recommendation server 9 generates a ranking by calculating cluster identification information for identifying the other selected clusters, which is correlated to the users in the group, with respect to all the users in the group; and generates a recommended cluster based on the ranking. Then, the program recommendation server transmits the recommended cluster to the program viewing terminal 8.

A cluster retriever 1608 in the program viewing terminal 8 retrieves, from a recording medium (a recording section) 1607, a program including the cluster, based on cluster identification information for identifying a recommended cluster; displays the cluster on a selection screen 1609, as a recommended cluster; and prompts the user to select the cluster. In response to selecting the recommended cluster, a program including the recommended cluster is reproduced from a predetermined reproducing time position. The recommended cluster may be displayed in a display format based on a priority degree of recommendation by e.g. changing the size of a thumbnail image or changing the color. In FIG. 23, thumbnail images are displayed with different sizes depending on the number of users who selected the recommended cluster.

Figure 24:
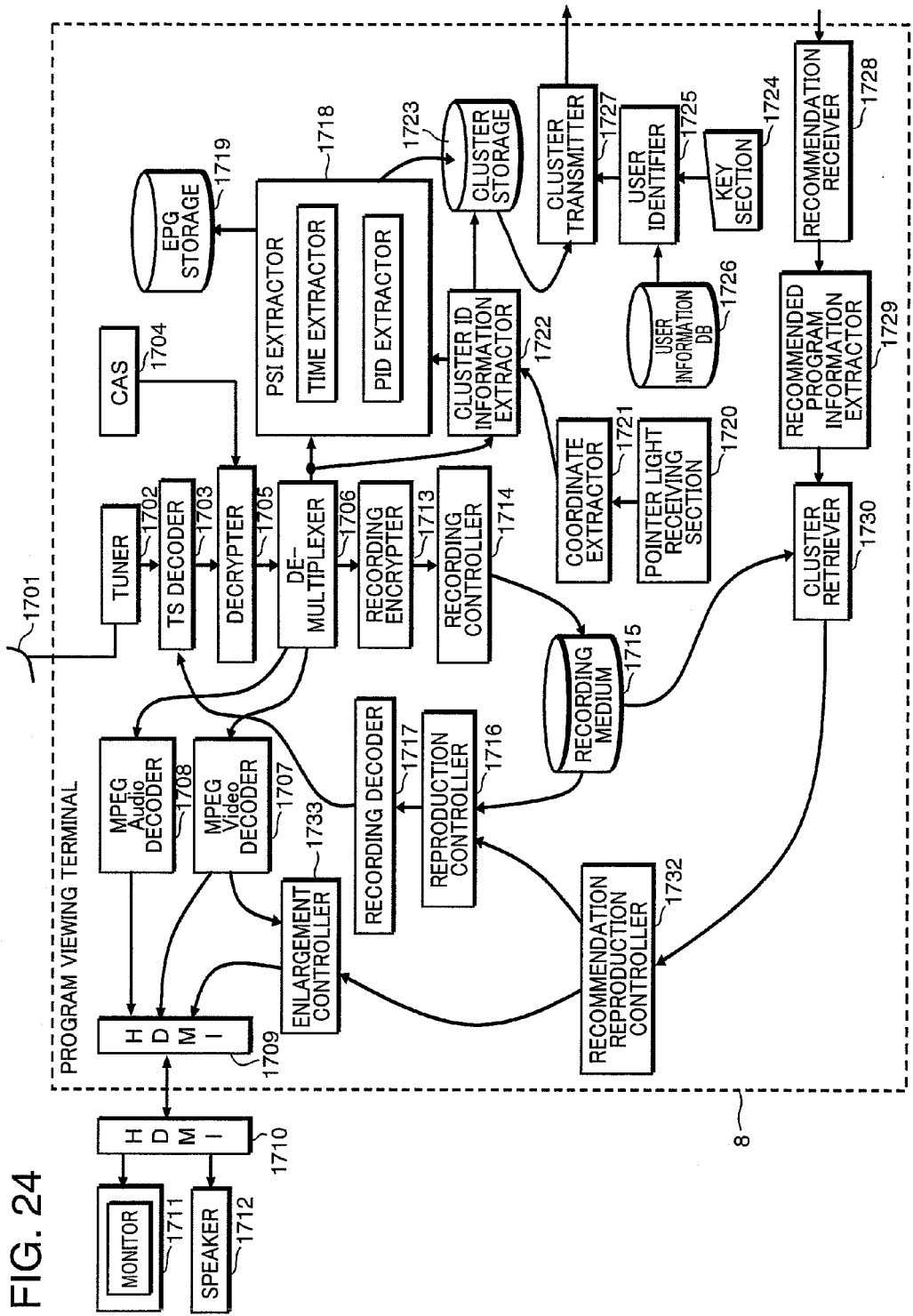
FIG. 24 is a block diagram showing an arrangement of a program viewing terminal in the third embodiment.
Figure 25:
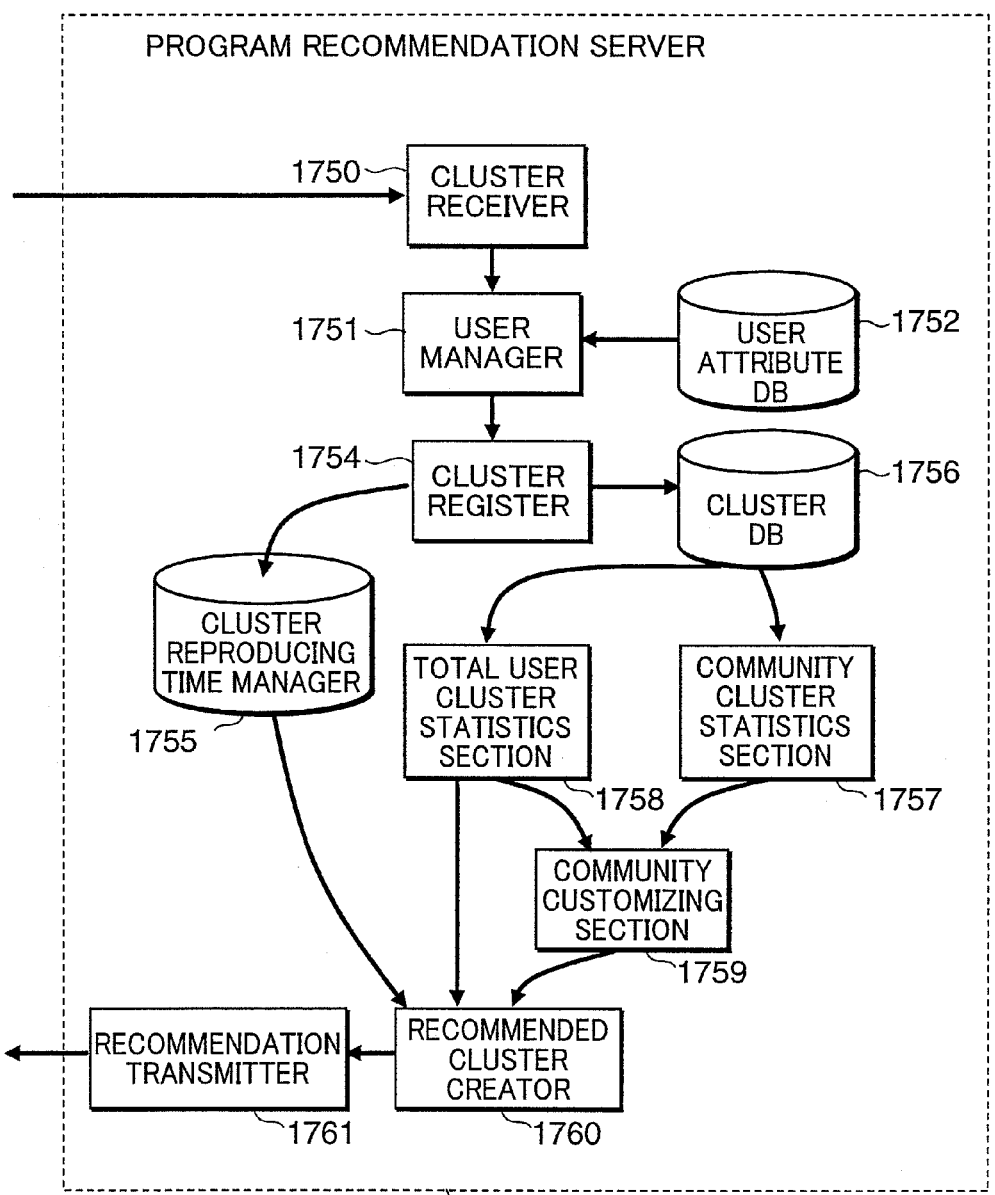
FIG. 25 is a block diagram showing an arrangement of a program recommendation server in the third embodiment.

Next, an arrangement of the program recommendation system in the third embodiment is described. FIG. 24 is a block diagram showing an arrangement of a program viewing terminal in the third embodiment. FIG. 25 is a block diagram showing an arrangement of a program recommendation server in the third embodiment. The program recommendation system in the third embodiment includes e.g. program viewing terminals such as program recording apparatuses, and the program recommendation server 9 communicatively connected to the program viewing terminals 8 via the general-purpose network such as the Internet. The arrangement of the program recommendation system in the third embodiment is substantially the same as the arrangement of the program recommendation system shown in FIG. 2. In ordinary use, the program recommendation server 9 is connected to the program viewing terminals 8. However, in the embodiment, to simplify the description, an arrangement that the program recommendation server 9 is connected to a single program viewing terminal 8 is described.

The program viewing terminal 8 allows a user to view a program, record a program, reproduce a recorded program, delete a recorded program, or reserve recording a program by receiving the program from a broadcast wave or an IP network. The program viewing terminal 8 includes an antenna 1701, a tuner 1702, a TS decoder 1703, a CAS 1704, a decrypter 1705, a de-multiplexer 1706, an MPEG Video decoder 1707, an MPEG Audio decoder 1708, an HDMI terminal 1709, a recording encrypter 1713, a recording controller 1714, a recording medium 1715, a reproduction controller 1716, a recording decoder 1717, a PSI extractor 1718, an EPG storage 1719, a pointer light receiving section 1720, a coordinate extractor 1721, a cluster identification information extractor 1722, a cluster storage 1723, a key section 1724, a user identifier 1725, a user information DB 1726, a cluster transmitter 1727, a recommendation receiver 1728 a recommended program information extractor 1729, a cluster retriever 1730, a recommendation reproduction controller 1732, and an enlargement controller 1733.

The program recommendation server 9 includes a cluster receiver 1750, a user manager 1751, a user attribute DB 1752, a cluster register 1754, a cluster reproducing time manager 1755, a cluster DB 1756, a community cluster statistics section 1757, a total user cluster statistics section 1758, a community customizing section 1759, a recommended cluster creator 1760, and a recommendation transmitter 1761.

The tuner 1702 is operable to receive a broadcast wave of a predetermined channel from a broadcast wave such as a terrestrial digital broadcast or a BS digital broadcast, and output the received broadcast wave to the TS decoder 1703. The TS decoder 1703 is operable to demodulate the received broadcast wave in a general transport stream format, and output the demodulated broadcast wave to the decrypter 1705.

The CAS 1704 is a general Conditional Access System, and is operable to read out encryption key information from an IC card recorded with user registration information and an encryption key on a program, and output the encryption key information to the decrypter 1705.

The decrypter 1705 is operable to decode a broadcast signal which has been subjected to demodulation and encryption by the TS decoder 1703, with use of the encryption key from the CAS 1704, decrypt the encrypted program information, and output the decryption result to the de-multiplexer 1706.

The de-multiplexer 1706 is operable to de-multiplex the multiplexed program information. The program information includes at least video information, audio information, and program administration information in a multiplexed manner. After the de-multiplexing, the video information is outputted to the MPEG Video decoder 1707, the audio information is outputted to the MPEG Audio decoder 1708, and the program administration information is outputted to the PSI extractor 1718.

The MPEG Video decoder 1707 is operable to demodulate the video information from the de-multiplexer 1706, convert the demodulated video information into video data, and output the video data to the HDMI terminal 1709. The MPEG Audio decoder 1708 is operable to demodulate the audio information from the de-multiplexer 1706, convert the demodulated audio information into audio data, and output the audio data to the HDMI terminal 1709. The HDMI terminal 1709 is connected to an external HDMI terminal 1710 via an HDMI cable. The HDMI terminal 1710 is connected to a monitor 1711 and a speaker 1712.

The HDMI terminal 1709, 1710 is a general interface for use in transmitting/receiving video information and audio information, and is operable to authenticate the program viewing terminal 8, the monitor 1711, and the speaker 1712 with each other, share an encryption key, encrypt video data or audio data by the shared encryption key, and output the encrypted data to the monitor 1711 or the speaker 1712.

The monitor 1711 is a general device for displaying video information on a program, and is operable to decode the encrypted video data received by the HDMI terminal 1710, and output the decoded video data on a program. The speaker 1712 is a general device for outputting audio information on a program, and is operable to decode the encrypted audio data received by the HDMI terminal 1710, and output the encrypted audio data on a program.

The recording encrypter 1713 performs an encryption operation to record received program information into a recording medium. The recording encrypter 1713 is operable to encrypt the program information inputted from the de-multiplexer 1706, and output the encryption result to the recording controller 1714. The recording encrypter 1713 performs an encryption operation peculiar to a recording medium for recording program information. For instance, in the case where the recording medium is DVD-RAM, CPRM (Content Protection for Rewritable Media) is used, and in the case where the recording medium is Blu-ray disc or HD-DVD, AACS (Advanced Access Content System) is used.

The recording controller 1714 controls recording program information encrypted by the recording encrypter 1713 into the recording medium 1715. The recording controller 1714 is operable to record program information into a recording medium by performing a modulating operation or an error correction coding operation peculiar to the recording medium.

The recording medium 1715 is a computer-readable recording medium for recording program information. Examples of the recording medium 1715 are a magnetic recording disk such as a hard disk, an optical disc such as a DVD or a Blu-ray disc, a semiconductor memory such as an SD card, and a magnetooptical recording medium such as an MO/MD.

The reproduction controller 1716 is operable to read out the program information recorded in the recording medium 1715. Generally, the recording controller 1714, the recording medium 1715, and the reproduction controller 1716 constitute a drive system.

The recording decoder 1717 performs a decoding operation corresponding to an encryption operation to be performed by the recording encrypter 1713. The recording decoder 1717 is operable to decode the encrypted program information recorded in the recording medium 1715, and output the decoded program information to the TS decoder 1703. An operation of reproducing the program information outputted to the TS decoder 1703 is substantially the same as the operation of reproducing a program received by the antenna 1701.

The PSI extractor 1718 is operable to extract a PSI (Program Specific Information) from the program administration information extracted by the de-multiplexer 1706. The PSI primarily includes a PMT (Program Map Table), an EIT (Event Information Table), and a TOT (Time Offset Table).

The PMT stores therein each of packet identification information such as images or sounds included in a program. In this arrangement, as long as packet identification information such as images or sounds are obtainable from the PMT, a program can be reproduced by extracting packets attached with the packet identification information.

The EIT includes information relating to a program such as the name of a program, a broadcast date of a program, and broadcast contents of a program. The EPG (Electronic Program Guide) is created primarily with use of the information in the EIT.

The EPG storage 1719 is operable to create EPG information by using the EIT in the PSI extracted by the PSI extractor 1718, and store the EPG information. In the case where the pointing device is constituted of a laser pointer, the pointer light receiving section 1720 extracts a position designated by the laser pointer. In the case where the pointing device is constituted of a mouse, the pointer light receiving section 1720 is not necessary.

The coordinate extractor 1721 is operable to convert position information representing the position, which is irradiated by the laser pointer and extracted by the pointer light receiving section 1720, into coordinate information in a screen. The coordinate extractor 1721 is operable to acquire two-dimensional coordinate information, wherein horizontal direction in the screen of the monitor 1711 is defined as x-axis, and vertical direction in the screen of the monitor 1711 is defined as y-axis.

The cluster identification information extractor 1722 is operable to extract cluster information from program administering information which is de-multiplexed by the de-multiplexer 1706 and multiplexed into program data. The cluster information includes cluster identification information for identifying a cluster defined in a program, and coordinate information of each of the clusters. A cluster is partial information of a program, which is designated by a two-dimensional coordinate system in a moving picture frame, and is divided information selectable by a user. For instance, an object such as an actor appearing in a frame may be defined as a cluster. Identical cluster identification information is attached to identical objects which appear in sequential frames along a time axis, and is defined by changing coordinates in synchronism with a located position of the object in the unit of a frame of a program. The cluster in the embodiment has a rectangular shape. Coordinate information of a cluster includes a coordinate corresponding to an uppermost and leftmost pixel in the cluster, and a coordinate corresponding to a lowermost and rightmost pixel in the cluster.

The cluster identification information extractor 1722 is operable to identify a cluster selected by the user by extracting coordinate information of a program selected by the user using the pointing device, and comparing the coordinate information with cluster information multiplexed in the program; extract cluster identification information for identifying the cluster selected by the user; and output the cluster identification information to the cluster storage 1723.

In the embodiment, the cluster information is multiplexed in a program. The invention is not limited to the above. Alternatively, cluster information may be obtained from the cluster information providing server connected to the general-purpose network 10. In the modification, the program viewing terminal 8 transmits program identification information for identifying a program viewed and selected by the user to the cluster information providing server, and obtains cluster information corresponding to the program viewed and selected by the user. Further alternatively, in response to selection of a cluster by the user, program identification information for identifying a program designated by the cluster, time information of the program, and coordinate information of the selected cluster may be transmitted to the cluster information providing server; and cluster information corresponding to the selected cluster may be obtained.

The cluster storage 1723 is operable to store cluster identification information for identifying a cluster selected by the user using the pointing device, which has been extracted by the cluster identification information extractor 1722, time information of a program corresponding to a point of time of selecting a cluster extracted by the PSI extractor 1718, coordinate information of a cluster with respect to each of the frames, in correlation to program identification information for identifying the program. In the case where the user selects multiple clusters, the cluster storage 1723 stores multiple cluster identification information.

The key section 1724 is a section for accepting input from a user, and is constituted of a remote controller and a front panel. The user information DB 1726 is a database, in user information of all the users using the program viewing terminal 8 is registered. The user identifier 1725 is operable to identify the user using the program viewing terminal 8, based on user information to be inputted by using the key section 1724, and user information stored in the user information DB 1726. The user identifier 1725 is operable to output user information of a user currently using the program viewing terminal 8 to the cluster transmitter 1727, in the case where user authentication is successful.

The cluster transmitter 1727 establishes connection with the program recommendation server 9 to be connected by the general-purpose network 10; and transmits, to the program recommendation server 9, cluster identification information for identifying a cluster selected by the user, which is stored in the cluster storage 1723, time information of a program corresponding to a point of time of selecting the cluster, program identification information for identifying the program, and coordinate information of a cluster with respect to each of the frames, in correlation to user identification information from the user identifier 1725, as user cluster information.

The recommendation receiver 1728 is operable to receive recommended information relating to a program recommended by the program recommendation server 9 via the general-purpose network 10. The recommended program information extractor 1729 is operable to extract recommended program information from the recommended information received by the recommendation receiver 1728. The recommended program information is information capable of uniquely identifying a recommended program. For instance, the recommended program information may include program identification information; or a broadcast date and channel information concerning a program. The recommended program information extractor 1729 is operable to extract cluster identification information for identifying a recommended cluster in a recommended program, which is attached to the recommended program information, cluster time information representing a time of a recommended cluster in the program, and coordinate information of a recommended cluster.

The cluster retriever 1730 is operable to retrieve the recording medium 1715 based on program identification information for identifying a recommended program, which has been extracted by the recommended program information extractor 1729; and judge whether the program is recorded in the recording medium 1715. If it is judged that the program is recorded, the cluster retriever 1730 judges whether a recommended cluster is recorded in the recording medium 1715, based on the cluster identification information for identifying a recommended cluster recommended by the program recommendation server 9, or time information representing a start point of time of a recommended cluster. If it is judged that a recommended cluster is recorded in the recording medium 1715, the cluster retriever 1730 outputs recommended cluster information to the recommendation reproduction controller 1732.

The recommendation reproduction controller 1732 is operable to reproduce a recommended program from a reproducing start point of time of the recommended cluster, based on the recommended cluster information to be inputted from the cluster retriever 1730. The recommendation reproduction controller 1732 is operable to call up a first frame screen of the recommended cluster from the recording medium 1715 before reproducing the recommended program; display the first frame screen as a thumbnail image; and prompt the user to reproduce the program. In performing the above operation, the recommendation reproduction controller 1732 is operable to call up recommended clusters out of the multiple recommended cluster information, create thumbnail images of the recommended clusters, and display the thumbnail images as a list. In the case where the user selects one of the thumbnail images, the recommendation reproduction controller 1732 reproduces the program from a reproducing start point of time of the recommended cluster corresponding to the thumbnail image.

The enlargement controller 1733 is operable to enlargedly display a recommended cluster in a program in accordance with user manipulation on setting. In performing this operation, coordinate information of a cluster is attached to recommended cluster information to be transmitted from the program recommendation server 9. Accordingly, recommended cluster in a program is enlargedly displayed based on the coordinate information. Thus, the user is allowed to enlargedly display and reproduce a cluster of his or her preference. The enlargement controller 1733 is also operable to enlargedly display a coordinate range of recommended cluster information in response to output from the MPEG Video decoder 1707. The enlargement controller 1733 is operable to enlargedly display a recommended cluster with a maximum size in a screen.

Next, an arrangement of the program recommendation server 9 in the program recommendation system in this embodiment is described.

The cluster receiver 1750 is operable to receive user cluster information including program identification information for identifying a program selected by each of the users, cluster identification information for identifying a selected cluster in a program, user information for identifying a user who selected a cluster, time information of a program corresponding to a point of time of selecting a cluster, and coordinate information of a cluster with respect to each of the frames, from the cluster transmitters 1727 in the program viewing terminals 8 connected to the general-purpose network 10. The program identification information includes program identification information capable of uniquely identifying a selected program; or a broadcast date, channel information, and broadcast station identification information concerning a selected program. The received user cluster information is outputted to the user manager 1751.

The user attribute DB 1752 is operable to administer user identification information for identifying a registered user, and, as required, user attribute information such as the name, the sex, and the address/telephone number of a user; the name of the manufacturer/model of a program viewing terminal; the resolution of a monitor to be connected; and the network ID of a program viewing terminal, as a user registration list. A user performs a user registration in advance with respect to the program reservation server 9 for program recommendation. The user registration comprises: notifying user registration information such as setting the user name, and notification of the address/telephone number of a user to the program recommendation server 9; and generating user information, notifying the user information to the user, and storing/administering user attribute information notified from the user, in correlation to the user information generated in the user attribute DB 1752 by the program recommendation server 9.

The user manager 1751 is operable to judge whether the user specified by the received user information coincides with a user registered in the program recommendation server 9.

The user manager 1751 is operable to retrieve user information coincident with the received user information from the user registration list stored in the user attribute DB 1752. In the case where it is judged that the received user information is registered in the user attribute DB 1752, the user manager 1751 judges that the user specified by the received user information is a user registered in the program recommendation server 9, and continues the operation.

If, on the other hand, it is judged that the received user information is not registered in the user attribute DB 1752, the user manager 1751 judges that the user specified by the received user information is not a user registered in the program recommendation server 9, transmits an error message indicating that the user specified by the received user information is not a registered user to the program viewing terminal 8 used by the user, and suspends the operation thereafter. Upon receiving the error message, the program viewing terminal 8 causes the monitor 1711 to display the error message.

In the case where the user manager 1751 judges that the user specified by the received user information coincides with a user registered in the program recommendation server 9, the cluster register 1754 stores the user cluster information received by the cluster receiver 1750 into the cluster DB 1756 with respect to each of the users in correlation to the received user information.

The cluster register 1754 is operable to extract cluster identification information for identifying a selected cluster in the user cluster information, time position information of the cluster in a program, and program identification information for identifying a program including the cluster, and store the extraction result into the cluster reproducing time manager 1755. The cluster reproducing time manager 1755 is operable to store/administer the cluster identification information, the time position information, and the program identification information in correlation to each other. In the case where coordinate information of the cluster in each of the frames in a screen, which is correlated to the time position information, is included in the user cluster information, the cluster reproducing time manager 1755 stores the cluster identification information, the time position information, and the coordinate information.

The community cluster statistics section 1757 is operable to select users having cluster identification information identical to the cluster identification information included in the user cluster information, which has been received by the cluster receiver 1750, from the cluster DB 1756 for grouping. Users having the identical cluster identification information are defined as a group, based on the cluster identification information administered in the cluster DB 1756 in correlation to the user information. The community cluster statistics section 1757 is operable to make up all the clusters other than the cluster identified by the cluster identification information received by the cluster receiver 1750, based on cluster identification information of all the users belonging to the group; and normalize the aggregate calculation result by the number of all the clusters selected by the users in the group.

Unlike the community cluster statistics section 1757 for defining all the users having the cluster identification information received by the cluster receiver 1750 as a community group, the total user cluster statistics section 1758 is operable to define all the users registered in the user attribute DB 1752 i.e. all the users registered in the program recommendation server 9 as a total user group including the community group.

After all the users registered in the program recommendation server 9 are defined as a total user group, the total user cluster statistics section 1758 is operable to make up all the clusters other than the cluster identified by the cluster identification information received by the cluster receiver 1750, based on cluster identification information for identifying clusters of all the users in the total user group; and normalize the aggregate calculation result by the number of all the clusters selected by the users registered in the program recommendation server 9.

The community customizing section 1759 is operable to create a ranking of clusters in the community group, which is customized to the community group, by subtracting an aggregate calculation result obtained by normalization by the total user cluster statistics section 1758, from an aggregate calculation result obtained by normalization by the community cluster statistics section 1757; and outputs the cluster ranking customized to the community group to the recommended cluster creator 1760.

The recommended cluster creator 1760 is operable to extract, as a recommended cluster, upper-ranked clusters in the cluster ranking in the community group, which has been obtained by normalization by the community customizing section 1759; or a cluster whose frequency is judged to be higher than a threshold value, after threshold judgment has been performed by using a frequency of each of the clusters in the cluster ranking. The recommended cluster creator 1760 is operable to call up time information representing an appearing time (reproducing time) of a recommended cluster in a program, and coordinate information of a recommended cluster corresponding to the time information with respect to each of the frames, from the cluster reproducing time manager 1755, based on the cluster identification information corresponding to the recommended cluster. The recommended cluster creator 1760 is operable to create recommended program information including cluster identification information for identifying a recommended cluster, time information of a recommended cluster, coordinate information of a recommended cluster, and program identification information for identifying a program including a recommended cluster.

The recommended cluster creator 1760 is operable to generate a ranking in the order of a larger number of clusters, based on an aggregate calculation result of clusters of all the users, which has been obtained by the total user cluster statistics section 1758; and extract, as a popular cluster, upper-ranked clusters in the ranking, or a cluster whose frequency is judged to be higher than a threshold value, after threshold judgment has been performed by using the aggregate calculation result. The recommended cluster creator 1760 is operable to call up time information representing an appearing time (reproducing time) of a popular cluster in a program, and coordinate information of a popular cluster corresponding to the time information with respect to each of the frames, from the cluster reproducing time manager 1755, based on the cluster identification information corresponding to the popular cluster. The recommended cluster creator 1760 is operable to create popular program information including cluster identification information for identifying a popular cluster in a program, time information of a popular cluster, coordinate information of a popular cluster, and program identification information for identifying a program including a popular cluster. The recommended program information and the popular program information created by the recommended cluster creator 1760 are outputted to the recommendation transmitter 1761, as recommended information.

The recommendation transmitter 1761 establishes connection with the program viewing terminal 8 connected by the general-purpose network 10, and transmits the recommended information including the recommended program information and the popular program information created by the recommended cluster creator 1760 to the program viewing terminal 8.

Next, an operation of the program recommendation system in the embodiment is described. For instance, a user A selects a cluster in a program A by the program viewing terminal 8 owned by the user A. The program viewing terminal transmits user information for identifying the user A, cluster identification information for identifying a cluster multiplexed in the program A, appearance time information of a cluster, coordinate information of a cluster with respect to each of the frames, and program identification information for identifying a program including a cluster to the program recommendation server 9, as user cluster information.

The cluster receiver 1750 in the program recommendation server 9 is operable to receive, from the program viewing terminal 8 owned by the user A, the user cluster information including the user information, the cluster identification information, the time information, the coordinate information, and the program identification information. The user manager 1751 is operable to judge whether the received user information is stored in the user attribute DB 1752. If it is judged that the received user information is stored in the user attribute DB 1752, the user manager 1751 continues the operation, assuming that the user A is a user registered in the program recommendation server 9.

The cluster register 1754 is operable to register the cluster identification information, the time information, the coordinate information, and the program identification information into the cluster DB 1756 in correlation to the user information for identifying the user A. The community cluster statistics section 1757 is operable to define a community group by extracting all the users having cluster identification information identical to the cluster identification information included in the received user cluster information from the cluster DB 1756. The community cluster statistics section 1757 performs a statistical operation with respect to clusters included in the programs other than the program A in the community group. The community cluster statistics section 1757 is operable to generate a ranking of clusters in the order of a larger number of selected clusters, based on the clusters in the programs other than the program A in the community group, and output the ranking to the community customizing section 1759.

The total user cluster statistics section 1758 is operable to define all the users registered in the user attribute DB 1752 in the program reservation server 9, as a total user group including the community group defined by the community cluster statistics section 1757. The total user cluster statistics section 1758 is operable to extract cluster identification information correlated to the user information in the total user group from the cluster DB 1756, and perform a statistical operation with respect to the clusters included in the programs other than the program A. Then, the total user cluster statistics section 1758 is operable to generate a ranking of the clusters in the order of a larger number of selected clusters, based on the clusters included in the programs other than the program A in the total user group, and output the ranking to the community customizing section 1759 and the recommended cluster creator 1760.

The community customizing section 1759 is operable to subtract the cluster ranking created by the total user cluster statistics section 1758 from the cluster ranking created by the community cluster statistics section 1757. Then, the community customizing section 1759 is operable to create ranking information customized to the community group of users who selected a predetermined cluster in the program A, and output the ranking information to the recommended cluster creator 1760.

The recommended cluster creator 1760 is operable to extract a cluster having a cluster number larger than a threshold value, or a predetermined number of upper-ranked clusters, as a recommended cluster, based on the ranking information of the clusters selected by the community group, which has been created by the community customizing section 1759. Then, the recommended cluster creator 1760 is operable to create recommended program information, corresponding to a recommended cluster, including cluster identification information, program identification information, time information, and coordinate information.

The recommended cluster creator 1760 is also operable to extract a cluster having a cluster number larger than a threshold value, or a predetermined number of upper-ranked clusters, as a popular cluster, based on the ranking information of the clusters selected by all the registered users, which has been created by the total user cluster statistics section 1758. The recommended cluster creator 1760 is operable to create popular program information, corresponding to a popular cluster, including cluster identification information, program identification information, time information, and coordinate information. The recommendation transmitter 1761 is operable to output the recommended program information and the popular program information created by the recommended cluster creator 1760 to the program viewing terminal 8 of the user A.

Figure 26:
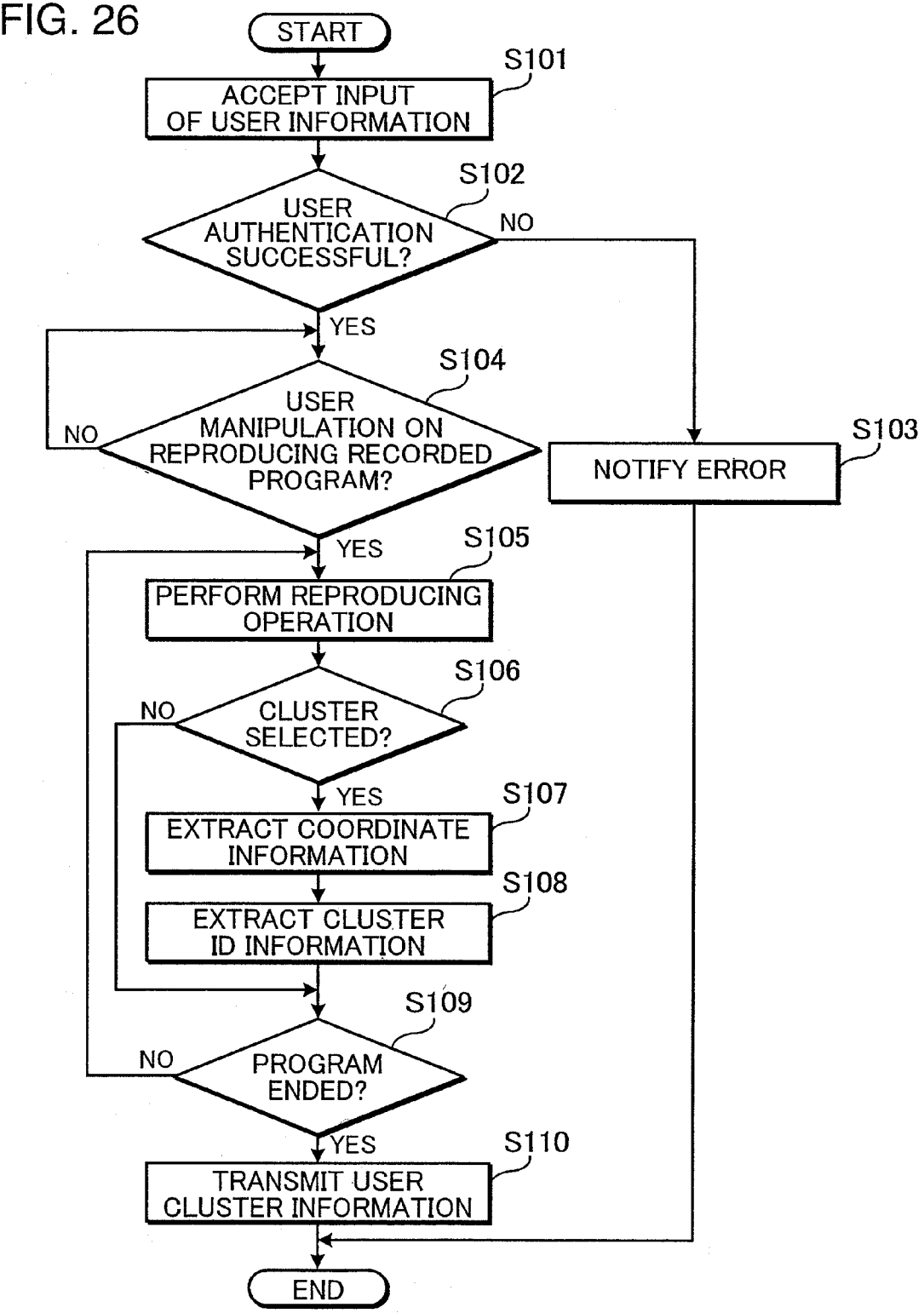
FIG. 26 is a flowchart showing a flow of operation until user cluster information is transmitted from the program viewing terminal in the third embodiment.
Figure 27:
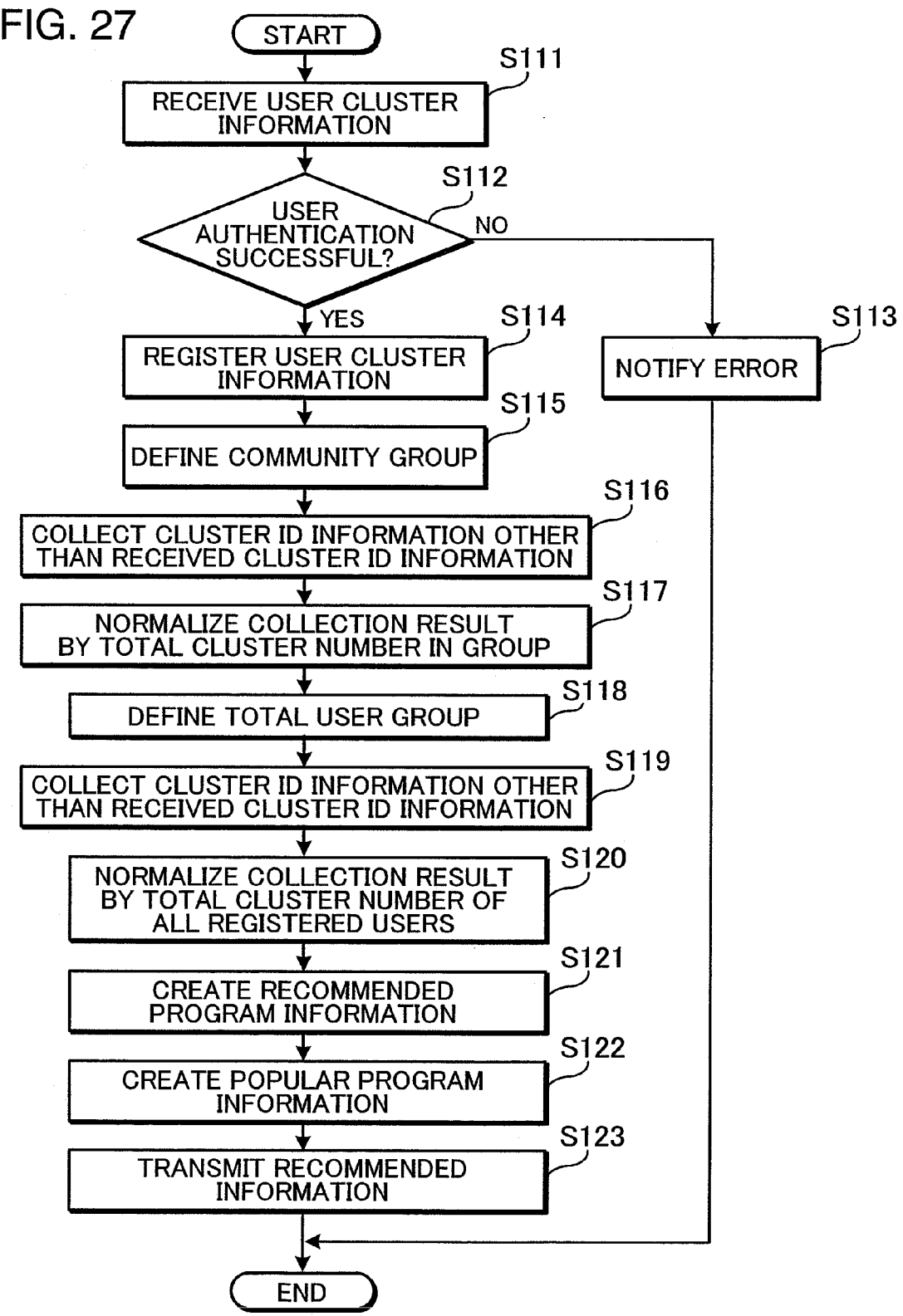
FIG. 27 is a flowchart showing a flow of operation in the program recommendation server in the third embodiment.
Figure 28:
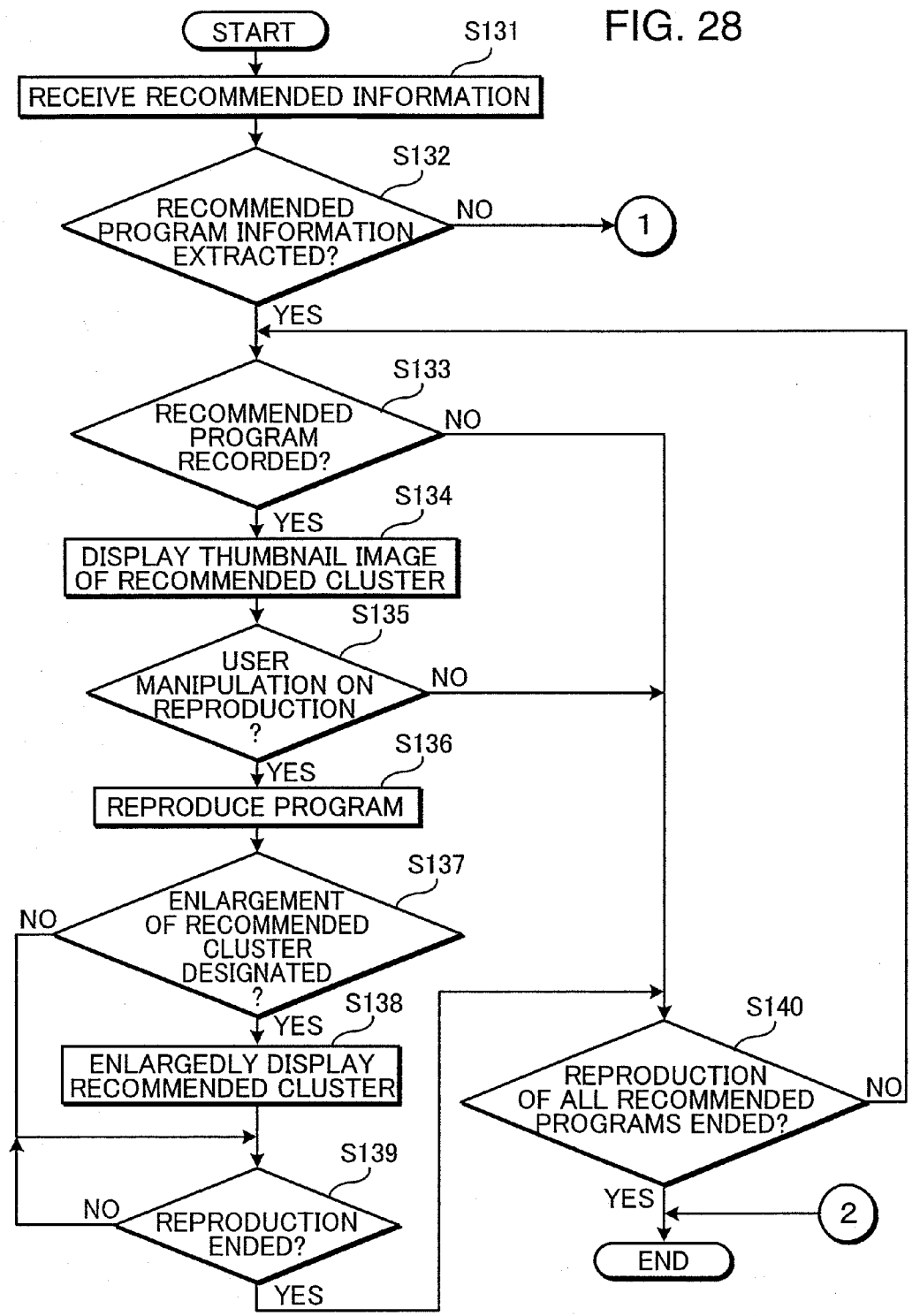
FIG. 28 is a first-half flowchart showing a flow of operation after recommended information is received by the program viewing terminal in the third embodiment.
Figure 29:
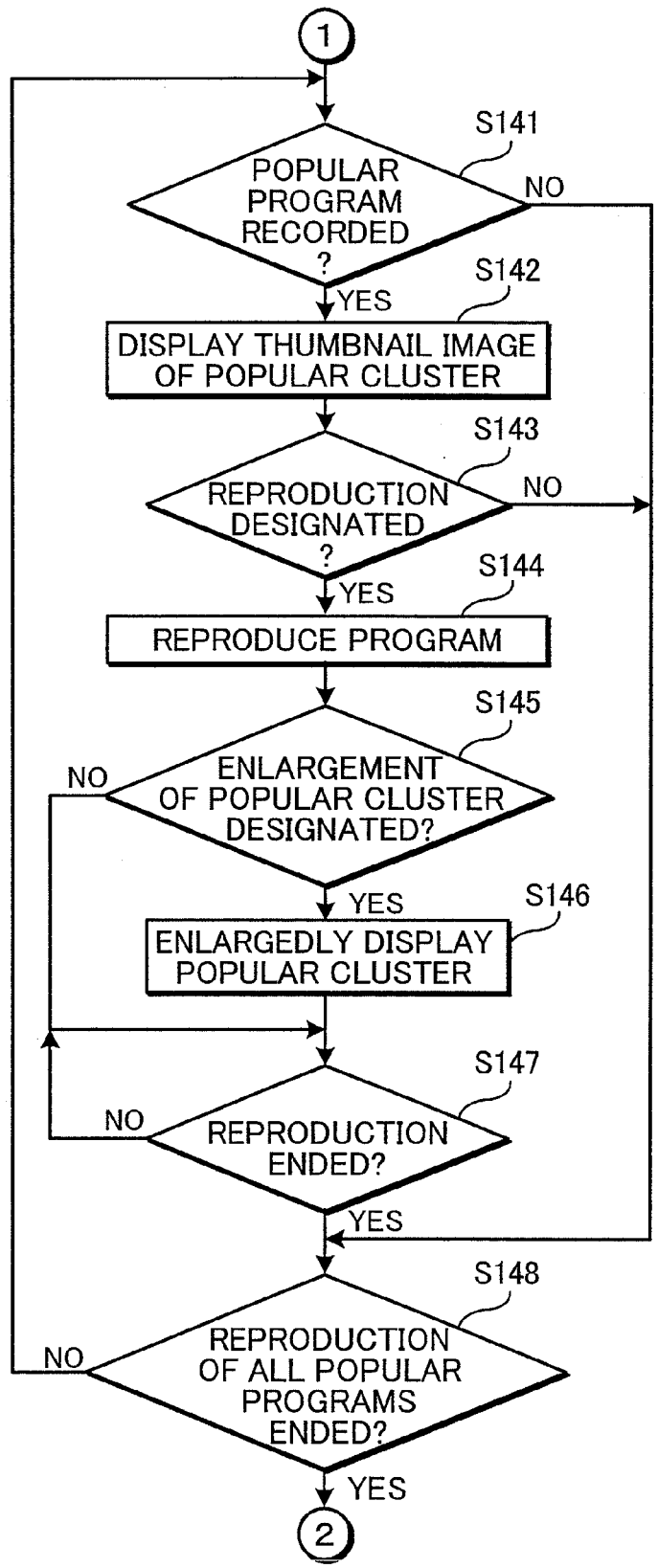
FIG. 29 is a second-half flowchart showing the flow of operation after recommended information is received by the program viewing terminal in the third embodiment.

Next, a flow of operation to be performed by the program recommendation system in this embodiment is described in detail. FIGS. 26 through 29 are flowcharts showing a flow of operation to be performed by the program recommendation system in accordance with the third embodiment. FIG. 26 is a flowchart showing a flow of operation until user cluster information is transmitted from the program viewing terminal in accordance with the third embodiment. FIG. 27 is a flowchart showing a flow of operation to be performed by the program recommendation server in accordance with the third embodiment. FIGS. 28 and 29 are flowcharts showing a flow of operation after recommended information is received by the program viewing terminal in accordance with the third embodiment.

Referring to FIG. 26, first, the user identifier 1725 displays a user authentication screen for allowing a user to perform user authentication on the monitor 1711, and the key section 1724 accepts input of user information by the user and user's log-in to the program viewing terminal 8 (Step S101). Then, the user identifier 1725 judges whether user authentication is successful, in other words, the inputted user information coincides with the user information pre-registered in the user information DB 1726 (Step S102).

If it is judged that user authentication has failed (NO in Step S102), as a result of user authentication, the user identifier 1725 causes the monitor 1711 to display an error message, and suspends the operation thereafter (Step S103).

If, on the other hand, it is judged that user authentication is successful (YES in Step S102), the reproduction controller 1716 judges whether user manipulation on reproducing a recorded program from the recording medium 1715 has been performed (Step S104). If it is judged that user manipulation on reproduction has not been performed (NO in Step S104), the reproduction controller 1716 waits until the user manipulation on reproducing a recorded program is performed.

If it is judged that user manipulation on reproduction has been performed (YES in Step S104), the reproduction controller 1716 performs an operation of reproducing a program selected by the user from the recording medium 1715, and outputting the program to the monitor 1711 (Step S105). During the reproducing operation, the de-multiplexer 1706 de-multiplexes program administering information multiplexed in the program; the PSI extractor 1718 extracts PSI from the program administering information; and the cluster identification information extractor 1722 extracts cluster information from the program administering information. The cluster information corresponds to a unit of a moving picture frame in a program, and includes cluster identification information for identifying a cluster in a frame, and coordinate information of the cluster.

Then, the coordinate extractor 1721 judges whether the user has selected a cluster in a program being reproduced, using the pointing device (Step S106). Specifically, in the case where the pointer light receiving section 1720 receives light at a site pointed by the laser pointer, the coordinate extractor 1721 judges that a cluster in a program has been selected. If it is judged that a cluster has been selected by using the pointing device (YES in Step S106), the coordinate extractor 1721 extracts coordinate information of the site in a screen designated by the pointing device (Step S107).

After the coordinate information has been extracted, the cluster identification information extractor 1722 extracts cluster identification information for identifying a cluster corresponding to the coordinate information extracted by the coordinate extractor 1721 (Step S108). The extracted cluster identification information is stored into the cluster storage 1723 along with time information and coordinate information of the cluster in a program, which is multiplexed in the program, in correlation to program identification information for identifying the program.

After the cluster identification information has been extracted and stored into the cluster storage 1723, or in the case where it is judged that a cluster has not been selected (NO in Step S106), the reproduction controller 1716 continues the operation of reproducing the program, and judges whether the program being reproduced is ended (Step S109). If it is judged that the program being reproduced is not ended (NO in Step S109), the routine returns to Step S105, and the reproduction controller 1716 continues the operation of reproducing the program.

If, on the other hand, it is judged that the program being reproduced is ended (YES in Step S109), the cluster transmitter 1727 transmits, to the program recommendation server 9, cluster identification information for identifying a cluster selected by the user, time information of a program corresponding to a point of time of selecting a cluster extracted by the PSI extractor 1718, coordinate information of a cluster with respect to each of the frames, program identification information for identifying a program including a cluster, and user information of a user identified by the user identifier 1725, which is stored in the cluster storage 1723, as user cluster information (Step S110).

Subsequently, referring to FIG. 27, the cluster receiver 1750 in the program recommendation server 9 receives the user cluster information transmitted from the program viewing terminal 8 (Step S111).

Then, the user manager 1751 judges whether the user information included in the user cluster information received by the cluster receiver 1750 coincides with user information pre-registered in the user attribute DB 1752 in the program recommendation server 9 (Step S112). If it is judged that the user manipulating the program viewing terminal 8 is not a registered user (NO in Step S112), as a result of user authentication, the user manager 1751 creates an error message indicating that the user manipulating the program viewing terminal 8 is not a registered user, transmits the error message to the program viewing terminal 8, and suspends the operation thereafter (Step S113).

If, on the other hand, it is judged that the user manipulating the program viewing terminal 8 is a registered user (YES in Step S112), as a result of user authentication, the cluster register 1754 registers the cluster identification information included in the user cluster information received by the cluster receiver 1750 into the cluster DB 1756 in correlation to the user information included in the user cluster information (Step S114). The cluster register 1754 also registers the cluster identification information included in the received user cluster information, the time information of a cluster in a program, and the coordinate information of a cluster with respect to each of the moving picture frames into the cluster reproducing time manager 1755.

After the user cluster information has been registered into the cluster DB 1756 and the cluster reproducing time manager 1755 in Step S114, the community cluster statistics section 1757 extracts all the users having currently registered cluster identification information from the cluster DB 1756, and defines the extracted users as a community group (Step S115).

After the grouping has been performed, the community cluster statistics section 1757 makes up cluster identification information in the programs, other than the program having the user cluster information received by the cluster receiver 1750, which is stored in correlation to the user information of the users in the community group (Step S116). The community cluster statistics section 1757 counts the number of cluster identification information stored with respect to each of the users.

Then, the community cluster statistics section 1757 normalizes the aggregate calculation result in the community group by the number of all the clusters selected by all the users in the community group (Step S117). The above operation enables to calculate a probability as to whether a user has selected a cluster with respect to each of the clusters, and generate ranking information representing a selection probability of clusters.

Then, the total user cluster statistics section 1758 extracts the users registered in the user attribute DB 1752 i.e. all the users registered in the program recommendation server 9, and defines the users having cluster identification information identical to the received cluster identification information, as a total user group including the community group (Step S118).

Then, the total user cluster statistics section 1758 makes up cluster identification information for identifying clusters in the programs, other than the program having the user cluster information received by the cluster receiver 1750, which is stored in correlation to the user information of all the registered users in the total user group (Step S119).

Then, the total user cluster statistics section 1758 normalizes the aggregate calculation result of cluster identification information of all the registered users by the number of all the clusters selected by all the registered users in the total user group (Step S120). The above operation enables to generates a ranking, wherein a selecting rate of clusters selected by the users in the total user group is calculated with respect to each of the clusters.

Then, the community customizing section 1759 makes up clusters customized to the community group by subtracting an aggregate calculation result of cluster identification information in the total user group obtained by normalization, from an aggregate calculation result of cluster identification information in the community group obtained by normalization. Then, the recommended cluster creator 1760 generates a ranking of clusters in the order of a larger number of selected clusters, based on the subtraction result; defines a predetermined number of upper-ranked clusters in the ranking, as a recommended cluster; and creates recommended program information including cluster identification information for identifying a recommended cluster, time information of a recommended cluster in a program, coordinate information of a recommended cluster in a program with respect to each of the moving picture frames, and program identification information for identifying a program (Step S121).

The recommended cluster creator 1760 creates recommended program information by extracting the time information and the coordinate information corresponding to the cluster identification information for identifying a recommended cluster from the cluster reproducing time manager 1755. Alternatively, the recommended cluster creator 1760 may perform threshold judgment using a subtraction result, and define a cluster having a cluster number higher than a threshold value, as a recommended cluster.

Then, the recommended cluster creator 1760 generates a ranking of clusters in the order of a larger number of selected clusters, based on the normalized aggregate calculation result of cluster identification information in the total user group, which has been generated by the total user cluster statistics section 1758; defines a predetermined number of upper-ranked clusters in the ranking, as a popular cluster; and creates popular program information including cluster identification information for identifying a popular cluster, time information of a popular cluster in a program, coordinate information of a popular cluster in a program with respect each of the moving picture frames, and program identification information for identifying a program (Step S122). The recommended cluster creator 1760 may perform threshold judgment, using an aggregate calculation result obtained by the total user cluster statistics section 1758, and define a cluster having a cluster number higher than a threshold value, as a popular cluster.

Then, the recommendation transmitter 1761 transmits the recommended information including the recommended program information and the popular program information created by the recommended cluster creator 1760 to the program viewing terminal 8 (Step S123).

Subsequently, referring to FIG. 28, the recommendation receiver 1728 in the program viewing terminal 8 receives the recommended information including the recommended program information and the popular program information transmitted by the recommendation transmitter 1761 in the program recommendation server 9 (Step S131).

Then, the recommended program information extractor 1729 judges whether recommended program information has been extracted from the recommended information received by the recommendation receiver 1728 (Step S132). The recommended program information extractor 1729 prompts the user to select one of the recommended program information and the popular program information. In the case where recommended program information has been selected by using the key section 1724, the recommended program information extractor 1729 extracts the recommended program information. In the case where popular program information has been selected, the recommended program information extractor 1729 extracts the popular program information. Alternatively, the program recommendation system may be configured in such a manner that both the recommended program information and the popular program information are extracted. The modification is advantageous in providing more alternatives to the user.

In the case where it is judged that recommended program information has been selected (YES in Step S132), the cluster retriever 1730 judges whether a program identified by program identification information identical to the program identification information included in the recommended program information extracted by the recommended program information extractor 1729 is recorded in the recording medium 1715, based on the program identification information included in the recommended program information extracted by the recommended program information extractor 1729 (Step S133). If it is judged that a program including a recommended cluster is not recorded in the recording medium 1715 (NO in Step S133), the routine proceeds to Step S140.

If, on the other hand, a program including a recommended cluster is recorded (YES in Step S133), the cluster retriever 1730 calls up program information corresponding to the program identification information included in the recommended program information extracted by the recommended program information extractor 1729 from the recording medium 1715, extracts the time information and the coordinate information of the recommended cluster in the program, included in the received recommended program information, and outputs the retrieved result to the recommendation reproduction controller 1732. The recommendation reproduction controller 1732 causes the monitor 1711 to display a thumbnail image of the recommended cluster, based on the time information and the coordinate information extracted by the cluster retriever 1730 (Step S134).

Then, the recommendation reproduction controller 1732 judges whether user designation on selecting and reproducing a thumbnail image has been issued (Step S135). If it is judged that user designation on reproducing a thumbnail image has not been issued (NO in Step S135), the routine proceeds to Step S140. If, on the other hand, it is judged that user designation on reproduction has been issued (YES in Step S135), the reproduction controller 1716 performs an operation of reading out a program identified by the program identification information extracted by the cluster retriever 1730, from the recording medium 1715, and reproducing the program from a reproducing start point of time of the recommended cluster included in the time information extracted by the cluster retriever 1730 (Step S136).

Then, the enlargement controller 1733 judges whether user designation on enlargedly displaying a recommended scene has been issued (Step S137). Input of user designation on enlargement is accepted and issued by the key section 1724. If it is judged that user designation on enlargement has been performed (YES in Step S137), the enlargement controller 1733 accepts user designation on enlargedly displaying a recommended cluster, clips and enlargedly displays the recommended cluster on a display image of a program, based on coordinate information of the recommended cluster extracted by the cluster retriever 1730 with respect to each of the moving picture frames (Step S138).

After the recommended cluster has been enlargedly displayed, or in the case where it is judged that user designation on enlargement has not been performed (NO in Step S137), the reproduction controller 1716 judges whether the operation of reproducing the program including the selected recommended cluster is ended (Step S139). Upon reaching the reproducing end point of time of the recommended cluster, which is included in the time information extracted by the cluster retriever 1730, the reproduction controller 1716 automatically terminates the operation of reproducing the program. If it is judged that the operation of reproducing the program is not ended (NO in Step S139), the reproduction controller 1716 continues the reproducing operation.

If, on the other hand, it is judged that the operation of reproducing a program is ended (YES in Step S139), the cluster retriever 1730 judges whether an operation of reproducing all the recommended clusters included in the recommended program information, which has been transmitted from the program recommendation server 9, is ended (Step S140). In Step S140, the cluster retriever 1730 judges whether the operations from Step S133 through S139 are ended with respect to all the recommended clusters included in the received recommended program information.

If it is judged that the operation of reproducing all the recommended clusters is not ended (NO in Step S140), the routine returns to Step S133, and repeatedly performs an operation of reproducing the rest of the recommended clusters. If it is judged that the operation of reproducing all the recommended clusters is ended (YES in Step S140), all the operations in the routine are ended.

If, on the other hand, it is judged that recommended program information has not been extracted, in other words, popular program information has been extracted (NO in Step S132), the cluster retriever 1730 judges whether a program identified by program identification information identical to the program identification information included in the popular program information extracted by the recommended program information extractor 1729 is recorded in the recording medium 1715, based on the program identification information included in the popular program information extracted by the recommended program information extractor 1729 (Step S141). If it is judged that a program including a popular cluster is not recorded in the recording medium 1715 (NO in Step S141), the routine proceeds to Step S148.

If, on the other hand, it is judged that a program including a popular cluster is recorded (YES in Step S141), the cluster retriever 1730 calls up program information corresponding to the program identification information included in the popular program information extracted by the recommended program information extractor 1729 from the recording medium 1715, extracts the time information and the coordinate information of the popular cluster in the program, included in the received popular program information, and outputs the retrieved result to the recommendation reproduction controller 1732. The recommendation reproduction controller 1732 causes the monitor 1711 to display a thumbnail image of the popular cluster, based on the time information and the coordinate information extracted by the cluster retriever 1730 (Step S142).

Then, the recommendation reproduction controller 1732 judges whether user designation on selecting and reproducing a thumbnail image has been issued (Step S143). If it is judged that user designation on reproducing a thumbnail image has not been issued (NO in Step S143), the routine proceeds to Step S148. If, on the other hand, it is judged that user designation on reproduction has been issued (YES in Step S143), the reproduction controller 1716 performs an operation of reading out a program identified by the program identification information extracted by the cluster retriever 1730, from the recording medium 1715, and reproducing the program from a reproducing start point of time of the popular cluster included in the time information extracted by the cluster retriever 1730 (Step S144).

Then, the enlargement controller 1733 judges whether user designation on enlargedly displaying a popular cluster has been issued (Step S145). Input of user designation on enlargement is accepted and issued by the key section 1724. If it is judged that user designation on enlargement has been issued (YES in Step S145), the enlargement controller 1733 accepts user designation on enlargedly displaying a popular cluster, clips and enlargedly displays the popular cluster on a display image of a program, based on coordinate information of the popular cluster extracted by the cluster retriever 1730 with respect each of the moving picture frames (Step S146).

After the popular cluster has been enlargedly displayed, or in the case where it is judged that user designation on enlargement has not been issued (NO in Step S145), the reproduction controller 1716 judges whether the operation of reproducing the program including the selected popular cluster is ended (Step S147). Upon reaching the reproducing end point of time of the popular cluster, which is included in the time information extracted by the cluster retriever 1730, the reproduction controller 1716 automatically terminates the operation of reproducing the program. If it is judged that the operation of reproducing the program is not ended (NO in Step S147), the reproduction controller 1716 continues the reproducing operation.

If, on the other hand, it is judged that the operation of reproducing the program is ended (YES in Step S147), the cluster retriever 1730 judges whether an operation of reproducing all the popular clusters included in the popular program information, which has been transmitted from the program recommendation server 9, is ended (Step S148). In Step S148, the cluster retriever 1730 judges whether the operations from Step S141 through S147 are ended with respect to all the popular clusters included in the received popular program information.

If it is judged that the operation of reproducing all the popular clusters is not ended (NO in Step S148), the routine returns to Step S141, and repeatedly performs an operation of reproducing the rest of the popular clusters. If it is judged that the operation of reproducing all the popular clusters is ended (YES in Step S148), all the operations in the routine are ended.

As described above, with use of the program recommendation system in the embodiment, the program viewing terminal 8 is operable to receive a spatially divided broadcast program constituted of clusters, and a cluster selected by a user using the pointing device is transmitted to the program recommendation server 9. The program recommendation server 9 is operable to administer selected clusters with respect to each of the users, group the users according to the selected clusters, and provide the users with a recommended program by collaborative filtering in the group.

Also, the program recommendation system in the embodiment is operable to define a group including a community group e.g. a group constituted of all the users to recommend a program customized to the community group constituted of users who selected identical clusters; and recommend a program customized to the community group by eliminating an influence of a generally popular program preferred by all the users from a recommended program in the community group. Since a generally popular program can be easily recognized by users without utilizing a program recommendation system, recommending a program customized to a community group is useful. A method for recommending a generally popular program can be realized by using a well-known method.

In the embodiment, a method for transmitting one cluster selected by a user is described. The invention is not limited to the above. Alternatively, multiple user cluster information may be transmitted to the program recommendation server 9, as a cluster selection log of a user. In the modification, users are grouped based on a matching degree between a cluster selection log of each of the users, and cluster selection logs of other users. For instance, users having all the clusters included in a transmitted cluster selection log, as a cluster selection log, are grouped. In this case, similarity in cluster selection logs within a specific program may be determined; or in the case where several cluster selection logs are accumulated, the cluster selection logs may be transmitted. The grouping based on a cluster selection log enables to define a group having a higher matching degree in preference. This enables to provide a recommended program or a recommended cluster with high precision.

The above method of transmitting a cluster selection log may also be applied to the first embodiment and the second embodiment. In applying the method to the first embodiment, the program viewing terminal 2 transmits a reserved information log on a program to the program recommendation server 3, and the program recommendation server 3 groups the users having a reserved information log similar to the transmitted reserved information log on a program. In the modification, a reserved information log showing complete matching may be defined as a similar reserved information log, or users having a matching degree of 50% or more in transmitted log information may be grouped. Similarly to the first embodiment, in applying the method to the second embodiment, the program viewing terminal 5 transmits logs on marked program scenes to the program recommendation server 6, and the program recommendation server 6 groups the users depending on similarity in log on marked program scenes.

In the applied examples of the first embodiment and the second embodiment, users can be grouped by comparing log information. This enables to group the users having a higher matching degree in preference. This enables to generate recommended information in a group with improved precision.

In the foregoing embodiments, a recommended program in a group is generated by calculating user manipulation information with respect to a program in the group. Alternatively, information may be calculated depending on similarity in transmitted log information (such as an overlapping degree of log information). For instance, the program recommendation server 6 may receive five log information, and calculate log information by multiplying a weight three-fifths as much as the weight to be applied to the users matching in all the five log information, to the users matching in three log information. The modification enables to calculate log information depending on a weight reflecting similarity, which is advantageous in extracting a recommended program with high precision.

In the foregoing embodiments, the program recommendation server defines all the users as a total user group. The invention is not limited to the above. Recommendation information may be generated by: administering user attribute information such as the sex, the age, and the location of the residence of users, as user information; defining a total user group (second group) including a community group (first group) based on the user attribute information; and subtracting an aggregate calculation result in the total user group from an aggregate calculation result in the community group. The modification enables to create recommended information customized to the community group in a sophisticated manner by eliminating an influence of a popular program, even if the popular information is biased by e.g. the sex, the age, or the location of the residence of users.

In the first embodiment, a reservation rate is normalized by the number of users who performed a reserving operation. Alternatively, for instance, concerning a broadcast program having a higher frequency in broadcasting such as a news program, normalization may be performed by a frequency in broadcasting or a broadcast time.

Concerning a marking operation in the second embodiment, a weight to be applied to a program having a higher frequency in a marking operation such as a sports program; or a weight to be applied to a program may be changed depending on a frequency in a marking operation by users.

In the foregoing embodiments, information may be calculated in a group by increasing a weight to be applied to specific users whose reliability in recommended information is estimated to be high. Users whose reliability in recommended information is estimated to be high may be automatically extracted based on a matching degree between programs reserved by the users, and recommended information in a group; or may be chosen by other users, an administrator administering the program recommendation system, or a like person.

Further alternatively, a specific day such as a New Year's eve, a period of a sports event to be held once every several years, or a like occasion may be eliminated from information to be calculated to obtain a reservation rate; or a weight to be applied to the above special occasion may be changed.

In the second embodiment, there are proposed, as examples of a method for marking a program scene: a marking operation by pressing a marking button for a certain period; a marking operation by entering a start point of time and an end point of time of a program scene; a marking operation by designating a start point of time and a time duration of a program scene; and a marking operation by designating an end point of time and a time duration of a program scene. The invention is not limited to the above. For instance, a marking operation of a program scene may be performed by defining a point of time behind the point of time of pressing a favorite scene button by a user by a certain time duration, as a start point of time of a favorite scene; or defining a point of time advanced from the point of time of pressing the favorite scene button by a user by a certain time duration, as an end point of time of the favorite scene.

Further alternatively, a marking operation of a program scene may be performed by automatically detecting points of time of changing a scene immediately before and after a point of time of pressing a favorite scene button by a user, and defining the points of time of changing a scene, as a start point of time and an end point of time of a favorite scene, respectively. The modification is advantageous in reducing a burden of a user in marking a favorite scene. Determination as to whether a scene is changed may be made: based on a video change by e.g. determining a change of a scene based on a change in histogram to be extracted with respect to each of the frames of a program, or determining a change in a performer to be displayed, utilizing image recognition; or based on a sound change such as a change in sound tone, a change in sound volume, or a change in a performer, utilizing sound recognition.

In the second embodiment, marking information is calculated by weighted summation depending on the kind of user manipulation. Alternatively, weighted summation may be performed depending on manipulation contents, in addition to the kind of user manipulation. For instance, a weight to be applied to an operation of reserving recording a program may be changed depending on designation of a recording quality such as a high-definition mode or a long-time recording mode.

The community reserved information statistics section 236 in the first embodiment may allow a user A to select a community group which the user A plans to join from community groups prepared by the user A in advance, and perform a statistical operation with respect to programs reserved by the user A, assuming that the community groups as a whole set. The modification enables to generate a community group satisfying user's requirement, and a group having a high similarity in programs whose recording is reserved by the user A.

Further alternatively, the community reserved information statistics section 236 in the first embodiment may allow a user A to select a group to which the user A belongs. The modification enables to recommend a program having a high similarity in preference of the group selected by the user A, and in programs whose recording has been reserved by the user A.

In the modification, it is possible for a user to join/leave a community group according to user' will. This enables to recommend a program depending on the user's preference or the user's mood, which may differ from time to time.

In selecting a community group, it is desirable to display a list of community groups selectable by a user. This allows the user to join a community group with a simplified procedure.

Further alternatively, a user may be allowed to retrieve a community group. The modification allows the user to search for a community group which the user intends to join from multitudes of community groups. In the modification, it is desirable to use a method of entering a retrieval keyword by a user, as a retrieval query to be used in a retrieving operation. Alternatively, use of other retrieval queries e.g. selection from categories, use of image information, video information, music information, and sounds; or utilizing gestures of a user also enables to obtain substantially the same effect as described above.

In selecting a community group by a user, a log on community groups which the user has selected in the past may be displayed. The modification allows the user to easily select a community group which the user has selected in the past.

In selecting a community group by a user, a ranking of community groups selected by the other users may be displayed. Preferably, it is desirable to display a ranking of community groups in the order of a larger number of selection by the other users. This allows the user to select a community group having a higher popularity. As a modified example, it may be desirable to display a ranking of community groups whose selecting frequency by the other users has been rapidly increased. The modification allows the user to select a community group whose popularity is instantaneously increased.

A user may designate a threshold judgment criterion to be used in the recommended program creator 239. For instance, solely the programs having a high reservation rate in a group can be recommended by increasing the threshold judgment criterion. Conversely, an increased number of programs can be recommended by decreasing the threshold judgment criterion.

In the foregoing embodiments, a weight may be applied to a program selected by a user in calculating information in a group. For instance, there is proposed an approach, wherein the date when a user has recorded a program is stored, and a weight to be applied to the program is reduced with time. For instance, let it be assumed that the preference of a user, who reserved recording specific programs for a certain period of time, is changed, and the user has started reserving recording programs of a genre other than the genre of the previously reserved programs. In this occasion, the above modification enables to recommend a program of user's most recent preference, because the influence of the programs recorded by the user in the past is decreased.

In the foregoing embodiments, it is possible to utilize programs which the users have directly viewed without recording, in addition to the programs which the users recorded in the past, in calculating information in a group. The modification enables to recommend programs highly reflecting the user's preference, because the number of program samples selected by the users can be increased.

In the foregoing embodiments, it is possible to display a list of programs having a high similarity to the programs whose recording has been reserved by a user, and select a program which the user wishes to record from the list. The modification is advantageous in saving the capacity of a recording medium, in the case where the capacity of the recording medium for recording programs is limited, for instance.

In selecting a program to be reserved, it is possible to display generally popular programs whose reservation rate or viewing rate of the other users is high as a whole, and recommended programs similar in preference to the programs whose recording has been reserved by a user, as disclosed in the invention, on an identical screen. Further alternatively, it is possible to employ an approach, wherein a user is allowed to selectively display one of a generally popular program, and a recommended program having a high preference. The modification allows the user to easily reserve recording a popular program, in addition to a program matching with the user's preference.

Fourth Embodiment

In the fourth embodiment, there is described a method to be performed by the customization generator 30 in the program recommendation server 3 described in the first embodiment referring to FIG. 4, wherein a tf·idf (term frequency·inverse document frequency) value is calculated to create a recommended program customized to a community group of a user, which is estimated based on a reserved program information group of a user.

The tf·idf value is used in an approach for applying a weight based on an appearance frequency of reserved program information concerning a program. The symbol "tf" represents an appearance frequency of reserved program information concerning a specific program in a targeted community group, and the symbol "idf" represents an inverse number of the number of users having the reserved program information concerning the specific program in reserved program information of all the users. Assuming that certain reserved program information appears frequently in a community group, and the number of users having the reserved program information is significantly small, this condition means that the tf·idf value is high, and the reserved program information is estimated to be reserved program information customized to the community group. Accordingly, the reserved program information estimatively customized to the community group is generated as a recommended program customized to the community group.

An arrangement of the fourth embodiment for generating a recommended program using a tf·idf value is substantially the same as the arrangement of the customization generator 30 in the program recommendation server 3 shown in FIG. 4. A customization generator 30 in the fourth embodiment is constituted of a community reserved information statistics section 236, a total user reserved information statistics section 237, and a community customizing section 238.

The community reserved information statistics section 236 is operable to calculate an appearance frequency "tf" of a tf·idf value by extracting reserved program information having a high appearance frequency in a community group. Actually, the community reserved information statistics section 236 is operable to count the number of reserved program information in a reserved program information group which is stored with respect to each of the users in a community group, extract reserved program information having a high appearance frequency, and define the appearance frequency as a value "tf".

Figure 30:
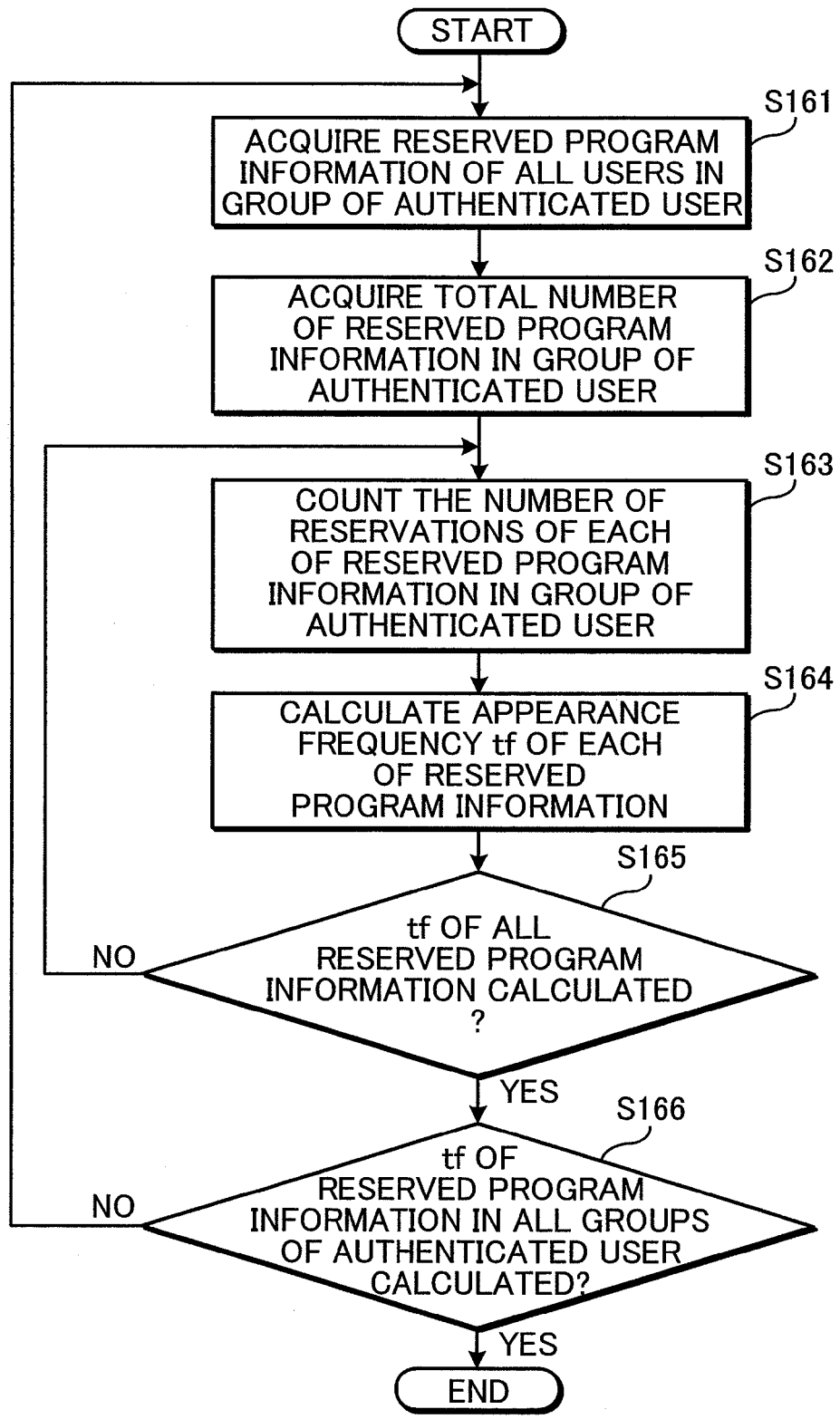
FIG. 30 is a flowchart showing a flow of operation of a community reserved information statistics section in a fourth embodiment of the invention.

FIG. 30 is a flowchart showing a flow of operation to be performed by the community reserved information statistics section 236 in accordance with the fourth embodiment.

First, the community reserved information statistics section 236 acquires, from a reserved information DB 235, reserved program information of all the users in a community group to which a user (authenticated user) authenticated by a user manager 231 belongs (Step S161). The acquired reserved program information is reserved program information transmitted by a user in the community group of the user whose user information is authenticated by the user manager 231, in other words, reserved program information concerning a program which is reserved by the authenticated user in the community group.

Then, the community reserved information statistics section 236 acquire the total number of all the reserved program information in the community group of the authenticated user (Step S162). Then, the community reserved information statistics section 236 counts the number of reservation in the community group with respect to each of the reserved program information (Step S163).

Then, the community reserved information statistics section 236 calculates an appearance frequency "tf" of each of the reserved program information in the community group of the authenticated user (Step S164). Specifically, the community reserved information statistics section 236 calculates an appearance frequency "tf" of reserved program information by dividing the number of reserved program information in the community group by the total number of all the reserved program information in the community group.

Then, the community reserved information statistics section 236 judges whether the appearance frequency "tf" of all the reserved program information in the community group has been calculated (Step S165). If it is judged that the appearance frequency "tf" of all the reserved program information in the community group has not been calculated (NO in Step S165), the routine returns to Step S163, and the community reserved information statistics section 236 counts the number of reservations in the other reserved program information in the community group.

If, on the other hand, it is judged that the appearance frequency "tf" of all the reserved program information in the community group has been calculated (YES in Step S165), the community reserved information statistics section 236 judges whether the appearance frequency "tf" of reserved program information in all the community groups to which the authenticated user belongs has been calculated (Step S166). Specifically, in the case where the authenticated user belongs to multiple community groups, the appearance frequency "tf" of reserved program information is calculated with respect to all the community groups to which the authenticated user belongs.

If it is judged that the appearance frequency "tf" of reserved program information in all the community groups to which the authenticated user belongs has not been calculated (NO in Step S166), the routine returns to Step S161, and the community reserved information statistics section 236 acquires, from the reserved information DB 235, reserved program information of all the users in the other community group to which the authenticated user belongs. If, on the other hand, it is judged that the appearance frequency "tf" of reserved program information in all the community groups to which the authenticated user belongs has been calculated (YES in Step S166), the routine is ended.

The total user reserved information statistics section 237 calculates an inverse number "idf" of a tf·idf value by calculating an appearance frequency of each of all the reserved program information in the community group, in reserved program information of all the users registered in the reserved information DB 235. In the case where the appearance frequency of reserved program information in the community group within reserved program information of all the users is high, the inverse number "idf" is small. Accordingly, it is judged that the acquired reserved program information is not reserved program information customized to the community group. If, on the other hand, the appearance frequency of reserved program information in the community group within reserved program information of all the users is low, the inverse number "idf" is large. Accordingly, it is judged that the acquired reserved program information is reserved program information customized to the community group.

Actually, the total user reserved information statistics section 237 calculates the inverse number "idf" by implementing a computation: log((total user number)÷(number of users having reserved program information k))+1, where k is reserved program information on a specific program.

Figure 31:
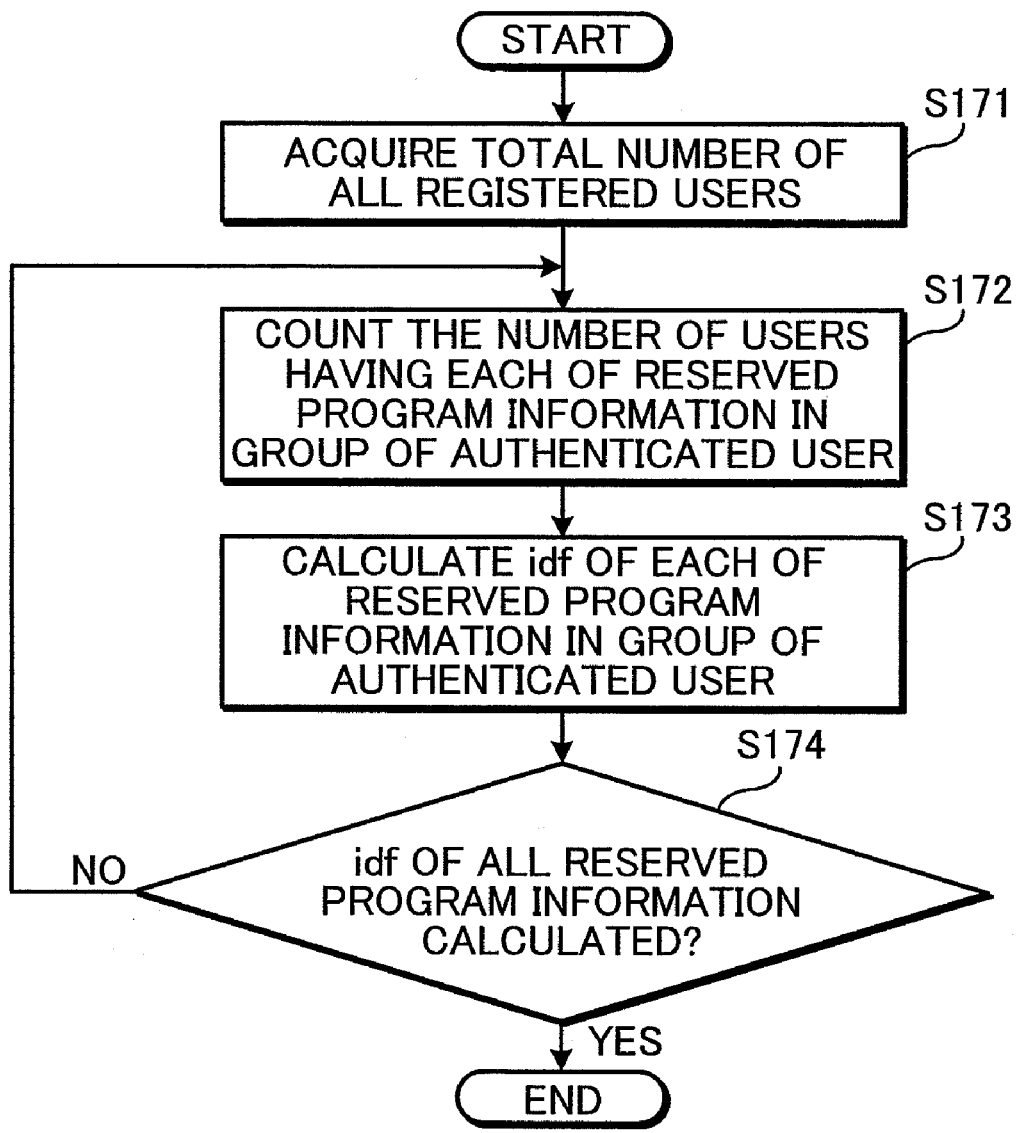
FIG. 31 is a flowchart showing a flow of operation of a total user reserved information statistics section in the fourth embodiment.

FIG. 31 is a flowchart showing a flow of operation to be performed by the total user reserved information statistics section 237 in accordance with the fourth embodiment.

First, the total user reserved information statistics section 237 acquires the total number of users registered in a user attribute DB 232 via the user manager 231 and a reserved information register 234 (Step S171). Then, the total user reserved information statistics section 237 counts the number of users who performed a reserving operation with respect to each of the reserved program information in the community group of the authenticated user (Step S172).

Then, the total user reserved information statistics section 237 calculates an inverse number "idf" of each of the reserved program information in the community group of the authenticated user (Step S173). Specifically, the total user reserved information statistics section 237 calculates an inverse number "idf" of each of the reserved program information based on the following equation (1):

$$idf = \log((\text{total user number}) \div (\text{number of users having each of reserved program information})) + 1 \qquad (1)$$

Then, the total user reserved information statistics section 237 judges whether the inverse number "idf" has been calculated with respect to all the reserved program information in the community group (Step S174). If it is judged that the inverse number "idf" has not been calculated with respect to all the reserved program information in the community group (NO in Step S174), the routine returns to Step S172, and the total user reserved information statistics section 237 counts the number of users who performed a reserving operation with respect to the other reserved program information in the community group. If, on the other hand, it is judged that the inverse number "idf" has been calculated with respect to all the reserved program information in the community group (YES in Step S174), the routine is ended.

In this embodiment, the inverse number "idf" is calculated by using the total user number, and the number of users having each of the reserved program information. The invention is not limited to the above. Alternatively, the inverse number "idf" may be calculated by using the total number of community group, and the number of community groups having each of the reserved program information.

The community customizing section 238 calculates a tf·idf value with respect to each of reserved program information of all the users in a community group, based on the appearance frequency "tf" calculated by the community reserved information statistics section 236, and the inverse number "idf" calculated by the total user reserved information statistics section 237; and outputs the tf·idf value to a recommended program creator 239. The tf·idf value is calculated by implementing a computation: tf×idf.

The recommended program creator 239 extracts a program which has a high tf·idf value and has not been reserved by a targeted user for program recommendation, as a recommended program. Thus, the program recommendation system is operable to recommend a program which has a high appearance frequency in a community group and does not have a high appearance frequency in a total user group, i.e. a program which has a large "idf" value and has not been reserved by a targeted user for program recommendation. Thereby, a user is recommended with a program customized to the community group i.e. a program which is estimated to match with the user's preference.

Figure 32:
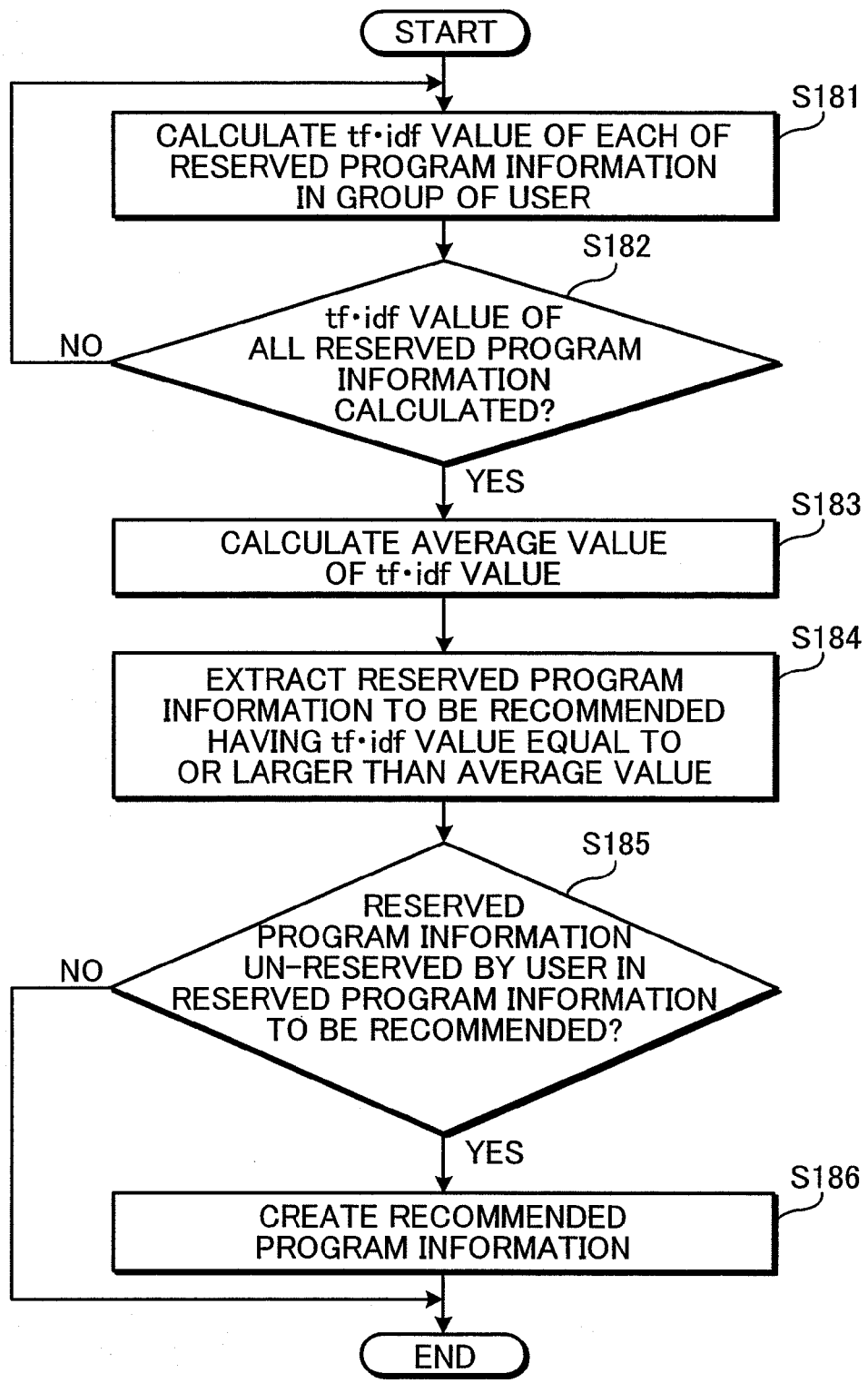
FIG. 32 is a flowchart showing a flow of operation of a community customizing section in the fourth embodiment.

FIG. 32 is a flowchart showing a flow of operation to be performed by the community customizing section 238 in accordance with the fourth embodiment.

First, the community customizing section 238 calculates a tf·idf value with respect to the reserved program information in the community group of the authenticated user by using the appearance frequency "tf" acquired by the community reserved information statistics section 236, and the inverse number "idf" acquired by the total user reserved information statistics section 237 (Step S181).

Then, the community customizing section 238 judges whether a tf·idf value of all the reserved program information in the community group of the authenticated user has been calculated (Step S182). If it is judged that a tf·idf value of all the reserved program information in the community group of the authenticated user has not been calculated (NO in Step S182), the routine returns to Step S181, and the community customizing section 238 calculates a tf·idf value of the other reserved program information in the community group of the authenticated user.

If, on the other hand, it is judged that a tf·idf value of all the reserved program information in the community group of the authenticated user has been calculated (YES in Step S182), the community customizing section 238 calculates a recommendation threshold value for determining a program to be recommended. The recommendation threshold value may preferably be an easily computable value such as an average value of a tf·idf value of reserved program information in a community group. In view of this, the community customizing section 238 calculates an average value of the tf·idf value of all the reserved program information in the community group (Step S183).

Then, the community customizing section 238 extracts reserved program information having a tf·idf value equal to or larger than the recommendation threshold value (average value), as reserved program information to be recommended. Then, the community customizing section 238 judges whether the reserved program information to be recommended includes reserved program information which has not been reserved by the authenticated user (Step S185). If it is judged that the reserved program information to be recommended does not include reserved program information which has not been reserved by the authenticated user (NO in Step S185), the routine is ended.

If, on the other hand, it is judged that the reserved program information to be recommended includes reserved program information which has not been reserved by the authenticated user (YES in Step S185), the community customizing section 238 extracts a predetermined number of reserved program information in the order of a higher tf·idf value, from the reserved program information which has not been reserved by the authenticated user, as a recommended program; and creates recommended program information including program identification information for identifying the recommended program (Step S186).

In the following, an example of a method for extracting a recommended program using a tf·idf value is described in detail referring to FIG. 33. FIG. 33 is a diagram for describing a method for extracting a recommended program using a tf·idf value. In a table 301 shown in FIG. 33, the symbols a through n in the uppermost row represent reserved programs, the symbols c1 through c4 in the leftmost column represent community groups, and the symbols A through P in the second leftmost column represent users belonging to the respective corresponding community groups. Hollow circles in the table 301 indicate which program a corresponding user has reserved. In this example, the user A is an authenticated user whose user information is authenticated by the user manager 231.

First, the community reserved information statistics section 236 calculates an appearance frequency "tf" of each of the reserved program information in the community groups c1 and c2 to which the user A belongs. For instance, the total number of reserved program information in the community group c1 is eleven, and the program a is reserved twice i.e. by the user A and the user C. Accordingly, the appearance frequency "tf" of the program a in the community group c1 is: 2/11=0.18. Similarly, the community reserved information statistics section 236 calculates an appearance frequency "tf" of all the reserved program information in the community groups c1 and c2.

Then, the total user reserved information statistics section 237 calculates an inverse number "idf" of each of the reserved program information (programs α to ζ) in the community groups c1 and c2. For instance, the program a is reserved by eleven users out of the fifteen users A through P. Accordingly, the inverse number "idf" of the program a is: log(15/11)+1=1.13. Similarly to the above, the total user reserved information statistics section 237 calculates an inverse number "idf" with respect to the other reserved program information.

Then, the community customizing section 238 calculates a tf·idf value, and extracts a recommended program based on the tf·idf value. The tf·idf value is calculated with respect to each of the reserved program information in the community groups c1 and c2. For instance, the tf·idf value of the program a in the community group c1 is: 2÷11×(log(15/11)+1)=0.20. The community customizing section 238 calculates a tf·idf value with respect to the other programs in the similar manner as described above. Then, the community customizing section 238 calculates an average value of the calculated ten tf·idf values, and defines reserved program information having a tf·idf value equal to or larger than the average value, as program information for reservation recommendation.

In the example of FIG. 33, the program β and the program δ are defined as programs for reservation recommendation in the community group c1; and the program α, the program δ and the program ε are defined as programs for reservation recommendation in the community group c2. In this example, although the tf·idf values of the program α and the program δ are larger than the average value, the program α and the program δ have already been reserved by the user A. Accordingly, the program β and the program ε, out of the programs whose tf·idf value is equal to or larger than the average value, are extracted as programs for reservation recommendation. In this example, since the tf·idf value of the program β is larger than the tf·idf value of the program ε, the program β is recommended as a first rank program for reservation, and the program ε is recommended as a second rank program for reservation.

In this embodiment, reserved program information customized to a community group of an authenticated user is extracted with respect to all the users registered in the user attribute DB 232. Alternatively, reserved program information may be extracted with respect to users belonging to a certain number of community groups, in place of all the users registered in the user attribute DB 232. The community groups may be defined by e.g. the following method.

First, in recommending a program to an authenticated user for the first time, as described in this embodiment, an inverse number "idf" value is calculated by using the total number of users. Then, a community group whose community reservation rate (=the number of reservations of a recommended program in the community group the number of users in the community group) of the program recommended by the first-time recommending operation is equal to or larger than a predetermined threshold value (e.g. 0.5), is defined as a proximal community group.

A community group having a high reservation rate of a program recommended to an authenticated user is estimated to be a community group (proximal community group) having similarity to the community group of the authenticated user in program reservation inclination. In performing a second-time program recommending operation and thereafter, an inverse number "idf" value is calculated by using the total number of users in the proximity community group and the community group of the authenticated user. Specifically, the inverse number "idf" value of reserved program information "k" is calculated based on the following equation (2).

$$idf = \log((\text{the number of users in the proximal community group} + \text{the number of users in the community group of the authenticated user}) \div \text{the number of users having reserved program information } k) + 1 \quad (2)$$

In the example of FIG. 33, the program β (as a first rank) is recommended to the authenticated user A. As shown in FIG. 34, the community reservation rates of the recommended program β in the community groups c3 and c4 to which the authenticated user A does not belong are respectively 0.5 and 0.3. Accordingly, the community group c3 whose community reservation rate is equal to or lager than the threshold value (0.5) is defined as a proximal community group.

Accordingly, in the second-time program recommending operation and thereafter, an inverse number "idf" value of reserved program information is calculated by implementing a computation: log(12÷the number of users having reserved program information k)+1, by using the total number of users i.e. "12" in three community groups i.e. the community groups c1 and c2 to which the authenticated user A belongs, and the proximal community group c3.

As described above, recommending a program by calculating an inverse number "idf" based on users in a proximal community group, in place of using all the users enables to recommend a program customized to a community group in a sophisticated manner. Also, the above arrangement enables to reduce a computing load in performing a second-time program recommending operation and thereafter, as compared with a computing load in performing a first-time program recommending operation.

Alternatively, a proximal community group may be updated by periodically performing a program recommending operation in the similar manner as the first-time program recommending operation in repeating a program recommending operation. The modification enables to recommend a program customized to a community group, even if a program reservation inclination of the community group is changed with time.

A proximal community group can be defined as a community group having a preference relatively similar to the preference of a community group of a user. Accordingly, it is possible to configure a system for asking the user to join the proximal community group. This is advantageous in supporting the user to find a community group having a preference similar to the user's preference.

In this embodiment, an average value of a tf·idf value is used as a recommendation threshold value for recommending a program. The invention is not limited to the above. For instance, in the case where the tf·idf value includes a large variation, a program recommending operation for satisfying user's demand can be performed with high precision by using a geometric average value or a median value, as a recommendation threshold value.

In this embodiment, the community customizing section 238 compares program information representing a program for reservation recommendation with reserved program information representing a program reserved by an authenticated user. Alternatively, the community reserved information statistics section 236 and the total user reserved information statistics section 237 may compare reserved program information to be processed with reserved program information of an authenticated user, and eliminate the reserved program information of the authenticated user from the object to be processed. The modification is advantageous in reducing the quantity of reserved program information to be processed by the community reserved information statistics section 236 and the total user reserved information statistics section 237, and reducing the quantity of computing.

In this embodiment, a tf·idf value is calculated based on reserved program information concerning a program. Alternatively, a tf·idf value may be calculated by using information other than the reserved program information concerning a program. For instance, a tf·idf value may be calculated based on a title of contents such as a blog or a diary created by a user, or a word in the contents. A word having a high tf·idf value may be defined as a word representing the community group. Then, a program including the word in the title of program information or detailed information (such as information to be obtained from an EPG, or a tag attached in association with a program) may be recommended.

Further alternatively, program information or a word representing a community group may be correlated as detailed information of a community group. The modification is advantageous in using the program information or the word as tag information in retrieving a community group. Also, the above modification makes it easy for a user to select a community group matching with the user's preference in selecting a community group by simultaneously outputting a list of program information or words representing a community group in displaying a community group name.

The foregoing embodiments and modifications primarily include the inventions having the following arrangements.

A program recommendation system according to an aspect of the invention includes: a program viewing terminal for allowing a user to view a received program; and a program recommendation server communicatively connected to the program viewing terminal via a network, and adapted for acquiring manipulation information representing manipulation of the user with respect to the program from the program viewing terminal to create recommended information relating to a program matching with a preference of the user depending on the manipulation information. The program viewing terminal includes: a manipulation accepting section for accepting input of the manipulation information; and a manipulation information transmitting section for transmitting the manipulation information accepted by the manipulation accepting section to the program recommendation server. The program recommendation server includes: a manipulation information receiving section for receiving the manipulation information transmitted by the manipulation information transmitting section; a manipulation information storing section for storing the manipulation information received by the manipulation information receiving section with respect to each of the users; a first grouping section for defining the user as a first group, based on the manipulation information received by the manipulation information receiving section, and the manipulation information stored in the manipulation information storing section with respect to each of the users; a second grouping section for defining the user as a second group, the second group including the first group defined by the first grouping section; a recommended information generating section for generating the recommended information customized to the first group, based on an aggregate calculation result of the manipulation information of the users belonging to the first group defined by the first grouping section, and an aggregate calculation result of the manipulation information of the users belonging to the second group defined by the second grouping section; and a recommended information transmitting section for transmitting the recommended information generated by the recommended information generating section to the program viewing terminal. The program viewing terminal further includes: a recommended information receiving section for receiving the recommended information transmitted by the recommended information transmitting section; and a program controlling section for performing at least one of a selecting operation, a recording operation, a reproducing operation, and a deleting operation of a program, based on the recommended information received by the recommended information receiving section.

In the above arrangement, the program viewing terminal is operable to accept input of manipulation information representing manipulation of the user with respect to the program, and transmit the accepted manipulation information to the program recommendation server. Then, the program recommendation server is operable to receive the manipulation information transmitted by the program viewing terminal, and store the received manipulation information into the manipulation information storing section with respect to each of the users. Then, the user is defined as the first group, based on the received manipulation information, and the manipulation information stored in the manipulation information storing section with respect to each of the users; and the user is defined as the second group including the first group. The recommended information customized to the first group is generated, based on the aggregate calculation result of the manipulation information of the users belonging to the first group, and the aggregate calculation result of the manipulation information of the users belonging to the second group. The recommended information is transmitted to the program viewing terminal. Then, the program viewing terminal is operable to receive the recommended information transmitted by the program recommendation server, and perform at least one of the selecting operation, the recording operation, the reproducing operation, and the deleting operation of the program, based on the received recommended information.

According to the above arrangement, a program manipulated by the other user having a preference identical to the preference of a user is extracted, based on the aggregate calculation result of the manipulation information of the users belonging to the first group. A program preferred by the total users is extracted, based on the aggregate calculation result of the manipulation information of the users belonging to the second group including the first group. An influence of a program extracted based on the second group is eliminated from a program extracted based on the first group. This enables to eliminate a program having a high general preference, and recommend a program customized to a specific user's preference.

In the program recommendation system, preferably, the program viewing terminal may further include a marking accepting section for accepting an operation of marking a reproducing position in the program by the user, and the manipulation information may include marking time information representing a point of time corresponding to the reproducing position, in the program, marked by the marking accepting section.

In the above arrangement, the operation of marking the reproducing position in the program by the user is accepted, and the manipulation information includes the marking time information representing the point of time corresponding to the marked reproducing position in the program. This enables to determine the user's preference, based on the marked reproducing position in the program.

In the program recommendation system, preferably, the program may be broadcast in a state that a display screen is divided into a plurality of areas, the program viewing terminal may further include an area selection accepting section for accepting selection of at least one of the areas on the display screen by the user, and the manipulation information may include time information, in the program, representing a point of time when the selected area is accepted by the area selection accepting section.

In the above arrangement, the program is broadcast in a state that the display screen is divided into the plurality of areas. The program viewing terminal is operable to accept selection of at least one of the areas on the display screen by the user. The manipulation information includes the time information, in the program, representing the point of time when the selected area is accepted. This enables to determine the user's preference, based on the at least one area selected by the user among the areas on the display screen. This also enables to automatically reproduce a program to be recommended by the program recommendation server at the reproducing position corresponding to the time information.

In the program recommendation system, preferably, the program may be broadcast in a state that a display screen is divided into a plurality of areas, the program viewing terminal may further include an area selection accepting section for accepting selection of at least one of the areas on the display screen by the user, and the manipulation information may include position information, on the display screen, corresponding to the selected area accepted by the area selection accepting section.

In the above arrangement, the program is broadcast in a state that the display screen is divided into the plurality of areas. The program viewing terminal is operable to accept selection of at least one of the areas on the display screen by the user. The manipulation information includes the position information, on the display screen, corresponding to the accepted selected area. This enables to determine the user's preference, based on the at least one area selected by the user among the areas on the display screen. This also enables to reproduce a predetermined area in a program to be recommended by the program recommendation server in an enlarged manner.

In the program recommendation system, preferably, the recommended information may include area identification information for identifying the area selected by the user among the areas. In this arrangement, the recommended information includes the area identification information for identifying the area selected by the user among the areas. This enables to specify the area in the program based on the area identification information, and reproduce the specified area.

In the program recommendation system, preferably, the recommended information may include reproducing start time information relating to a point of time of start of reproducing a program to be recommended. In this arrangement, the recommended information includes the reproducing start time information relating to the reproducing start point of time of the program to be recommended. This enables to reproduce the program recommended by the program recommendation server at the reproducing start point of time according to the user's preference, without reproducing the program from the beginning.

In the program recommendation system, preferably, the recommended information may include packet identification information for identifying a specific packet in a plurality of packets constituting a program to be recommended.

In the above arrangement, the recommended information includes the packet identification information for identifying the specific packet in the plurality of packets constituting the program to be recommended. This enables to reproduce the program recommended by the program recommendation server from the specific packet according to the user's preference, without reproducing the program from the beginning.

In the program recommendation system, preferably, the first grouping section may extract, from the manipulation information storing section, a user group having manipulation information substantially equivalent to the manipulation information received by the manipulation information receiving section to define the user group as the first group.

In the above arrangement, the user group having the manipulation information substantially equivalent to the received manipulation information is extracted from the manipulation information storing section to define the extracted user group as the first group. This enables to define the users having similarity in preference by defining the user group having the substantially equivalent manipulation information as the first group.

In the program recommendation system, preferably, the manipulation information may include program identification information for identifying a program with respect to which the user performs manipulation, and the first grouping section may extract, from the manipulation information storing section, a user group having program identification information identical to the program identification information included in the manipulation information received by the manipulation information receiving section to define the user group as the first group.

In the above arrangement, the manipulation information includes the program identification information for identifying the program with respect to which the user performs manipulation, and the user group having the program identification information identical to the program identification information included in the received manipulation information is extracted from the manipulation information storing section to define the extracted user group as the first group. This enables to define the users having similarity in preference by defining the user group having the identical program identification information as the first group.

In the program recommendation system, preferably, the first grouping section may extract, from the manipulation information storing section, a user group having marking time information partially overlapped time-wise with the marking time information included in the manipulation information received by the manipulation information receiving section to define the user group as the first group.

In the above arrangement, the user group having the marking time information partially overlapped time-wise with the marking time information included in the received manipulation information is extracted from the manipulation information storing section to define the extracted user group as the first group. This enables to define the users having similarity in preference by defining the user group having the marking time information partially overlapped time-wise in the program.

In the program recommendation system, preferably, the first grouping section may extract, from the manipulation information storing section, a user group having area identification information identical to the area identification information included in the manipulation information received by the manipulation information receiving section to define the user group as the first group.

In the above arrangement, the user group having the area identification information identical to the area identification information included in the received manipulation information is extracted from the manipulation information storing section to define the extracted user group as the first group. This enables to define the users having similarity in preference by grouping the user group having the identical area identification information.

In the program recommendation system, preferably, the second grouping section may define all the users pre-registered in the program recommendation server as the second group.

In the above arrangement, all the users pre-registered in the program recommendation server are defined as the second group. This enables to extract a program preferred by the total users, and eliminate an influence of the program extracted based on the second group from the program extracted based on the first group.

In the program recommendation system, preferably, the second grouping section may define the users having attribute information substantially equivalent to attribute information pre-entered by the users pre-registered in the program recommendation server, or attribute information extracted from the users pre-registered in the program recommendation server, as the second group.

In the above arrangement, the users having the attribute information substantially equivalent to the attribute information which is pre-entered by the users pre-registered in the program recommendation server, or the attribute information extracted from the users pre-registered in the program recommendation server, is defined as the second group. According to this arrangement, the users having the substantially equivalent attribute information are defined as the second group. This enables to reduce the number of users belonging to the second group, and shorten a time required in generating a recommended program.

In the program recommendation system, preferably, the recommended information generating section may normalize the aggregate calculation result of the manipulation information in the first group by the number of users in the first group, normalize the aggregate calculation result of the manipulation information in the second group by the number of users in the second group, and subtract the aggregate calculation result of the second group obtained by normalization from the aggregate calculation result of the first group obtained by normalization to generate the recommended information customized to the first group based on the subtraction result.

In the above arrangement, the aggregate calculation result of the manipulation information in the first group is normalized by the number of users of the first group. The aggregate calculation result of the manipulation information in the second group is normalized by the number of users of the second group. The aggregate calculation result of the second group obtained by normalization is subtracted from the aggregate calculation result of the first group obtained by normalization to generate the recommended information customized to the first group based on the subtraction result.

According to the above arrangement, the aggregate calculation result of the second group obtained by normalization is subtracted from the aggregate calculation result of the first group obtained by normalization. This enables to eliminate a program having a high general preference, and generate a recommended program customized to a specific user's preference.

In the program recommendation system, preferably, the recommended information generating section may calculate a "tf" (Term Frequency) of the manipulation information in the first group, calculate an "idf" (Inverse Document Frequency) of the manipulation information in the second group, calculate a tf·idf value with respect to each of the manipulation information based on the "tf" and the "idf", and generate the recommended information customized to the first group based on the tf·idf value with respect to each of the manipulation information.

In the above arrangement, the "tf" (Term Frequency) of the manipulation information in the first group is calculated. The "idf" (Inverse Document Frequency) of the manipulation information in the second group is calculated. The tf·idf value with respect to each of the manipulation information is calculated based on the "tf" and the "idf". The recommended information customized to the first group is generated based on the tf·idf value with respect to each of the manipulation information.

According to the above arrangement, the recommended information customized to the first group is generated based on the tf·idf value with respect to each of the manipulation information. This enables to eliminate a program having a high general preference, and recommend a program customized to a specific user's preference.

A program viewing terminal according to another aspect of the invention includes: a program receiving section for receiving a program included in a broadcast wave or communication data; a manipulation accepting section for accepting input of manipulation information representing manipulation of a user with respect to the program received by the program receiving section; a manipulation information transmitting section for transmitting the manipulation information accepted by the manipulation accepting section to a program recommendation server communicatively connected to the program viewing terminal via a network, and adapted for creating recommended information relating to a program matching with a preference of the user depending on the manipulation information; a recommended information receiving section for receiving the recommended information transmitted by the program recommendation server; and a program controlling section for performing at least one of a selecting operation, a recording operation, a reproducing operation, and a deleting operation of a program, based on the recommended information received by the recommended information receiving section.

A program viewing program according to yet another aspect of the invention causes a computer to function as: a program receiving section for receiving a program included in a broadcast wave or communication data; a manipulation accepting section for accepting input of manipulation information representing manipulation of a user with respect to the program received by the program receiving section; a manipulation information transmitting section for transmitting the manipulation information accepted by the manipulation accepting section to a program recommendation server communicatively connected via a network, and adapted for creating recommended information relating to a program matching with a preference of the user depending on the manipulation information; a recommended information receiving section for receiving the recommended information transmitted by the program recommendation server; and a program controlling section for performing at least one of a selecting operation, a recording operation, a reproducing operation, and a deleting operation of a program, based on the recommended information received by the recommended information receiving section.

A program viewing method according to a further aspect of the invention includes: a program receiving step of receiving a program included in a broadcast wave or communication data; a manipulation accepting step of accepting input of manipulation information representing manipulation of a user with respect to the program received in the program receiving step; a manipulation information transmitting step of transmitting the manipulation information accepted in the manipulation accepting step to a program recommendation server communicatively connected via a network, and adapted for creating recommended information relating to a program matching with a preference of the user depending on the manipulation information; a recommended information receiving step of receiving the recommended information transmitted by the program recommendation server; and a program controlling step of performing at least one of a selecting operation, a recording operation, a reproducing operation, and a deleting operation of a program, based on the recommended information received in the recommended information receiving step.

In the above arrangements, the program included in the broadcast wave or the communication data is received. Input of the manipulation information representing manipulation of the user with respect to the received program is accepted. The accepted manipulation information is transmitted to the program recommendation server communicatively connected via the network, and adapted for creating the recommended information relating to the program matching with the user's preference depending on the manipulation information. Thereafter, the recommended information transmitted by the program recommendation server is received, and at least one of the selecting operation, the recording operation, the reproducing operation, and the deleting operation of the program is performed, based on the received recommended information.

In the above arrangements, since a program according to the user's preference is recommended by the program recommendation server, at least one of the selecting operation, the recording operation, the reproducing operation, and the deleting operation of the program is performed according to the user's preference.

A program recommendation server according to a yet further aspect of the invention includes: manipulation information receiving section for receiving manipulation information representing manipulation of a user with respect to a program transmitted by a program viewing terminal communicatively connected via a network, and adapted to allow the user to view the received program; a manipulation information storing section for storing the manipulation information received by the manipulation information receiving section with respect to each of the users; a first grouping section for defining the user as a first group, based on the manipulation information received by the manipulation information receiving section, and the manipulation information stored in the manipulation information storing section with respect to each of the users; a second grouping section for defining the user as a second group, the second group including the first group defined by the first grouping section; a recommended information generating section for generating the recommended information customized to the first group, based on an aggregate calculation result of the manipulation information of the users belonging to the first group defined by the first grouping section, and an aggregate calculation result of the manipulation information of the users belonging to the second group defined by the second grouping section; and a recommended information transmitting section for transmitting the recommended information generated by the recommended information generating section to the program viewing terminal.

A program recommendation program according to a yet further aspect of the invention causes a computer to function as: a manipulation information receiving section for receiving manipulation information representing manipulation of a user with respect to a program transmitted by a program viewing terminal communicatively connected via a network, and adapted to allow the user to view the received program; a manipulation information storing section for storing the manipulation information received by the manipulation information receiving section with respect to each of the users; a first grouping section for defining the user as a first group, based on the manipulation information received by the manipulation information receiving section, and the manipulation information stored in the manipulation information storing section with respect to each of the users; a second grouping section for defining the user as a second group, the second group including the first group defined by the first grouping section; a recommended information generating section for generating the recommended information customized to the first group, based on an aggregate calculation result of the manipulation information of the users belonging to the first group defined by the first grouping section, and an aggregate calculation result of the manipulation information of the users belonging to the second group defined by the second grouping section; and a recommended information transmitting section for transmitting the recommended information generated by the recommended information generating section to the program viewing terminal.

A program recommendation method according to a still further aspect of the invention includes: a manipulation information receiving step of receiving manipulation information representing manipulation of a user with respect to a program transmitted by a program viewing terminal communicatively connected via a network, and adapted for allowing the user to view the received program; a manipulation information storing step of storing the manipulation information received in the manipulation information receiving step into a manipulation information storing section with respect to each of the users; a first grouping step of defining the user as a first group, based on the manipulation information received in the manipulation information receiving step, and the manipulation information stored in the manipulation information storing section with respect to each of the users; a second grouping step of defining the user as a second group, the second group including the first group defined in the first grouping step; a recommended information generating step of generating the recommended information customized to the first group, based on an aggregate calculation result of the manipulation information of the users belonging to the first group defined in the first grouping step, and an aggregate calculation result of the manipulation information of the users belonging to the second group defined in the second grouping step; and a recommended information transmitting step of transmitting the recommended information generated by a recommended information generating section to the program viewing terminal.

In the above arrangements, the manipulation information representing manipulation of the user with respect to the program transmitted by the program viewing terminal communicatively connected via the network, and adapted for allowing the user to view the received program is received. The received manipulation information is stored into the manipulation information storing section with respect to each of the users. The user is defined as the first group, based on the received manipulation information, and the manipulation information stored in the manipulation information storing section with respect to each of the users; and the user is defined as the second group including the first group. The recommended information customized to the first group is generated, based on the aggregate calculation result of the manipulation information of the users belonging to the first group, and the aggregate calculation result of the manipulation information of the users belonging to the second group. The recommended information is transmitted to the program viewing terminal.

According to the above arrangement, a program manipulated by the other user having a preference identical to the preference of a user is extracted, based on the aggregate calculation result of the manipulation information of the users belonging to the first group. A program preferred by the total users is extracted, based on the aggregate calculation result of the manipulation information of the users belonging to the second group including the first group. An influence of a program extracted based on the second group is eliminated from a program extracted based on the first group. This enables to eliminate a program having a high general preference, and recommend a program customized to a specific user's preference.

According to the invention, a program manipulated by the other user having a preference identical to the preference of a user is extracted, based on an aggregate calculation result of manipulation information of the users belonging to the first group. A program preferred by the total users is extracted, based on an aggregate calculation result of manipulation information of the users belonging to the second group including the first group. An influence of a program extracted based on the second group is eliminated from a program extracted based on the first group. This enables to eliminate a program having a high general preference, and recommend a program customized to a specific user's preference.

INDUSTRIAL APPLICABILITY

The program recommendation system, the program viewing terminal, the program viewing program, the program viewing method, the program recommendation server, the program recommendation program, and the program recommendation method of the invention enable to eliminate a program having a high general preference, and recommend a program customized to a specific user's preference, and therefore, are useful as a program viewing terminal, a program viewing program, and a program viewing method for allowing a user to view a received program; a program recommendation server, a program recommendation program, and a program recommendation method for creating recommended information relating to a program matching with the user's preference depending on manipulation information; and a program recommendation system provided with a program viewing terminal and a program recommendation server.

The invention claimed is:

1. A program recommendation system comprising:
a program viewing terminal for allowing a user to view a received program; and
a program recommendation server communicatively connected to the program viewing terminal via a network, and adapted for acquiring manipulation information representing manipulation of the user with respect to the program from the program viewing terminal to create recommended information relating to a program matching with a preference of the user depending on the manipulation information, wherein
the program viewing terminal includes:
a manipulation accepting section for accepting input of the manipulation information; and
a manipulation information transmitting section for transmitting the manipulation information accepted by the manipulation accepting section to the program recommendation server,
the program recommendation server includes:
a manipulation information receiving section for receiving the manipulation information transmitted by the manipulation information transmitting section;
a manipulation information storing section for storing the manipulation information received by the manipulation information receiving section with respect to each of the users;
a first grouping section for defining the user as a first group, based on the manipulation information received by the manipulation information receiving section, and the manipulation information stored in the manipulation information storing section with respect to each of the users;
a second grouping section for defining the user as a second group, the second group including the first group defined by the first grouping section;
a recommended information generating section for generating the recommended information customized to the first group, based on an aggregate calculation result of the manipulation information of the users belonging to the first group defined by the first grouping section, and an aggregate calculation result of the manipulation information of the users belonging to the second group defined by the second grouping section; and
a recommended information transmitting section for transmitting the recommended information generated by the recommended information generating section to the program viewing terminal, and
the program viewing terminal further includes:
a recommended information receiving section for receiving the recommended information transmitted by the recommended information transmitting section; and
a program controlling section for performing at least one of a selecting operation, a recording operation, a reproducing operation, and a deleting operation of a program, based on the recommended information received by the recommended information receiving section.

2. The program recommendation system according to claim 1, wherein
the program viewing terminal further includes a marking accepting section for accepting an operation of marking a reproducing position in the program by the user, and
the manipulation information includes marking time information representing a point of time corresponding to the reproducing position, in the program, marked by the marking accepting section.

3. The program recommendation system according to claim 2, wherein
the first grouping section extracts, from the manipulation information storing section, a user group having marking time information partially overlapped time-wise with the marking time information included in the manipulation information received by the manipulation information receiving section to define the user group as the first group.

4. The program recommendation system according to claim 1, wherein
the program is broadcast in a state that a display screen is divided into a plurality of areas,
the program viewing terminal further includes an area selection accepting section for accepting selection of at least one of the areas on the display screen by the user, and
the manipulation information includes time information, in the program, representing a point of time when the selected area is accepted by the area selection accepting section.

5. The program recommendation system according to claim 4, wherein
the recommended information includes area identification information for identifying the area selected by the user among the areas.

6. The program recommendation system according to claim 5, wherein
the first grouping section extracts, from the manipulation information storing section, a user group having area identification information identical to the area identification information included in the manipulation information received by the manipulation information receiving section to define the user group as the first group.

7. The program recommendation system according to claim 1, wherein
the program is broadcast in a state that a display screen is divided into a plurality of areas,
the program viewing terminal further includes an area selection accepting section for accepting selection of at least one of the areas on the display screen by the user, and
the manipulation information includes position information, on the display screen, corresponding to the selected area accepted by the area selection accepting section.

8. The program recommendation system according to claim 1, wherein
the recommended information includes reproducing start time information relating to a point of time of start of reproducing a program to be recommended.

9. The program recommendation system according to claim 1, wherein
the recommended information includes packet identification information for identifying a specific packet in a plurality of packets constituting a program to be recommended.

10. The program recommendation system according to claim 1, wherein
the first grouping section extracts, from the manipulation information storing section, a user group having manipulation information substantially equivalent to the manipulation information received by the manipulation information receiving section to define the user group as the first group.

11. The program recommendation system according to claim 1, wherein
the manipulation information includes program identification information for identifying a program with respect to which the user performs manipulation, and
the first grouping section extracts, from the manipulation information storing section, a user group having program identification information identical to the program identification information included in the manipulation information received by the manipulation information receiving section to define the user group as the first group.

12. The program recommendation system according to claim 1, wherein
the second grouping section defines all the users pre-registered in the program recommendation server as the second group.

13. The program recommendation system according to claim 1, wherein
the second grouping section defines the users having attribute information substantially equivalent to attribute information pre-entered by the users pre-registered in the program recommendation server, or attribute information extracted from the users pre-registered in the program recommendation server, as the second group.

14. The program recommendation system according to claim 1, wherein
the recommended information generating section normalizes the aggregate calculation result of the manipulation information in the first group by the number of users in the first group, normalizes the aggregate calculation result of the manipulation information in the second group by the number of users in the second group, and subtracts the aggregate calculation result of the second group obtained by normalization from the aggregate calculation result of the first group obtained by normalization to generate the recommended information customized to the first group based on the subtraction result.

15. The program recommendation system according to claim 1, wherein
the recommended information generating section calculates a "tf" (Term Frequency) of the manipulation information in the first group, calculates an "idf" (Inverse Document Frequency) of the manipulation information in the second group, calculates a tf·idf value with respect to each of the manipulation information based on the "tf" and the "idf", and generates the recommended information customized to the first group based on the tf·idf value with respect to each of the manipulation information.

* * * * *